United States Patent [19]
Chin et al.

[11] Patent Number: 5,867,723
[45] Date of Patent: *Feb. 2, 1999

[54] ADVANCED MASSIVELY PARALLEL COMPUTER WITH A SECONDARY STORAGE DEVICE COUPLED THROUGH A SECONDARY STORAGE INTERFACE

[75] Inventors: Danny Chin, West Windsor Township, Mercer County; Joseph Edward Peters, Jr., East Brunswick, Middlesex County; Herbert Hudson Taylor, Jr., Hopewell Township, Mercer County, all of N.J.

[73] Assignee: Sarnoff Corporation, Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 689,183

[22] Filed: Aug. 5, 1996

Related U.S. Application Data

[63] Continuation of Ser. No. 416,932, Apr. 4, 1995, Pat. No. 5,581,778, which is a continuation of Ser. No. 91,935, Jul. 14, 1993, abandoned, and a continuation-in-part of Ser. No. 926,265, Aug. 5, 1992, abandoned.

[51] Int. Cl.$^6$ ..................................................... G06F 13/12
[52] U.S. Cl. .............................. 395/800.11; 395/800.13; 395/800.2; 711/114; 711/119
[58] Field of Search ..................... 395/800, 309, 395/310, 891, 595, 620, 673, 445, 800.1, 11, 14, 16, 17, 23, 27, 28, 800.24, 800.22, 800.2, 851, 800.13; 364/DIG. 1, DIG. 2; 371/40, 1; 711/114, 119, 120

[56] References Cited

U.S. PATENT DOCUMENTS

| | | | |
|---|---|---|---|
| 4,218,742 | 8/1980 | Carlton et al. | 395/891 |
| 4,344,134 | 8/1982 | Barnes | 364/200 |
| 4,371,929 | 2/1983 | Brown et al. | 395/865 |
| 4,382,295 | 5/1983 | Moffitt et al. | 370/68 |
| 4,412,285 | 10/1983 | Neches et al. | 395/673 |
| 4,467,421 | 8/1984 | White | 395/445 |
| 4,598,400 | 7/1986 | Hillis | 370/60 |
| 4,608,631 | 8/1986 | Stiffler et al. | 364/200 |
| 4,644,449 | 2/1987 | Andrews | 364/500 |
| 4,722,085 | 1/1988 | Flora et al. | 371/40.1 |

(List continued on next page.)

FOREIGN PATENT DOCUMENTS

| | | | |
|---|---|---|---|
| EP-A-0360527 | 3/1990 | European Pat. Off. | G06F 15/80 |
| EP-A-0460599 | 12/1991 | European Pat. Off. | G06F 15/16 |

OTHER PUBLICATIONS

D. Chin et al "The Princeton Engine: A Real–Time Video System Simulator" IEEE Trans. Cons. Electronics v34, 1–12 (1988).

R. Alverson et al "The Tera Computer System" 1990 International Conference On Supercomputing Jun. 11–15, 1990 Amsterdam, Netherlands.

A. Fischer "Scan Line Array Processors For Image Computation" Computer Architecture News vol. 14, No. 2, Jun. 2–5, 1986.

(List continued on next page.)

*Primary Examiner*—Larry D. Donaghue
*Attorney, Agent, or Firm*—William J. Burke

[57] ABSTRACT

An advanced massively parallel computer having a plurality of processor subsystems, where each processor subsystem is coupled to a secondary storage device (e.g., disk drive) through a secondary storage interface. The computer contains an input data bus for supplying data to the processor subsystem, an interprocessor communications bus for communicating data and instructions between processor subsystems, and an instruction bus for supplying instructions to the processor subsystems to facilitate data manipulation by each of the processor subsystems.

11 Claims, 25 Drawing Sheets

U.S. PATENT DOCUMENTS

| | | | |
|---|---|---|---|
| 4,736,363 | 4/1988 | Aubin et al. | 370/60 |
| 4,740,954 | 4/1988 | Cotton et al. | 370/60 |
| 4,742,448 | 5/1988 | Sander et al. | 395/894 |
| 4,747,047 | 5/1988 | Coogan et al. | 395/858 |
| 4,773,038 | 9/1988 | Hillis et al. | 364/900 |
| 4,783,738 | 11/1988 | Li et al. | 364/200 |
| 4,805,090 | 2/1989 | Coogan | 395/894 |
| 4,809,362 | 2/1989 | Claus et al. | 455/607 |
| 4,837,676 | 6/1989 | Rosman | 364/200 |
| 4,866,668 | 9/1989 | Edmonds et al. | 364/900 |
| 4,893,234 | 1/1990 | Davidson et al. | 364/200 |
| 4,965,718 | 10/1990 | George et al. | 364/200 |
| 5,018,133 | 5/1991 | Tsukakoshi et al. | 370/16 |
| 5,088,091 | 2/1992 | Schroeder et al. | 370/94.3 |
| 5,105,424 | 4/1992 | Flaig et al. | 370/94.1 |
| 5,109,379 | 4/1992 | Kume et al. | 370/94.3 |
| 5,113,523 | 5/1992 | Colley et al. | 395/800 |
| 5,117,430 | 5/1992 | Berglund | 370/85.1 |
| 5,121,502 | 6/1992 | Rau et al. | 395/8 |
| 5,125,076 | 6/1992 | Faber et al. | 395/200 |
| 5,129,077 | 7/1992 | Hillis | 395/500 |
| 5,165,009 | 11/1992 | Watanabe et al. | 395/27 |
| 5,175,865 | 12/1992 | Hillis | 395/800 |
| 5,202,987 | 4/1993 | Bayer et al. | 395/650 |
| 5,257,367 | 10/1993 | Goodlander et al. | 395/620 |

OTHER PUBLICATIONS

CONPAR 88, Manchester UK, 12–16 Sep. 1988, ISBN 0–521–37177–5, 1989, Cambridge, UK, Cambridge University Press, UK, pp. 10–17, Giloi Wolfgang K., "Ther Suprenum Architecture".

Proc. of the Symposium on Frontiers of Massively Parallel Comp. Oct. 8–18, 1990, No. Symp. 3, 8, pp. 196–203, Bridges T, "The GPA Machine: AGenerally Partitionable MSIMD Architecture".

EXAMPLE:
    OFFSET : = 2;
    STRIDE : = 3;
SUCCESSIVE ACCESSES MARKED IN: 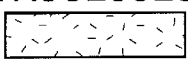
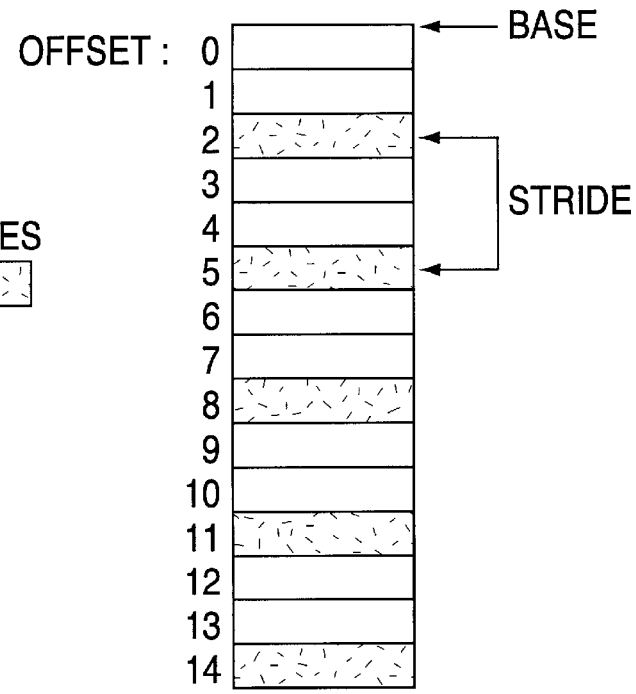
FIG. 7
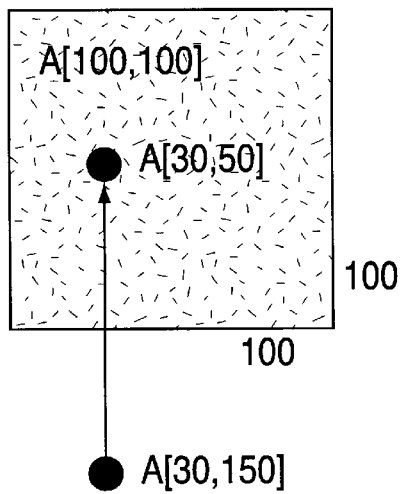
FIG. 8
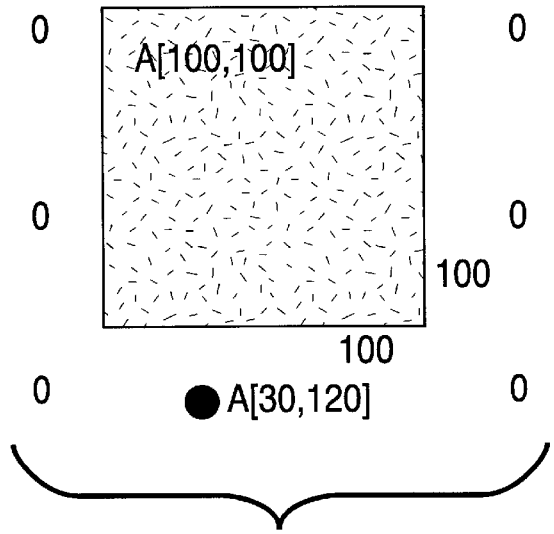
FIG. 9

: USED.   INSTR.
: UNUSED. CYCLES

EXAMPLE: B = 4.
5 MATCHES FOUND; STORED IN P REGISTER

X INPUT:

| 1010 | 1111 | 0000 | 0101 | 1111 | 1111 | 1010 | 0000 |

Y INPUT:

| 0000 | 1111 | 1010 | 0101 | 1111 | 0101 | 1010 | 0000 |

CDABDCA MATCH SEQUENCE

| CDAB | DCA  |    |
|------|------|----|
| CDA  | BDCA |    |
| CD   | ABDC | A  |
| C    | DABD | CA |

SET OF TEMPLATES

FIG. 12

| ABCD | ABDC | ABAD | CCBD | ABCD | DBCB | ... |

DATA SEQUENCE

| CDAB | DCA  |    |
|------|------|----|
| CDA  | BDCA |    |
| CD   | ABDC | A  |
| C    | DABD | CA |

| CDAB | DCA  |    |
|------|------|----|
| CDA  | BDCA |    |
| CD   | ABDC | A  |
| C    | DABD | CA |

| CDAB | DCA  |    |
|------|------|----|
| CDA  | BDCA |    |
| CD   | ABDC | A  |
| C    | DABD | CA |

SET OF TEMPLATES

FIG. 13

• 1 I/O DATUM TO 1 FIFO WORD
DATA FORMAT 1 (12 BITS):
• 2 I/O DATA TO 1 FIFO WORD
DATA FORMAT 2 (24 BITS):
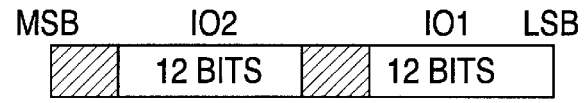
• 3 I/O DATA TO 1 FIFO WORD
DATA FORMAT 3 (32 BITS):
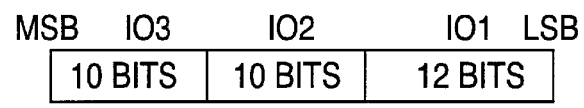
*FIG. 19*
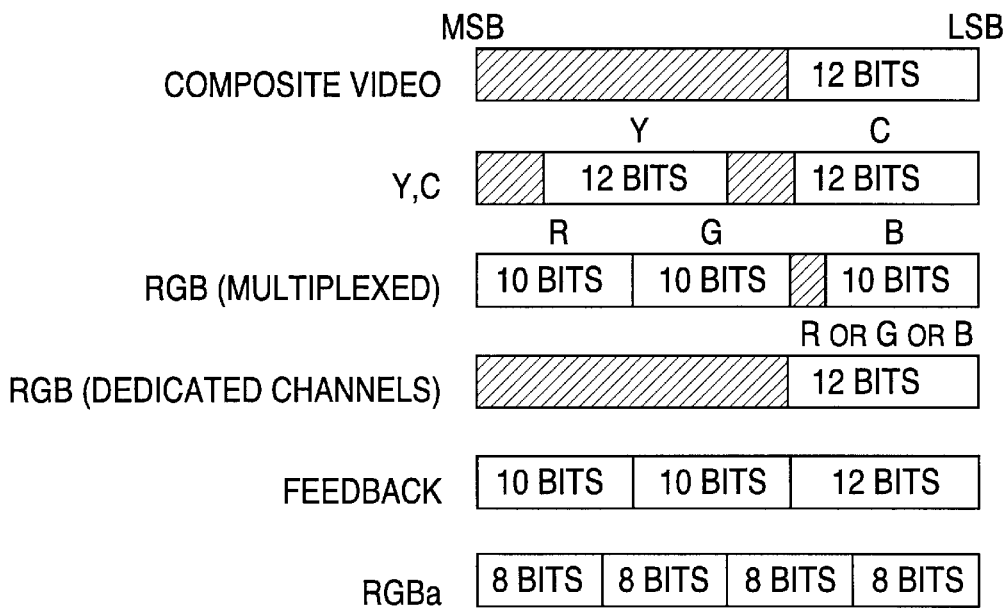
*FIG. 20*

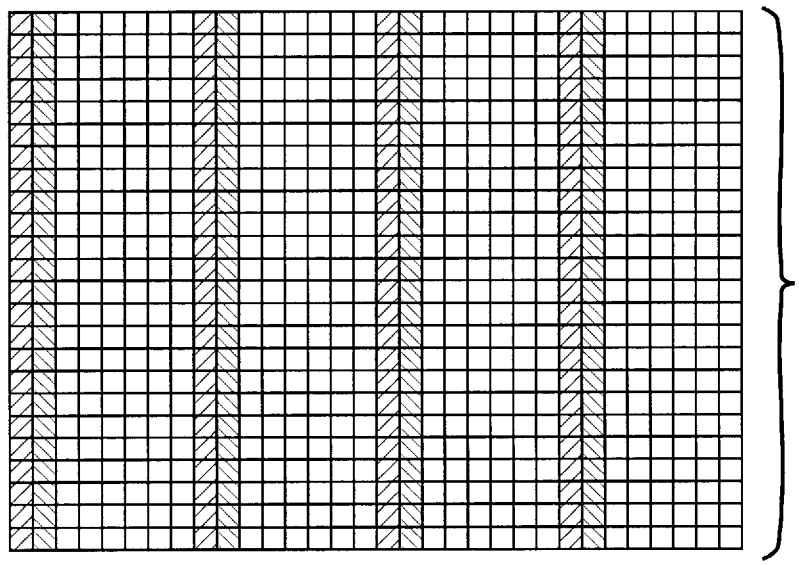
SCHEME 1:
PRINCETON
ENGINE/
SARNOFF ENGINE
PROBLEM SPACE IN LOCAL MEMORY
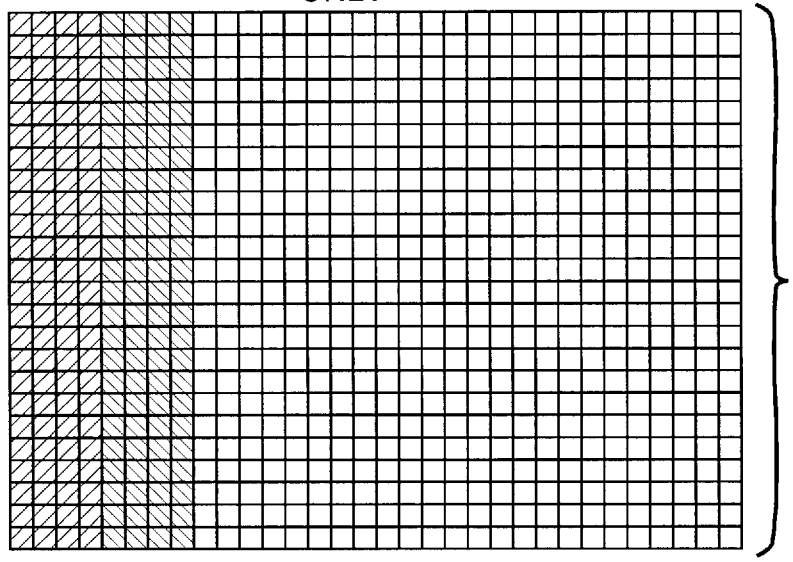
SCHEME 2:
SARNOFF ENGINE ONLY
PROBLEM SPACE IN LOCAL MEMORY
*FIG. 23*

|   | 0 | 1 | 2 | 3 |
|---|---|---|---|---|
| 0 | 0 | 0 | 0 | 0 |
| 1 | 1 | 1 | 1 | 1 |
| 2 | 2 | 2 | 2 | 2 |
| 3 | 3 | 3 | 3 | 3 |

FIG. 27a

| 13 | 10 | 7  | 4  |
|----|----|----|----|
| 1  | 14 | 11 | 8  |
| 5  | 2  | 15 | 12 |
| 9  | 6  | 3  | 16 |

FIG. 27b

| 13 | 1  | 5  | 9  |
|----|----|----|----|
| 10 | 14 | 2  | 6  |
| 7  | 11 | 15 | 3  |
| 4  | 8  | 12 | 16 |

FIG. 27c

| a | b | c | d |
|---|---|---|---|
| e | f | g | h |
| i | j | k | l |
| m | n | o | p |

FIG. 27d

| a | e | i | m |
|---|---|---|---|
| b | f | j | n |
| c | g | k | o |
| d | h | l | p |

FIG. 27e

| 1  | 14 | 11 | 8  |
|----|----|----|----|
| 5  | 2  | 15 | 12 |
| 9  | 6  | 3  | 16 |
| 13 | 10 | 7  | 4  |

FIG. 27f

| 8  | 11 | 14 | 1  |
|----|----|----|----|
| 12 | 15 | 2  | 5  |
| 16 | 3  | 6  | 9  |
| 4  | 7  | 10 | 13 |

FIG. 27g

| a | b | c | d |
|---|---|---|---|
| e | f | g | h |
| i | j | k | l |
| m | n | o | p |

FIG. 27h

| m | i | e | a |
|---|---|---|---|
| n | j | f | b |
| o | k | g | c |
| p | l | h | d |

ADVANCED MASSIVELY PARALLEL COMPUTER WITH A SECONDARY STORAGE DEVICE COUPLED THROUGH A SECONDARY STORAGE INTERFACE

CROSS REFERENCE TO RELATED APPLICATION

This application is a continuation of patent application Ser. No. 08/416,932, filed on Apr. 4, 1995 and entitled ADVANCED MASSIVELY PARALLEL COMPUTER USING A FIELD OF THE INSTRUCTION TO SELECTIVELY ENABLE THE PROFILING COUNTER TO INCREASE ITS VALUE IN RESPONSE TO THE SYSTEM CLOCK, now U.S. Pat. No. 5,581,778, which is a continuation of prior patent application Ser. No. 08/091,935 entitled ADVANCED MASSIVELY PARALLEL COMPUTER APPARATUS filed on Jul. 14, 1993, abandoned.

This application is a continuation-in-part of U.S. patent application Ser. No. 07/926,265 filed Aug. 5, 1992, abandoned.

This invention was made with Government support under Contract No. MDA-972-90-C-0022. The Government has certain rights in the invention.

This invention relates to massively-parallel computer apparatus and, more particularly, to such apparatus capable of providing multiuser time-shared operation thereof.

BACKGROUND OF THE INVENTION

While both large sequentially-operating and parallel-operating supercomputers are known in the art, massively-parallel operation is to be preferred for those computationally-intensive applications which require a vast amount of data computation and data communication to be carried out in real time. Examples of such applications include weather modeling and medical imaging. Real-time analysis of such complex scenarios encountered by such applications operate on very large data sets.

The growth of advanced problem size has been such that the maximum rate of communication and computation of these prior-art massively-parallel supercomputers, including the Princeton Engine (PE), is insufficient to provide real-time solutions therefor. Therefore, there is a need for a larger massively-parallel supercomputer which would meet both the bandwidth and computation requirements (an I/O bandwidth up to 1200 MBytes/sec, and a peak computational rate up to 9.6 Teraops/sec) needed to provide solutions to such computationally-intensive problems. Further, although sequential supercomputers are capable of time-shared multi-user operation, the design of all prior-art massively-parallel supercomputers does not permit them to have this capability.

SUMMARY OF THE INVENTION

A parallel computing system is described which is arranged as N blocks, each containing M processors. Each processor has an arithmetic and logic unit (ALU), a local memory and an input/output (I/O) interface. Each block also includes a controller which is coupled to provide a group of identical instructions to each of the M processors in the block. The parallel computing system also includes a host processor which is coupled to several of the control means of the N blocks. The host processor partitions these blocks into at least first and second groups of blocks, each group including P blocks. For each group of P blocks, a respectively different group of identical processor instructions are provided to each of the P times M processors by the host processor.

BRIEF DESCRIPTION OF THE DRAWING

FIG. 7 shows the use of a Stride Register of the SE;

FIG. 8 shows an example of the Modulo Arithmetic Mode of the SE;

FIG. 9 shows an example of the Bounding Mode of the SE;

FIG. 12 illustrates a match sequence and the corresponding templates;

FIG. 13 illustrates matches found between match and data sequences;

FIG. 19 illustrates data I/O data formats;

FIG. 20 illustrates video data formats;

FIG. 23 illustrates 2 schemes for processor handling of multiple pixels;

FIGS. 27a through 27i are drawings of arrays of memory locations which are useful for describing the operation of the input and output FIFOs;

DESCRIPTION OF THE PREFERRED EMBODIMENTS

To facilitate the description of the invention, an alphabetic listing of some acronyms employed herein is appended hereto.

The prior-art Princeton Engine (PE) architecture is a single-instruction multiple data (SIMD) linear array of processors. The linear array can be scaled from 64 to 2048 processors in steps of 64 and, in a full configuration, achieves a computational rate of 28,672 MIPS for an instruction clock of 14 MHz. Each processor has a local memory and can communicate with its neighbors via two bidirectional channels. Input and output data rates of 14 and 1.8 Gbps, respectively, are provided. The PE host is an Apollo/Mentor Graphics workstation, and high-resolution monitors are used for observation of output results.

Each processing element PE0 to PEn-1 of the PE contains seven independent, internal 16-bit data paths, a 16-bit ALU, a 16-bit multiplier, a triple-ported register stack with 64 elements; a 16-bit communications port; and up to 640K Bytes of external SRAM local memory. The register file has one address port for read-only access to that file and a second address port for read or write access to that file. An interprocessor communications bus (IPC) permits exchanges of data between neighboring processors during one instruction cycle. On each instruction cycle, up to six simultaneous operations can take place (input or output via the I/O bus, simultaneous read and write at the register file, one multiplication, one ALU operation, and a local memory access).

Figure 1:
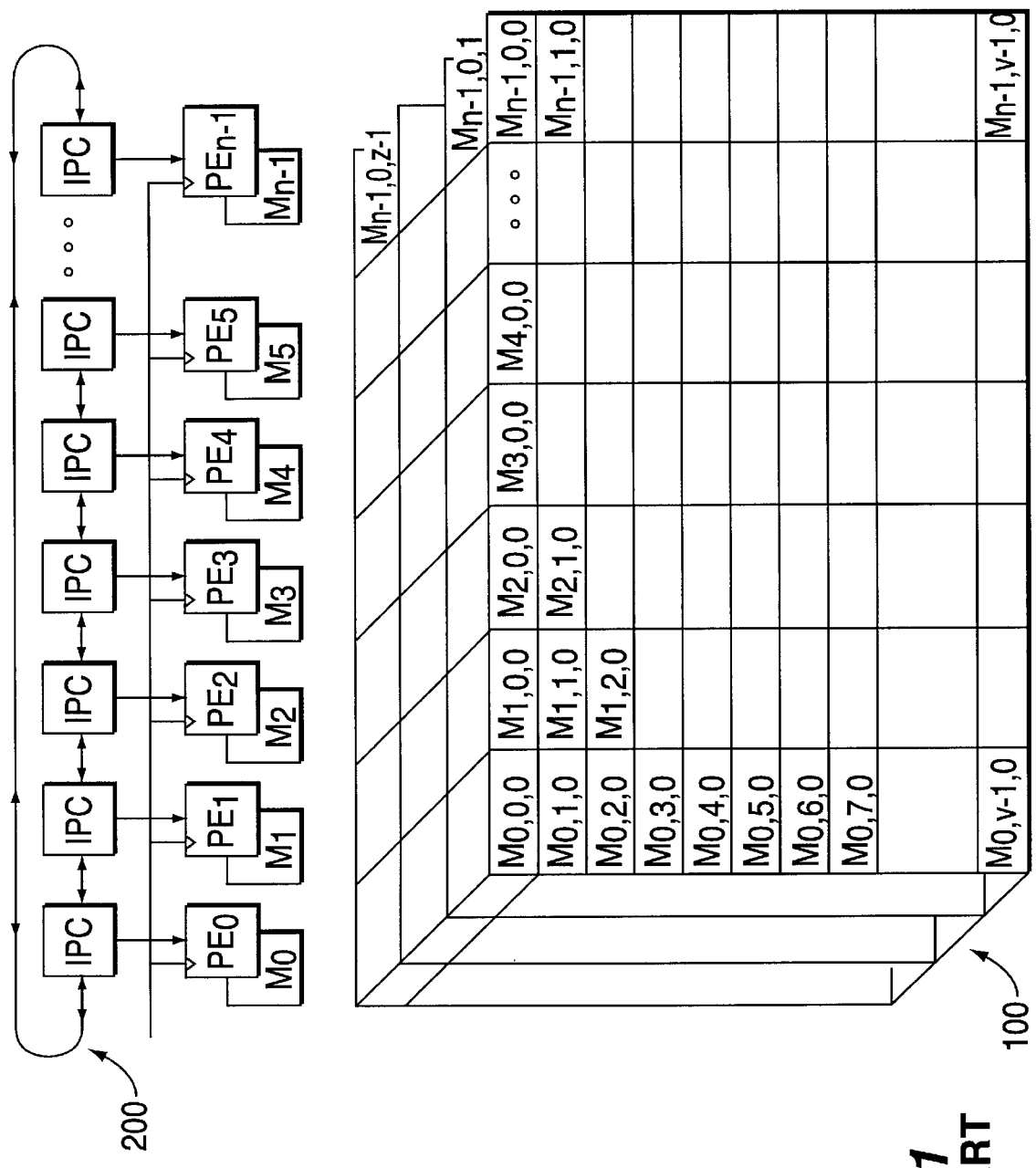
FIG. 1 illustrates how video frames are distributed over the memories of a prior-art Princeton Engine (PE)

Input data is stored as one pixel per processor in each processor's local memory M0 to Mn-1 for each scan line 0 to v-1 of video. Thus, over a frame period, one pixel column of a video frame is stored in each local memory. The local memory is sufficient to store up to 640 columns of 8-bit pixels for a 1024 line frame. Functional diagram 100 of FIG. 1 illustrates how video frames are distributed over the local memories. Each corresponding column of a video frame sequence 0 to z-1 is stored in the same local memory. Thus, temporal algorithms do not require communications among processors; simple memory addressing is sufficient. Neighboring columns of spatial data are stored in the local memory of neighboring processors. Horizontal filters and statistical gathering operations require data communications between the processors via IPC 102.

The IPC can be set in one of four modes: normal, bypassed, broadcast send, and broadcast receive. Normal communication is between neighbors within the linearly connected array. Data is loaded onto the IPC channel in one instruction, and shifted left or right on the next instruction. This mode is very efficient for nearest-neighbor computations.

In some cases it is desirable to perform neighborhood operations on a subgrid of the original array. This decimation can be achieved without compressing array elements into a smaller connected region. Rather, processors are bypassed, providing new neighborhood connections among the desired domain. Left and right shift operations traverse the bypassed interconnection pattern.

Figure 2:
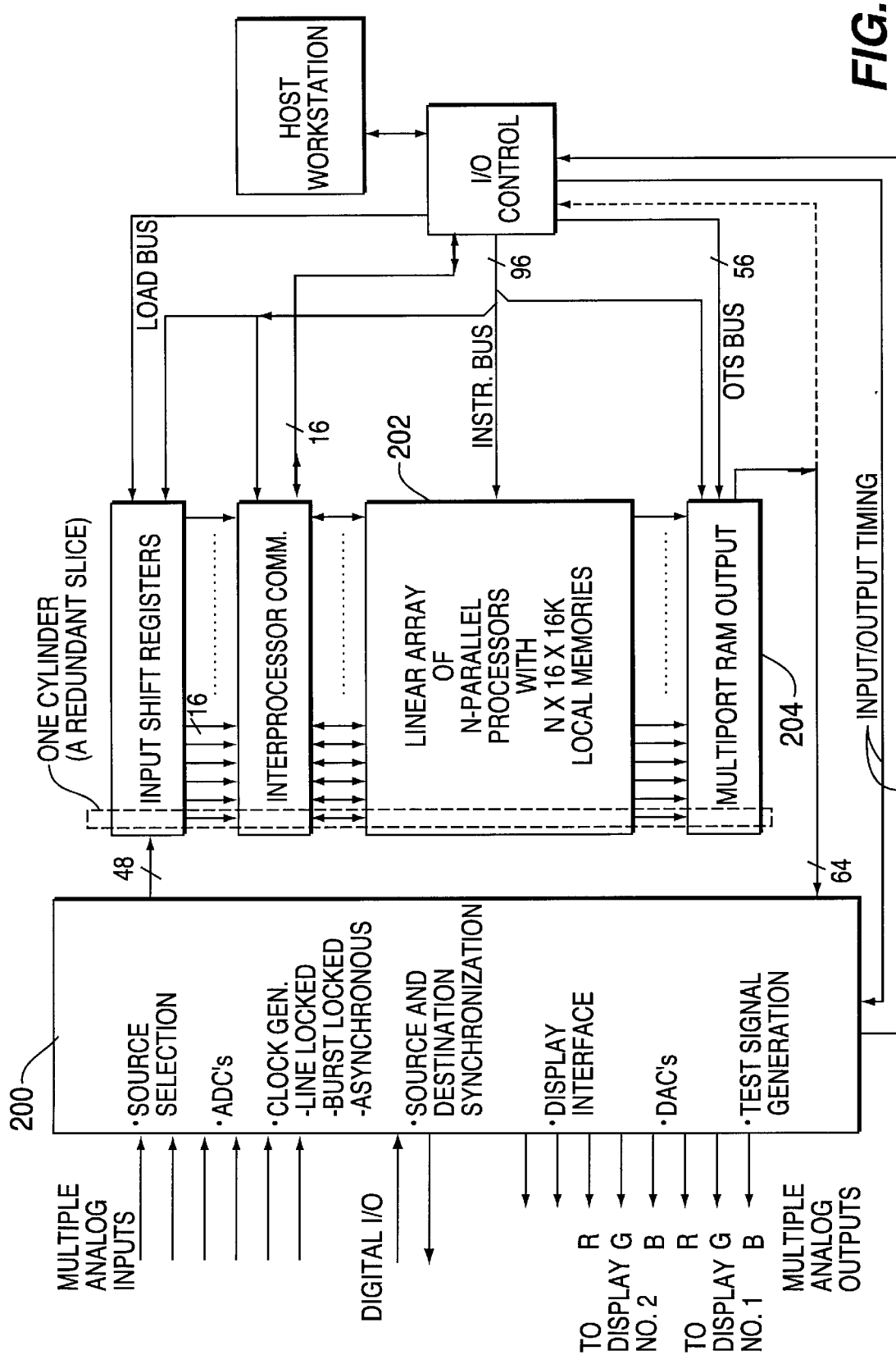
FIG. 2 illustrates resources in the prior-art PE which permit a host computer to have digital access to load or capture data on controller busses for system or algorithmic testing purposes.

In FIG. 2, the PE is interfaced to analog and digital sources and destinations through the controller cabinet 200. The input and output data channels to the parallel array are 48 bits and 64 bits wide, respectively. These channels are clocked at 28 MHz and interface 6 analog-to-digital converters (ADCs) and 7 digital-to-analog converters (DACs). The host computer has digital access to load or capture data on these busses for system or algorithmic testing purposes.

The controller 200 also provides user-selectable clocks for the ADCs and DACs. Up to three independent input clocks and four independent output clocks are possible. This capability permits several different data sources to be simultaneously read, processed, displayed, and compared. The outputs may be taken to a variety of displays: a spectrum analyzer, or even back into the user's existing real-time system hardware for embedded applications.

Output from parallel processor 202 is user-programmable through a special output, multi-port, RAM structure 204 embedded within a bit-slice I/O IC. Local memory accesses are reduced by this unique output architecture. The output data stream may further be routed back to the input of the parallel array for additional processing. This feature provides a real-time transpose capability useful in radar processing (corner turn) and for fast rotation of large 3D data sets.

Figure 3:
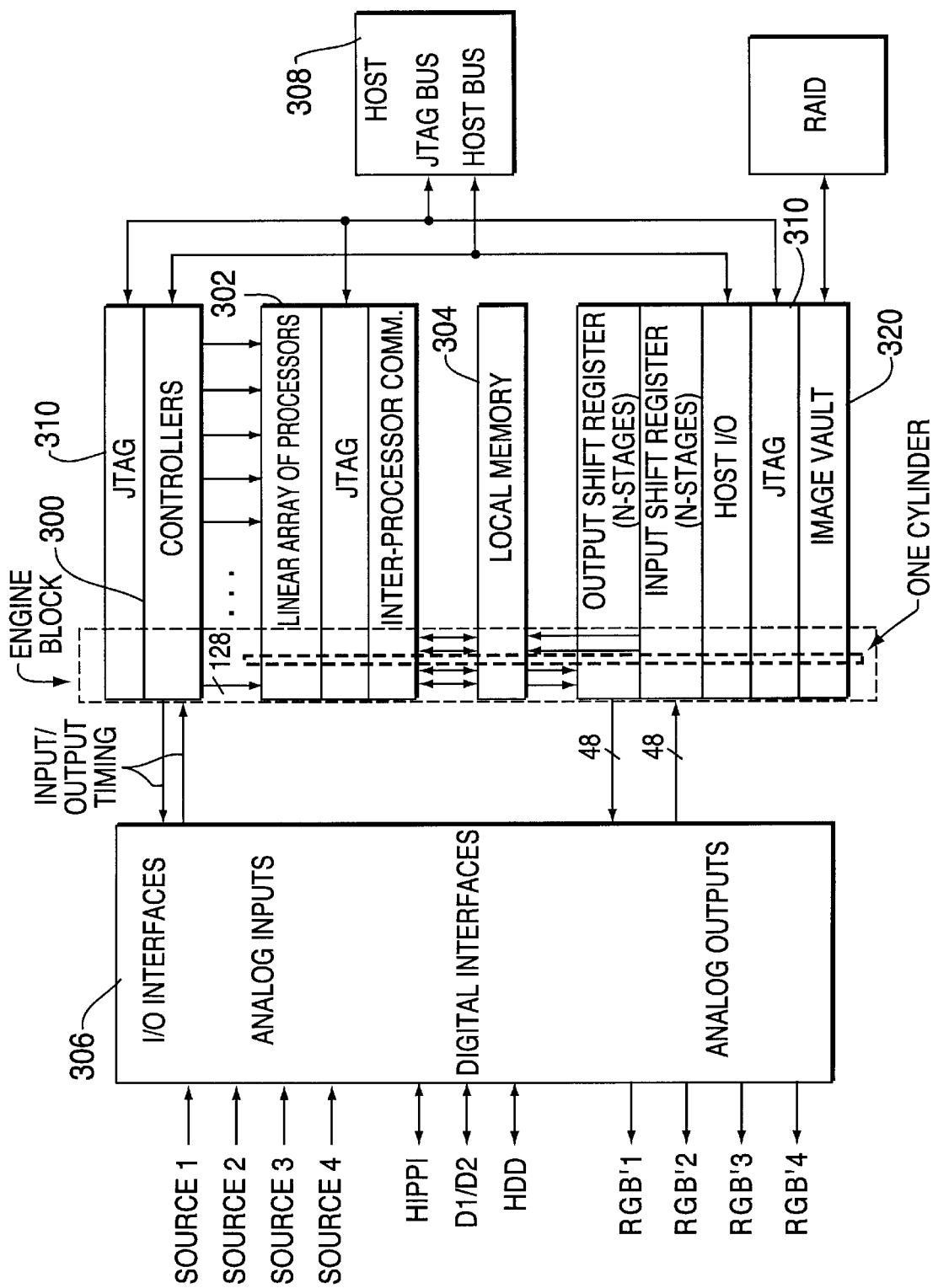
FIG. 3 is a high level view of a parallel computing system of the invention (the SE)

The SE has 32-bit processors, with 15 independent programmable operations per instruction and double the memory bandwidth (two local memory ports per processor). The total number of processors in a full system is 8192 and each processor is designed to operate with a 100 MHz clock (10 ns instruction cycle), for a computational data rate of 819 MIPS and $9.6 \times 10^{12}$ operations/sec. Another major improvement is that the SE has Multiple Instruction Multiple Data (MIMD) capabilities; there is a controller for every 64 processors, with each controller able to broadcast a different instruction stream to its processors. This architecture organization provides up to 128 MIMD instruction streams, with hardware support for synchronization between controllers. Data I/O is more robust on the SE. Whereas real-time PE programs operated on a single line of an input image, real-time SE programs operate on an entire image. The SE also can operate in a multiuser mode where the system can be configured to time-share the machine to support several real-time and non-real-time applications without interference between applications. The system can also be reconfigured into several smaller systems to run applications. FIG. 3 provides a high level view of the machine organization.

For a system clock of 100 Mhz, the controller functions must be integrated and contained in close proximity to the processors. Controller 300 is responsible for broadcasting instructions to processing elements 302 and maintaining information on processes and signals. Each controller contains an instruction memory and a microsequencer that dictates program control flow. Information on the active processes is maintained in a process control memory. The use of redundant slices that contain a number of processors 302, local memories 304, I/O functions 306, and controller functions further satisfy the need to serve multiusers and to provide MIMD capability.

The shaded section of FIG. 3 is a redundant slice of the EB of the SE. The EB consists of 64 processors, their respective local memories, I/O functions, and the controller functions including an interface to a host workstation 308. The EB will physically consist of a multichip module containing one Controller IC, a program memory module, 16 processor ICs, 16 local memory modules, and 16 IOMC ICs. The processor and IOMC functions are described below.

FIG. 3 also shows the connection of the processors to the image vault 320. The image vault is a large secondary storage array which may be accessed from the IOMC of each processor. In the exemplary embodiment, the image vault 320 is implemented as a distributed disk storage, having terabyte capacity at the system level and megabyte capacity at the processor level. Data transfer rates of up to 32 gigabytes per second are provided at the system level by providing a data rate of 4 megabytes per second for each processor. The image vault may be used to store relatively long image sequences or large databases.

Figure 4:
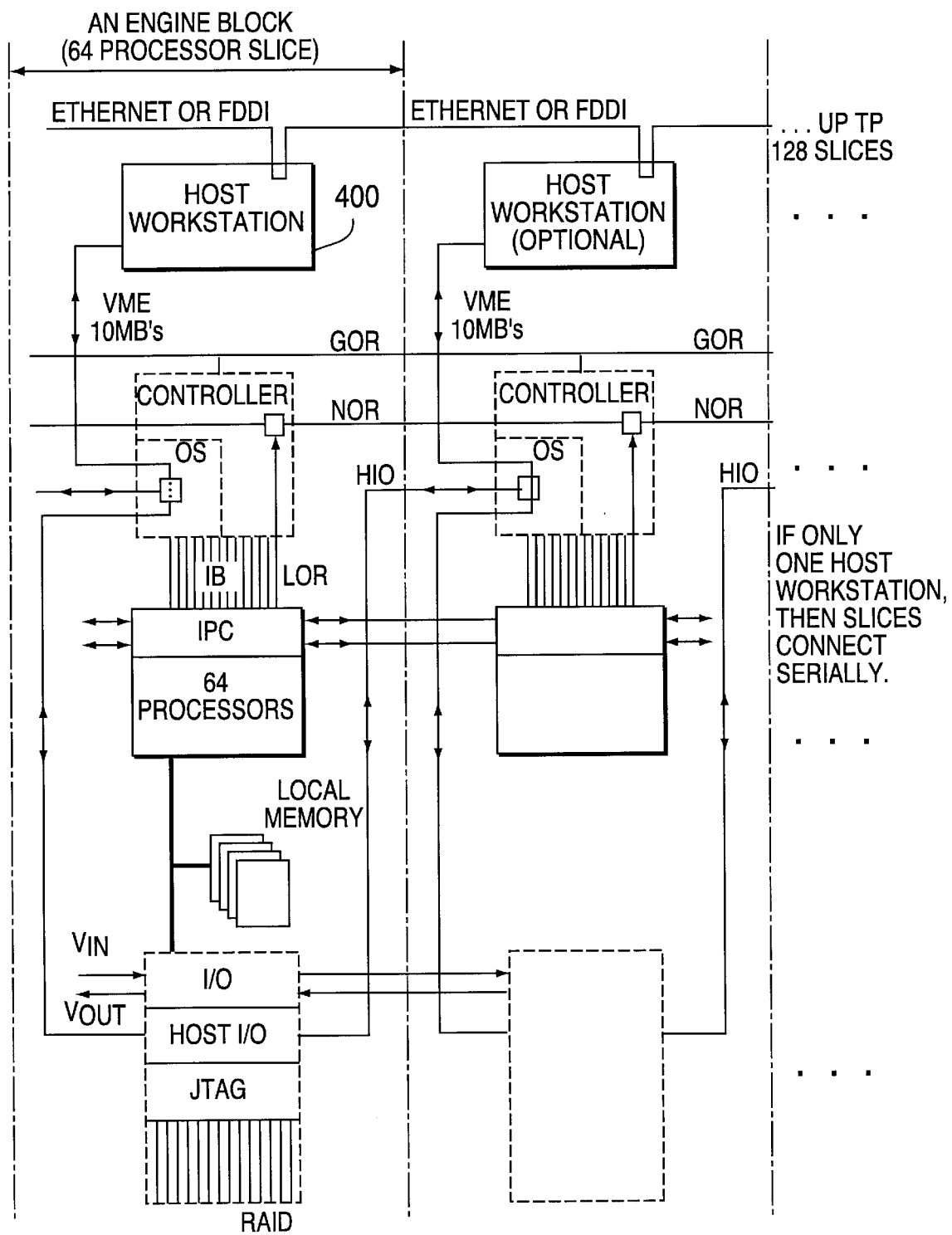
FIG. 4 is an expansion of an engine block (EB) showing the interconnection of the hosts, controllers, processors, local memories, and I/O functions of the SE.

FIG. 4 is an expansion of the EB showing the interconnection of the hosts, controllers, processors, local memories, and I/O functions for up to 128 slices. When the system is reconfigured into smaller systems, each subsystem has a host workstation 400 assigned to it, and each HIO bus remains local to its subsystem. When the full SE is used, only the leftmost host workstation/VME bus is active, and the HIO buses for each slice are connected together in serial. The global OR (GOR), local OR (LOR), and neighboring OR (NOR) buses are used for synchronizing sets of controllers.

Processors are connected to each other in a linear array via the IPC. This architecture allows for linear increases in processing power with no overhead penalty as more processors are added to the system. Fault tolerance is an important issue at the level of parallelism exploited in the SE and is provided through the approach used in the PE. In this approach, faulty processors or memories can be switched out of the system by bypass operations on the IPC.

All processors within an EB operate in a SIMD mode with a 128-bit instruction word being broadcast to the processors. Different actions can be carried out on these processors through a conditional locking capability. All processor I/O is memory-mapped and it is the responsibility of the IOMC to transfer data between the local memory and I/O sources.

Hardware support for profiling and debugging have been incorporated into the design of the SE. Each processor and controller has a dedicated profiling counter and the controller contains a debug interrupt mechanism.

Figure 5:
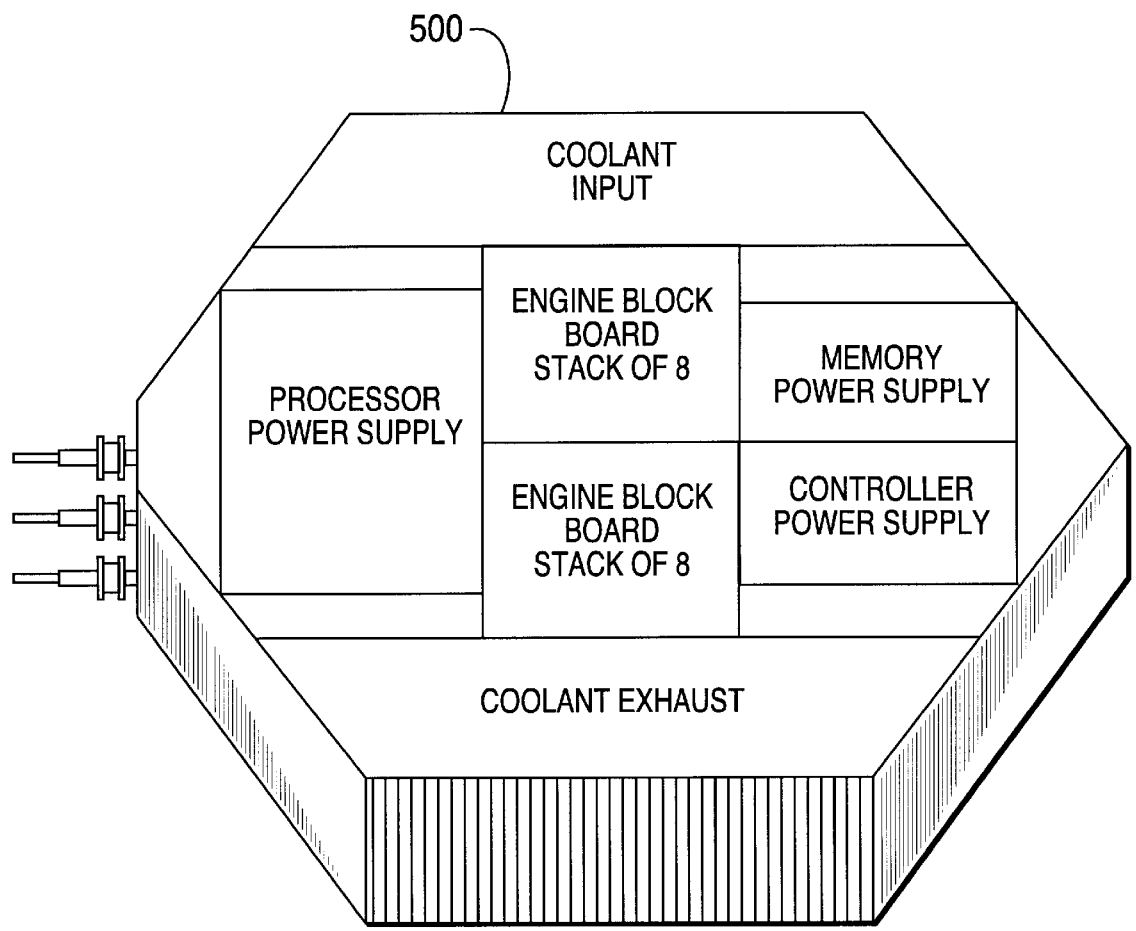
FIG. 5 illustrates the physical arrangement of system modules.

In FIG. 5 the SE is physically composed of system modules 500 that are shaped as hexagons, 20 inches to a side, and 8 inches thick. Each module 500 contains 16 EBs, associated power supplies, a coolant input, and a coolant exhaust. Each EB comprises 64 processors and their respective local memories and I/O functions, and the EB controller functions. One EB will be packaged using sixteen multichip modules using advanced memory fabrication techniques. Each system module is self contained and can function as a 1024 processor machine or as sixteen 64 processor machines. The system modules can be stacked vertically (8 high) to realize a full 8192 processor machine.

Figure 6:
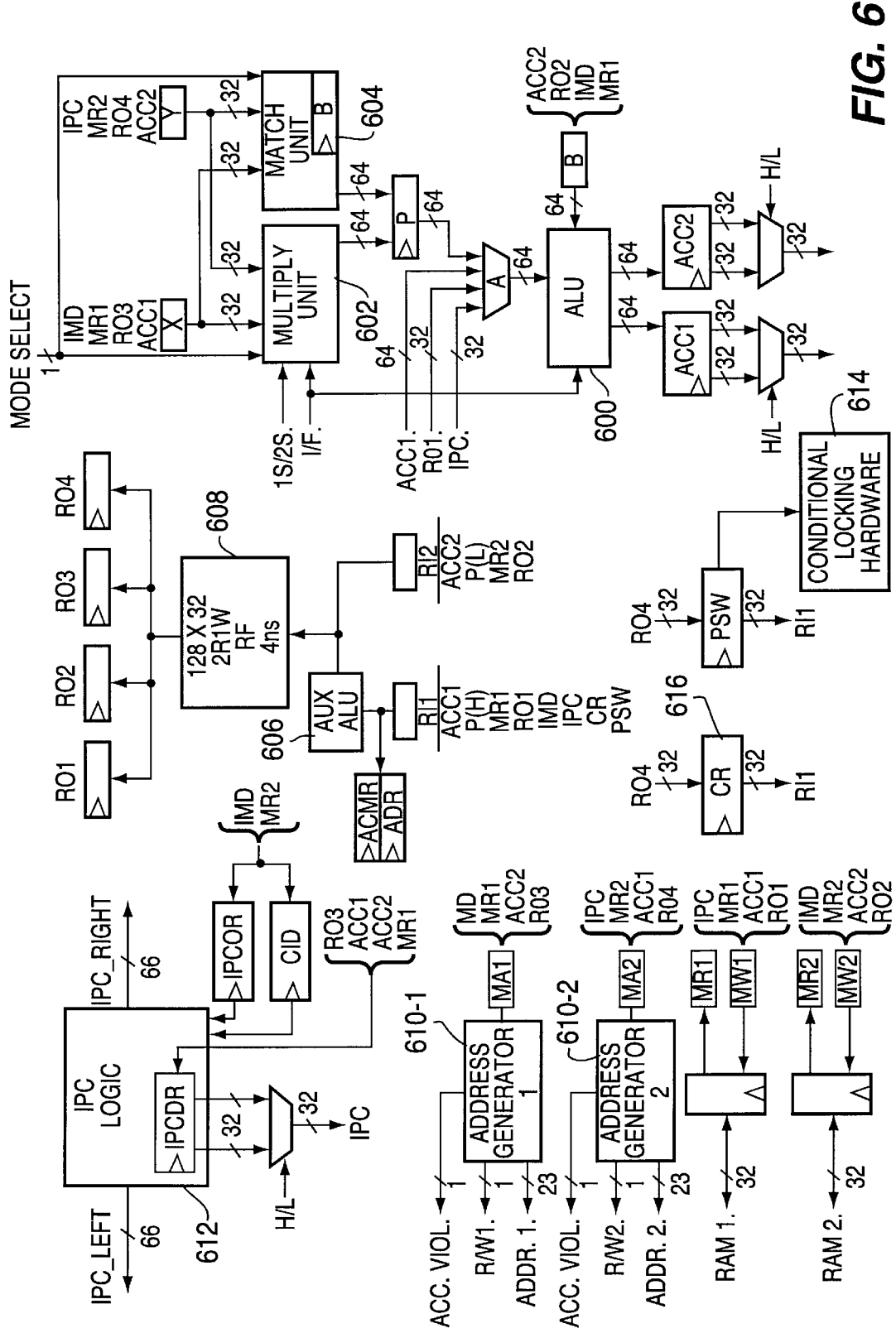
FIG. 6 shows the processor organization of the SE.

In FIG. 6 the processor for the SE may be implemented on an IC chip preferably containing 4 processors using BiCMOS technology, and has a 10 nanosecond instruction cycle. The processor operates on a 128-bit instruction word received from the controller. The instruction word specifies 15 independently programmable operations. The processor uses 32-bit data paths and registers and some data paths and registers can be paired for transferring and storing 64-bit data. Furthermore, some resources, such as the ALU, register file, and local memory can operate on 64-bit inputs.

Each processor, shown in FIG. 6, has a 64-bit ALU 600, a 32-bit multiplier 602, a 32-bit matcher 604, a 32-bit auxiliary ALU 606, a 128 word register file 608, a dual port local memory that is addressed by two address generators 610-1 and 610-2, IPC ports 612 for communicating with other processors, conditional locking hardware 614, and a dedicated profiling counter 616.

To maximize the number of operations per instruction cycle, the integer and floating point multiplier and ALU units are unified. Many processors have separate integer and floating point ALUs, and parallelism is realized since much of the computation is executed in floating point data format, while the integer ALU is used for memory addressing. Since the SE has two dedicated address generators, and since floating point and integer operations are usually not computed at the same time, the integer and floating point units were grouped together to save IC area for other resources.

The multiplier can multiply two 32-bit values and produce a 64-bit result on each instruction cycle. The multiplier supports IEEE floating point, signed and unsigned integer operations. The result is stored in the 64-bit P register, which is an input to the ALU so that products can be accumulated; this is efficient for DSP operations such as FIR filters. Alternatively, the multiplier can treat the two 32-bit input values as a 64-bit value, and load the P register with the 64-bit word. This is useful for supplying the ALU with 64-bit data.

The matching unit 604 is included in the processor design because it is ideal for data intensive operations. To economize the Processor Instruction Word, the multiplier 602 and matcher 604 share the same instruction field. The matcher 604 is a specialized hardware component that executes matching operations on 32-bit packed data. Data is packed when smaller word sizes are formatted into a single 32-bit word. The packed word size is stored in the B register legal values are 1–8, 16 and 32. The number of matches are stored in the P register, so that they may be accumulated in the ALU if necessary. The packed data matching feature is extremely efficient for comparing long data sequences stored in local memory, without the need to unpack the data.

The matcher 604 and multiplier 602 share the same data inputs, output, and instruction word field. Thus, the use of the multiplier 602 and matcher 604 are mutually exclusive; when one resource is active, the other is inactive. (The matcher 604 has a NOP instruction so the case of two inactive units is possible.)

The ALU has 32-bit and 64-bit inputs, and has two 64-bit accumulators. It supports single cycle integer and IEEE floating point (32-bit and 64-bit) operations. The accumulators are also inputs to the ALU, and can be used for storing intermediate values of a computation. The P register and accumulators serve as 64-bit inputs to the ALU; all other data sources are 32-bit sources.

ALU operations include the regular 32-bit and 64-bit arithmetic and logic operations, shifting operations, and integer/floating point conversion operations. A multiple cycle integer divide operation is also supported. There are conditional operations supported such as conditional subtraction, and Update ACC1 if Zero/NonZero (used to implement a conditional write.) Special purpose operations include a MAXMIN binary operation that stores the larger value in ACC1 and the smaller value in ACC2, find-first-zero-bit and find-first-one-bit unary operations, and absolute value.

An Auxiliary ALU (AuxALU) is used for 32-bit counting operations. The AuxALU is included in the processor design since counting operations are very common for image processing applications. A speedup of a factor of six is achieved for conditional counting operations, since the extra ALU allows the counting operations to be pipelined. The AuxALU can increment a value conditionally based on a result of the ALU (stored in the Processor Status Word). For example, counting the number of values above a threshold value is implemented by comparing values with the threshold value in the ALU, and conditionally incrementing the AuxALU count based on the ALU result.

The AuxALU is located near the RI1 port of the register file. The AuxALU has two registers: the AuxALU Data Register (ADR) and the AuxALU Condition Mask Register (ACMR). The ADR contains the AuxALU operand, and the ACMR contains the Processor Status Word mask for monitoring conditions.

A special function of the AuxALU is to decrement the ADR value and lock the processor on a zero result. This operation can be used for operations whose execution time is data dependent. As each processor finishes its operation, it decrements the value to zero, locks itself (performs NOPs), and asserts its LOR signal to signal the controller it has finished. When all processors have completed the operation and asserted their LOR signals, the controller unlocks all of the processors, and execution continues. This operation is useful for implementing loops that are dependent on local data conditions on a group of SIMD processors. The LOR is a 1-bit wire that connects the processors to the controller; the LOR signal is low until all processors assert a high signal, which then raises the LOR signal high.

A 32-bit dedicated profiling counter 616 (shown in FIG. 6) is on each processor for real-time profiling. In addition, each controller includes a dedicated profiling counter 3301 (shown in FIG. 33) which is used for real-time profiling. Profiling is usually implemented by adding additional instructions to the original program to count occurrences of events. This type of profiling is not possible in the real-time mode since some program segments are critically timed, such as communication through the IPC. The dedicated profiling counters are used to perform profiling without interfering with processor execution.

Each of the processor profiling counters 616 and the controller profiling counters 3301 is controlled by two-bits in the corresponding controller or processor instruction word to perform one of four functions: load counter value, start counter, stop counter and reset counter. The function of reading the count value from the counter is controlled as a write operation to the register which is to receive the result. In the processor instruction word formats shown in FIGS. 15a through 15d, the profiling counter control field is shown as the two-bit field PCC.

In addition, the number of instructions encountered before the profiling counters increments may be modified by setting a two-bit field in the Processor Status Word (PSW). The four states of this two-bit field may be used to cause the profiling counter 616 to increment on every instruction, or on every four, 16 or 64 instructions, respectively. The PSW is described in more detail below.

Each processor has a 128 word (32-bit words) register file (RF) 608 (shown in FIG. 6). On each instruction cycle, up to four reads and two writes can be executed, which provides the bandwidth necessary for keeping the functional units active, thereby increasing the on-chip parallelism, and reducing the memory access bottleneck. The RF 608 has two input ports (RI1, RI2) and four output ports, which are directed to the registers RO1–RO4. On each instruction cycle, two 32-bit words can be written to the RF 608 and four 32-bit words can be read from the RF 608. Register pairs [RO1,RO2] and [RO3,RO4] can also be used as 64-bit register pairs for other processor resources.

Each processor has an 8 megaword, dual port, DRAM memory. The controller refreshes the local memory via a bit in the processor instruction word. Since each processor has its own local memory, there is no contention for memory among processors. On each instruction cycle, two 32-bit word memory accesses can be executed, which doubles the memory bandwidth for processor computation, thereby reducing the memory bottleneck. A 64-bit value can be accessed by reading/writing the upper and lower words simultaneously. The memory size is large enough for a group of 64 processors to store 2 gigabytes, or 64 8K×8K images. The organization of data across local memories is the same as in FIG. 1.

Two address generators, one for each memory port of each processor, perform address arithmetic operations so that the main ALU is not used for addressing operations. The address generators have special addressing modes that eliminate the need to check and/or enforce certain conditions on array accesses, thus increasing the efficiency. The address generator performs hardware bound checking on arrays, and can compute stride updates for array accesses. Additionally, some special boundary conditions can be specified for arrays.

The address generators share 6 sets of addressing registers they are the User Base, User Limit, Base, Limit, Offset and Stride registers. The User Base and User Limit register sets delimit the local memory space used by the program for each of the 8 memory banks. All program references (with the exception of system call addresses) are relative to the User Base values, which makes the program data relocatable. An access violation signal is sent to the controller if a generated address is outside the User Base and User Limit bounds. Sixteen Base registers are used to define the starting locations for aggregate data such as arrays, tables, and records (structures), and 16 Limit registers define the data bounds. Bounds checking hardware verifies that an array access is within bounds. The 8 Offset registers and 8 Stride registers provide an efficient means for repeatedly accessing an array in regular strides. After a base-offset pair is used to compute the address of the array element to be accessed, the value of the Stride register is used to update the Offset register value, setting up the next array access.

There are 4 address arithmetic modes for array access: normal mode, modulo arithmetic mode, bounding mode, and butterfly arithmetic mode. In the normal mode, when a access is out of bounds, the Out of Bounds (OOB) bit is set in the processor status word. The modulo arithmetic mode maps an out of bound array reference to an array location using modulo arithmetic. In the bounding mode, when an array access is out of bounds, the offset value is substituted with the offset of a user-specified boundary constant. The butterfly arithmetic mode is used to generate addresses for FFT butterfly pairs, where the FFT is stored as a single dimension array.

The IPC bus interface is integrated into the processor chip for efficient, low latency communication between processors.

Each processor has conditional locking hardware that provides processors with a conditional locking execution mechanism that allows SIMD processors to execute in a MIMD manner by allowing processors to lock themselves by conditionally executing code based on local data conditions. The processor execution state is defined as 'locked' when the processor performs NOPs (no-operation) instead of the instructions being sent to it from the instruction sequencer on the controller. The processor continues to execute NOPs until the instruction to unlock is encountered in the processor instruction word. When a processor is locked, the IPC is still active, and certain bookkeeping operations are still executed by the processor to determine when it should unlock.

The instructions that lock and unlock the processor occur within a structured segment, where there is a 'begin' and 'end' statement. These segments are similar to if-then-else constructs and can be nested. Decisions to lock and unlock always pertain to the most closely nested construct. Conditional locking code involves no change in control flow. The instructions are broadcast serially from the controller, and the processors select which code to execute based on locking instructions and local data conditions. Conditional locking information is stored in the processor status word. Instructions to save and restore the context are supported for servicing interrupts, which require all processors to be unlocked.

The address generator is the processor component that computes addresses for accessing the local memory. It provides all of the basic addressing modes plus additional operations for efficiently computing regular array accesses. There are two address generators per processor; each local memory port has a dedicated address generator.

The address generators use a common set of registers to access memory. There are 8 User Base Registers (UB0–UB7), 8 User Limit Registers (UL0–UL7), 1 Bank Select Register (BSR), 16 Base Registers (BR0–BR15), 16 Limit Registers (LR0–LR15), 8 Offset Registers (OR0–OR7), and 8 Stride Registers (SR0–SR7).

The User Base and User Limit Registers are used to delimit the program data for the eight banks of local memory. Data for a program must be stored contiguously in each bank. The BSR is a three bit register used to determine which memory bank is active. The 16 BSRs and LSRs are used to delimit array data structures. All indexing into an array is relative to the BR, and the LR is used by the address generator to determine if a reference into the array structure is out of bounds. The 8 ORs are used to point at a specific location within an array, and the 8 SRs are used to update the offset value by the contents of the SR.

The address word has the following format (1) Absolute/UB-Relative Addressing, (3) Bank Select and (20) Memory Bank Address.

The address generators operate on a 23-bit address; the most significant 3 bits specify the bank of memory, and the lower 20 bits specify a word in the megaword (32-bit words) of bank memory. Since the addresses are stored in 32-bit locations, there are 9 additional bits that are not used for addressing, some of which carry additional information.

One bit is used to determine whether the address is Absolute or UB Relative to the User Base value. UB-Relative Addressing is used when accessing program data. This implementation makes the program data relocatable. An Access Violation occurs if a UB Relative address is greater than the User Limit value or less than zero. In the Absolute Addressing mode, the address is not added to the User Base value. This mode is used for accessing shared system information, which is stored in low local memory.

The address generators use the BR0–BR15 and the LR0–LR15. The base registers define starting locations for aggregate data such as arrays, tables and structures, and the limit registers define the addressing bounds of the aggregate data. This allows the hardware to perform bounds checking on each memory access at run-time. BR and LR control is constrained so that BRx must be used with LRx. Only the lower eight BR0–BR7 and LR0–LR7 can be used in base-limit-offset-stride (BLOS) operations, described below. The base registers contains a 24 bit value: 20 bits for the address, 1 bit for Absolute/UB-Relative addressing, and a 3 bit field to specify the base register memory bank. The limit registers contain a 20 bit bounding offset for the BRs.

The address generator also contains 8 21-bit offset registers (OR–OR7) and 8 20-bit stride registers (SR0–SR7). These registers provide an efficient means for repeatedly accessing an array in regular strides. After a base-offset pair (BRx, ORx) is used to compute the address of the array element to be accessed, the value of the SRx is used to update the offset register, thereby setting up the next array access. In addition to the SR0–SR7, the hardwired constants 0, +1 and −1 are available as stride values. The OR value is automatically updated by the stride register value, so if no offset update is needed, a stride of zero is specified. If the new offset value is out-of-bounds, the OOB bit is set in the processor status word (PSW). Only the lower eight BR0–BR7 and LR0–LR7 are used in BLOS operations, and the hardware control is constrained so that BRx must be used with LRx, ORx and SRx. The SRs hold a 21-bit 2s complement value, and the offset registers hold a positive 20-bit value.

As an example of the use of an SR, consider FIG. 7. In this example, the offset is initially 2 and the stride value is 3. Successive array accesses are shaded. An address is generated on every instruction cycle.

There are six addressing modes available: Immediate, Register Direct, Direct, Indirect, Base Relative, and Base Indexed. The first two addressing modes do not use the address generator.

The address generators are not used in the Immediate mode. A value is specified in the immediate field of Processor Instruction Word for use in a processor operation.

The address generators are not used in the Register Direct mode. A value is read from or written to the register file. A register direct read is executed by specifying the register file address in the RO1, RO2, RO3, or RO4 fields of the Processor Instruction Word. The contents of the specified register file location is then loaded into the appropriate ROx register. A register direct write is executed by specifying the register file address in the RI1 or RI2 fields of the Processor Instruction Word. The value at the RIx port is written to the specified register file location.

In the Direct Addressing mode, scalar data stored in the local memory is accessed by specifying the address in local memory. It is more efficient to store scalar data values in the register file, but there are situations where it is necessary to store scalar data into local memory (as in the case of register spills, or indirection, where a scalar value is pointed to by a pointer). An address is specified by specifying a displacement to the User Base Register using the Direct Source (DS). The effective address computation is Effective Address=DS+UBy.

The Indirect Addressing mode is best used for implementing pointers to data in memory. A base register is loaded with the address of the data in local memory. The upper eight BR8–BR15 should be loaded with indirect address values first, since offsets are not needed in this mode. This mode is equivalent to Base Relative Addressing with zero displacement. The effective address computation is Effective Address=BRx+UBy.

Base Relative Addressing mode is best used for structure member accesses, and random accesses into arrays (such as table lookups), where the array is not accessed in a regular pattern. A base register is loaded with the base address of an aggregate data structure, such as a structure or array. A displacement is sent via the Direct Source as the offset (DS). The upper eight BR8–BR15 should be loaded with base relative address values first, since offsets are not needed in this mode. The Address Arithmetic Mode, described below, can be used with base relative addressing. The effective address computation is Effective Address=BRx+DS+UBy.

Base Indexed Addressing mode is best used for arrays that are accessed in a regular pattern. A base register, limit register, offset register and stride register are loaded with initial values. After the effective address is generated, the offset value is updated by adding the stride value. Only the lower eight BR0–BR7 and LR0–LR7 can be used for BLOS operations. The Address Arithmetic Mode can be used with base indexed addressing. The effective address computation is Effective Address=BRx+ORx+UBy and ORx=ORx+SRx There are four Address Arithmetic Modes (AAM) that are used in conjunction with the Base Relative and Base-Indexed Addressing Modes. These special-purpose modes are used to reduce computation for common forms of array accesses. These modes are implemented in hardware to operate on a one-dimensional array in local memory. They are Modulo Arithmetic Mode, Bounding Mode, Butterfly Arithmetic Mode and Normal Mode.

The Modulo Arithmetic Mode will map an out-of bound array access into the array using modulo arithmetic. The modulo value is provided by the Limit Register Value. The Bounding Mode will provide the address of a user-specified boundary condition value when the array access is out-of bounds. The Butterfly Arithmetic Mode will generate the addresses of all butterflies for a stage of an FFT. The Normal Mode does nothing do modify an out-of-bound access.

In the Base Relative Addressing mode, the modulo arithmetic effective address is computed DS=DS modulo LRx and Effective Address=BRx+DS+UBy.

In the Base Indexed Addressing mode, the modulo arithmetic effective address is computed, and the offset is updated after the effective address is generated Effective Address=BRx+ORx+UBy where, ORx=(ORx+SRx) modulo LRx.

The modulo operation is computed as:

$$X = X - LRx \text{ if } X >= LRx$$
$$X = X + LRx \text{ if } X < 0$$
$$X = X \quad \text{otherwise}$$

In an example of the Modulo Arithmetic Mode, see FIG. 8, a two dimensional array is distributed over the processors, one column on each processor. The processor that has the data for column 30 of the array A has generated the offset 150, which is greater than the upper limit of 99 for the 100 element column. Under this mode, the limit value is subtracted from the offset to yield a new offset that is within bounds: element 50. The mode also checks to see if the offset is less than zero, and if it is, it adds the limit value to the offset to yield a new offset that is within the bounds of the array.

In the Bounding Mode, when an array access is out of bounds, the offset value is substituted with the address location of the boundary condition value. This is implemented in the following way: the default boundary-condition is stored in the location immediately following the last array location, so that it is stored at location (BRx+LRx). When an out-of bound address is detected, the address generator returns the address (BRx+LRx), which is the location of the boundary condition value.

In the Base Relative Addressing mode, the bounding mode effective address is computed as Effective Address= BRx+bound(DS)+UBy.

In the Base Indexed Addressing mode, the modulo arithmetic effective address is computed as:

Effective Address=BRx+ORx+UBy where ORx=bound(ORx+SRx).

The bound offset operation bound(X) is computed as:

$$X = X \text{ if } \quad 0 >= X > LRx$$
$$X = LRx \quad \text{otherwise.}$$

In an example of the Bounding Mode, see FIG. 9, a two dimensional array is distributed over the processors, one column on each processor. The processor that has the data for column 30 of the array A has generated the offset 120, which is greater than the upper limit of 99 for the 100 element column. Under this mode, the address [Base+Limit] is generated, which contains the constant zero. Thus, when the array element A[30,120] is accessed, the value zero is returned.

The Butterfly Arithmetic Mode is used to generate addresses for FFT butterfly pairs for an FFT whose real and imaginary components are stored as single dimension arrays.

The address generators have two modes: the address generation mode, and the setup mode for loading and writing address registers. The mode is determined by the Address Generator Mode Bit in the Processor Instruction Word. Both address generators share this bit, and so both address generators are always in the same mode of operation.

In setup mode, the 10-bit address generator field in the Processor Instruction field has the following format: (2) Read/Write Enable, NOP, (2) Direct Source Select, (3) Register Select (3) Register Number.

The 2-bit Read/Write Enable field determines whether a register is read into the address generator register file set, or written to the RAM. When a write is made to the RAM, the corresponding RAM instruction field must also specify a write. When the address generator writes a register value to the RAM, the write overrides the Write Data Select field selection in the RAM field. The 2-bit DS Select determines selects the source for loading data into the address generator register file set.

The 3-bit Register Select chooses the register set to be loaded. The register sets are: 1) UB0–UB7, 2) UL0–UL7, 3) BR0–BR7, 4) BR8–BR15, 5) LR0–LR7, 6) LR8–LR15, 7) OR0–OR7, 8) SR0–SR7.

The 3-bit Register Number field chooses which register within the set of eight is the active register.

In the address generation mode, the Processor Instruction Word has the following format:

(2) Addressing Modes
00    Direct Addressing
01    Indirect Addressing
10    Base-Relative Addressing
11    Base-Indexed Addressing
(2) Direct Source Select
(valid for Direct, Base-Relative Addressing Modes)
(2) AAM Select
(valid for Base-Relative, Base-Indexed Addressing Mode)
00    Modulo Arithmetic Mode
01    Bounding Mode
10    Normal Mode
11    Butterfly Arithmetic Mode
(2) Stride Select
(valid for Base-Indexed Addressing Mode)
00    Constant 0
01    Constant 1
10    Constant −1
11    Use stride register specified in BLOS Register Select
(3) BLOS Register Select
(valid for Base-Indexed Addressing Mode)
(4) Base Register Select
(valid for Indirect, Base-Relative Addressing Modes)

-continued

```
Bit Allocation for Address Generator Instruction format
    Direct Addr.   00        xxdd      xxxx
    Indirect Addr. 01        xxxx      bbbb
    Base-Rel. Addr. 10       mmdd      bbbb
    Base-Indexed   11        mmss      0bbb
    bbbb:   base register select
    0bbb:   BLOS select
    dd:     direct source select
    mm:     Addr. Arith. Mode select
    ss:     stride select
    xx:     not used
```

As an example of the utility of the address generators, consider the multiplication of the following two 3×3 matrices:

$$\begin{bmatrix} A1 & A2 & A3 \\ A4 & A5 & A6 \\ A7 & A8 & A9 \end{bmatrix} \times \begin{bmatrix} B1 & B2 & B3 \\ B4 & B5 & B6 \\ B7 & B8 & B9 \end{bmatrix} = \begin{bmatrix} C1 & C2 & C3 \\ C4 & C5 & C6 \\ C7 & C8 & C9 \end{bmatrix}$$

$$C1 = A1 \times B1 + A2 \times B4 + A3 \times B7$$

$$C4 = A4 \times B1 + A5 \times B4 + A6 \times B7$$

$$C7 = A7 \times B1 + A8 \times B4 + A9 \times B7$$

For efficiency, many computing systems will store the data for one matrix in row-major format and the other matrix in column-major format in order to reduce the amount of addressing computation and/or maximize cache use. However, on the SE, the matrix data can be stored in a consistent format, since the address generators have stride update capabilities. Specifically, the data for both matrices can be stored in row-major format; the first matrix (whose row is being used for the computation) would use a stride of one, while the second matrix (whose column is being used for the computation) would use a stride of three, which is the distance between elements of the same column for a 3×3 array stored in row-major format.

Figures 10, 11:
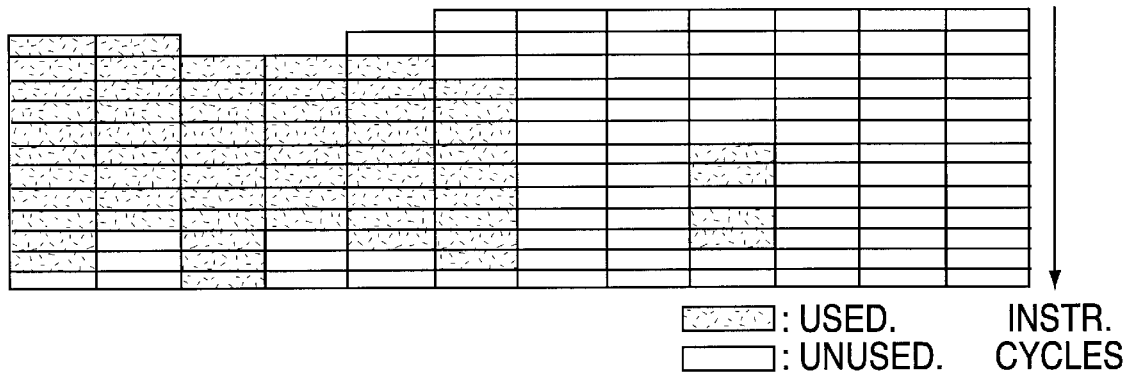
FIG. 10 is a resource usage table for the SE processor.
FIG. 11 illustrates a match example of two packed data words.

Because the address generators free up the ALU from computing address arithmetic, performance is increased. In fact, a very tightly pipelined loop is formed by the processor resources. FIG. 10 is a resource usage table which demonstrates the efficiency of the processor. The columns of the table represent resources, and the rows represent instruction cycles. A shaded entry represents usage of the resource for a specific instruction cycle. The table represents the computation for a column of the result matrix.

A pipelined computation proceeds as follows: on the first instruction cycle, the addresses for the two matrices are generated. On the next instruction cycle, the values are fetched from the local memory. These values can then be multiplied on the next cycle since the memory ports are inputs to the multiplier. The product is then accumulated on the next cycle. Elements of the result matrix are then temporarily stored in the register file. A tight pipelined computation occurs because different resources are for each stage of computation, and each resource operates independently of each other.

Using the pipelined approach above, an N×N matrix multiplication would require (N2 +4N+6) instructions. The pipelining actually reduces the computation by an order of magnitude, since a matrix multiplication requires (2N3−N2) total arithmetic operations.

The specialized hardware matcher 604 efficiently counts the number of matches between arbitrarily long data sequences. The matcher is positioned in front of the ALU so that match counts can be accumulated. The matcher shares the instruction field with the multiplier in the Processor Instruction Word. Like the multiplier, the matcher uses the X and Y data sources and the P register for storing the result. This design decision was made since multiplication operations are orthogonal to matching operations (i.e., multiplication is not needed during matching, and matching is not needed during multiplication).

The matcher operates on data sequences of packed data words. Data is packed when two or more smaller sized data words are located into a single 32-bit word. The matcher can match two 32-bit values on each instruction cycle, storing the number of packed word matches in the P register. The values stored in the P register can then be accumulated by using the P register as an input to the ALU.

The 32-bit input words are interpreted by the matcher as packed data; each 32-bit word can represent multiple words of smaller sizes. Possible match formats for the input include:

| Size of Word (bits) | Number of Words |
|---|---|
| 1 | 32 |
| 2 | 16 |
| 3 | 10 |
| 4 | 8 |
| 5 | 6 |
| 6 | 5 |
| 7 | 4 |
| 8 | 4 |
| 16 | 2 |
| 32 | 1 |

The 3, 5, 6, and 7 bit word formats have unused bits which are ignored by the matcher. The match format is defined in a setup instruction, which loads the B register (located in the matcher) with the match format. As an example, consider the two 32-bit data words presented in FIG. 11. If the B register is initialized to recognize packed words of size four, then five matches would be recorded.

The following extended example demonstrates how two sequences of packed data can be compared, and how match sequences that are not aligned on 32-bit word boundaries are handled. In this example, a short match sequence of 7 eight-bit words are used to match against a much larger sequence of data, represented by a one-dimensional array named D. The eight-bit words represent ASCII characters, and four ASCII characters can be packed into a 32-bit word. The match sequence must be compared to each 7 consecutive character subsequence of the larger D sequence. Thus, the match sequence must first be compared to characters 1:7 of D, then 2:8, 3:9, etc.

A complication arises with matching packed data sequences since the match does not necessarily begin on a 32-bit word boundary. A set of templates must be defined which represent all possible starting packed word positions within the 32-bit word. For the example presented, there are four packed words to the 32-bit word, and so the match can begin on the first, second, third, or fourth packed word within a 32-bit word of the D sequence. Thus, four match templates must be defined to cover these cases. FIG. 12 shows the set of match templates used for the 7 ASCII character sequence. The unfilled portion of the templates are initialized to a character that is not used in the D sequence to ensure that no false matches occur.

To find an exact match, each template is matched with a subsequence of D of the same size. When all of the templates have been compared to the subsequence, the match sequence comparison is shifted relative to the D sequence by a 32-bit word. This is illustrated in FIG. 13. This ensures that all character subsequences of D are matched against the match sequence. The number of matches are stored in the P register, and then accumulated by the ALU.

An exact match is found by comparing the contents of the P register to the match sequence length. This comparison is executed in the ALU, by comparing the P register contents with the match sequence length. In the example, the match result should be compared to the number 7, the number of characters in the match sequence.

The following is an example of the use of a pseudocode program for obtaining matching information on a data sequence:

```
define N 1024
    /* Number of 32-bit sequence words */
define PW 4
    /* Number of packed words per 32-bit word */
define TL 3
    /* Template Length in 32-bit words */
define LAST 2
    /* ceiling(packed word sequence length in 32 bit words) */
int D[N] is the number of 32-bit sequence words;
int M[PW*TL] holds the matching templates;
int Result[N*4] is the match result array;
int j; /* index variable to the array D */
int k; /* mod (TL*WPSW) index variable to M */
int r; /* index variable to the array Result */
j = k = r = 0;
loop(N - (TL-1)) /* number of subsequences in D */
{
    loop(PW) /* number of match templates */
    {
      mtotal = 0;
      loop(TL) /* length of template (32-bit words) */
      {mtotal = mtotal + match(D[j++], M[k++]); }
      Result[r++] = mtotal;
      j = j - TL;
    }
    j++;
}
loop(LAST) /* last few match templates */
{
    mtotal = 0;
    loop(TL) /* length of template (32-bit words) */
    { mtotal = mtotal + match(D[j++], M[k++]); }
        Result[r++] = mtotal;
        j = j - TL;
}
```

Here, the data sequence D is defined as a 1024 element integer array D, the set of match templates are stored in the 12 element integer array M, and the match results for each subsequence is stored in the 4096 element integer array Result. There are 4090 7-character subsequences within the data sequence D.

The matching code is very efficient. The innermost loop computation can be pipelined between the match unit and the ALU. The index variable computations for the three arrays can all be handled by the processor Address Generators. The index variable k uses modulo 12 addressing arithmetic (providing appropriate bounding modes, as described above, for the Address Generator), resetting to zero after accessing the eleventh element of M. Finally, all of the loops use efficient loop hardware on the controller.

The execution mechanism that provides processors with the capability of conditionally executing code based on local data conditions is now described. An overview on conditional locking will be provided, followed by a description of the processor operations, the hardware requirements for implementing conditional locking will be defined and several pseudocode examples will be presented.

The processor state is 'locked' when the processor performs NOPs (no-operation) instead of the instructions being sent to it from the instruction sequencer on the controller. Conversely, a processor is 'unlocked' when it is executing the instructions sent by the controller. When a processor locks, it executes NOPs until a command is given by the controller to unlock. When a processor is locked, the IPC is still active, and certain bookkeeping operations are still executed by the processor to determine when it should unlock.

The conditional locking mechanism is efficient for implementing conditional code in a SIMD environment. Conditional code can be executed without a change in control flow, which incurs additional instruction overhead. The decision to change the processor state is made inside a Conditional Locking Code Segment (CLCS). A CLCS is an assembly language level construct that is delimited by begin and end statements. Each CLCS is associated with a Lock ID Number (LIN). Instructions within the CLCS lock and unlock the processor based on information from the Processor Status Word (PSW), described below.

A CLCS has a form similar to the 'if-then-else' construct supported in most high level languages. There is a mutually exclusive execution condition between the 'then' statement body and the 'else' statement body either statement body can be executed by a processor, but not both. CLCSs can be nested, but cannot overlap. (If CLCS1 begins and then CLCS2 begins, CLCS2 must end before CLCS1 ends.)

The following operations are used to conditionally lock and unlock the processors:

1) Begin CLCS
2) End CLCS
3) Conditional Lock (on condition)
4) Conditional Unlock
5) Conditional Else
6) Interrupt Unlock
7) Interrupt Restore
8) NOP The Begin CLCS and End CLCS are used to delimit the CLCS. The Conditional Lock instruction locks the processor if the condition given in the instruction is satisfied. The Conditional Unlock instruction unlocks all processors that are locked on the current (most closely nested) CLCS. The Conditional Else instruction unlocks all processors that have not executed code within the current CLCS and locks all processors that have executed code within the current CLCS. The Interrupt Unlock instruction is used when an interrupt occurs, or during a context switch to unlock all processors. The Interrupt Restore is used to restore the state of the processors before the Interrupt Unlock instruction was executed.

An example of CLCS is presented to demonstrate how a CLCS is similar to an if-then-else construct:

```
if (condition1)          Begin CLCS
then                     Conditional Lock (not condition1)
    statement 1          statement 1
else if (condition2)     Conditional Else
                         Conditional Lock (not condition2)
    statement 2          statement 2
else                     Conditional Else
    statement 3          statement 3
                         End CLCS
```

The following hardware support is used by the processor to support conditional locking:
ALIN counter
    The active LIN number (ALIN) is the LIN number of the current CLCS that is being executed.

LIN register

The LIN value is the number of the CLCS on which the processor is locked. If the processor is unlocked, the ALIN and LIN are identical.

Cond register

The Cond register contains the PSW condition on which the processor locked.

C status bit

The C (Context) status bit, located in the PSW, determines the state of the processor. When the bit is set, the processor is locked, and when the bit is not set, the processor is unlocked.

X status bit

The X (Executed) status bit, located in the PSW, enforces the mutually exclusive execution of statement bodies within the CLCS. Suppressing the X bit suppresses the mutually exclusive property.

PLIN register

The Previous LIN register (PLIN) is where the LIN is stored when an interrupt occurs.

PCond register

The Previous Condition register (PCond) is where the Condition register is stored when an interrupt occurs.

PC status bit

The Previous Context (PC) status bit is where the C status bit is stored when an interrupt occurs.

PX status bit

The Previous Executed (PX) status bit is where the X status bit is stored when an interrupt occurs.

The general scheme works as follows. The value of the ALIN counter is incremented whenever a CLCS is entered, and decremented whenever a CLCS is exited. Thus, the ALIN value is equivalent to the CLCS nesting level. The ALIN value is the same on all processors, and is incremented and decremented even when the processor is locked.

A second value, called the LIN value, records which CLCS caused the processor to lock. This information is needed for the situation where there are nested CLCSs, and it must be determined if a processor locked on an outer CLCS or an inner CLCS. If a processor is unlocked, then the LIN value is the same as the ALIN value. When a processor is locked, the LIN number is less than or equal to the ALIN.

When a processor conditionally locks, the PSW is stored into the Cond register, and the LIN value no longer changes with the ALIN value. The C bit is then set in the PSW, which locks the processor.

A processor conditionally unlocks when a conditional unlock instruction is encountered in the code and the LIN value is the same as the ALIN value. Thus, the unlocking instruction always applies to the most closely nested CLCS. The processor is unlocked by one of four instructions: a Conditional Unlock, Conditional Else, Interrupt Unlock, or an End$_{13}$CLCS instruction (which signals the end of the conditional code segment).

The X bit is used to enforce a mutually exclusive execution property within the CLCS. When code is executed within a CLCS, the X bit is set on all unlocked processors. When the 'else' clause of a CLCS is executed, the X bit is used to determine which processors have not yet executed. If a processor's X bit is still not set, it has not yet executed a statement body within the CLCS.

The manner in which hardware support used to implement the above-described Conditional Locking Operations is now described. Each operation is shown with pseudocode describing the operation of the conditional locking hardware, followed by an English description of how the instruction executes.

```
Begin CLCS
    ALIN = ALIN + 1
    IF (C == 0)
        LIN = LIN + 1
        X = 0
    ENDIF
```

The ALIN is incremented (even if the processor is locked). If the processor is unlocked, the LIN value is also incremented, and the X bit is reset, since no code for the CLCS has been executed for the new CLCS.

End CLCS

IF (LIN == ALIN)

C = 0

LIN = LIN − 1

X = 1

ENDIF

ALIN = ALIN − 1

If LIN==ALIN, then the processor's C bit can automatically be reset (to unlock the processors), since the CLCS is being exited. The LIN value is then decremented. The X bit is set because if the CLCS is nested, then the processor is executing a statement body of the next innermost nested CLCS. This relationship collapses the X bit information into 1 bit, instead of a number of X bits equal to the depth of the CLCS nesting. The ALIN must be decremented unconditionally, and so it appears outside of the following IF statement."Conditional Lock (on condition)":

IF ((C == 0) AND [(condition TRUE) OR (X == 1)])

C = 1

Cond = PSW

ELSE

X = 1

ENDIF

If the processor is unlocked, and the condition is true or the X bit is set, then the processor is locked, and the PSW is stored in the Cond register. If the condition is false, then the processor remains unlocked. The X bit is then set, as a CLCS statement body will be executed.

Consider now the following IF statement. "Conditional Unlock":

IF ((C == 1) AND (LIN == ALIN) AND (X == 0))

C = 0

ENDIF

If the processor is locked and the processor is locked on the most closely nested CLCS, and the processor has not executed a statement body for the CLCS yet, the processor is unlocked. If the processor was already unlocked, this instruction has no effect.

Consider now the following IF statement. "Conditional Else":

IF ((C! = X) AND (LIN == ALIN))

C = X

ENDIF

This instruction will unlock all processors that have not executed on the current CLCS, and lock all processors that have executed on the current CLCS, providing the functionality of an 'else' statement in an 'if-then-else' statement.

The instruction for an "Interrupt Unlock" is:

PLIN = LIN

PC = C

PX = X

PCond = Cond

LIN = 0

C = 0.

This instruction saves the status of all the registers so that an interrupt can use LIN numbers without affecting the status of the program. All processors are unlocked so that they can respond to the interrupt.

The instruction for an "Interrupt Restore" is:

LIN = PLIN

C = PC

X = PX

Cond = PCond

This instruction restores the status of all the registers after an interrupt routine has finished.

Figure 14:
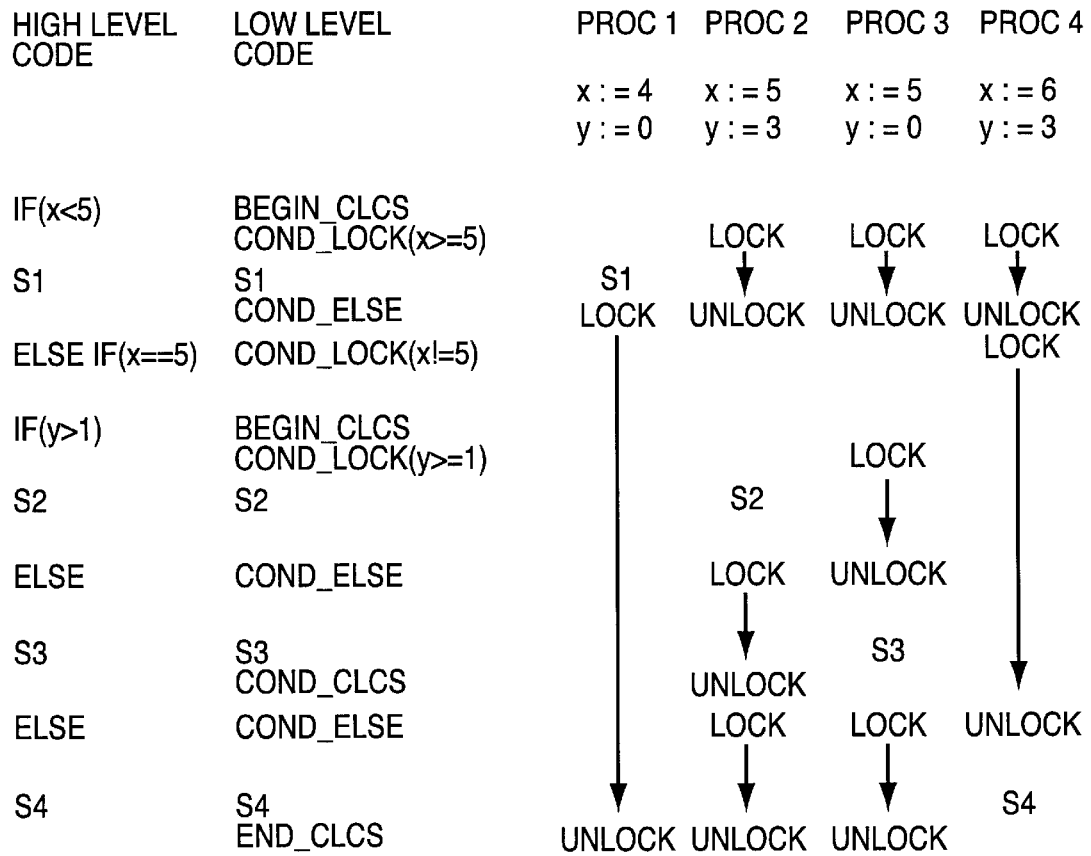
FIG. 14 illustrates an example of conditional locking.

FIG. 14 is an example of the translation from high level language pseudocode to low level code. Note that the translation is virtually one-to-one, with very little execution overhead. FIG. 14 also demonstrates how processors with different data condition execute different statements. Each processor executes a single statement Sx within the nested if statements; due in part to the Cond_Else statement, which enforces the mutual exclusion property of the conditional statement.

The processors sometimes execute code that is dependent on the data, and so they may repeat execution on an operation until a condition is satisfied. When a processor is finished executing such an operation, to provide LOR (LOR) synchronization, it will set the LOR bit in its PSW to signal the controller that it has finished the computation. When all of the processors have signalled the controller and locked, the controller will send the signal to unlock and reset the LOR bit. Execution can then proceed.

As an example, consider the case of processors computing the value XY, where the values of X and Y are different on each processor. (Y−1) multiplications are required to compute the result, but this amount varies on each processor. The controller will send code to its processors to continually multiply a partial product by X until it has received the LOR signal to continue execution. The pseudocode program for this operation is:

P = 1

Count = Y + 1

Begin_CLCS

Repeat until LOR signal received by all processors

{

Decrement-and-Lock-On-Zero(Count)

P = P * X

}

End_CLCS

Reset LOR bit

In the pseudocode for Conditional Locking/LOR synchronization operation, the Decrement-and-Lock-On-Zero is a special instruction provided by the Auxiliary ALU. This instruction decrements the value in the ADR register and locks the processor if the result is zero.

Figure 15:
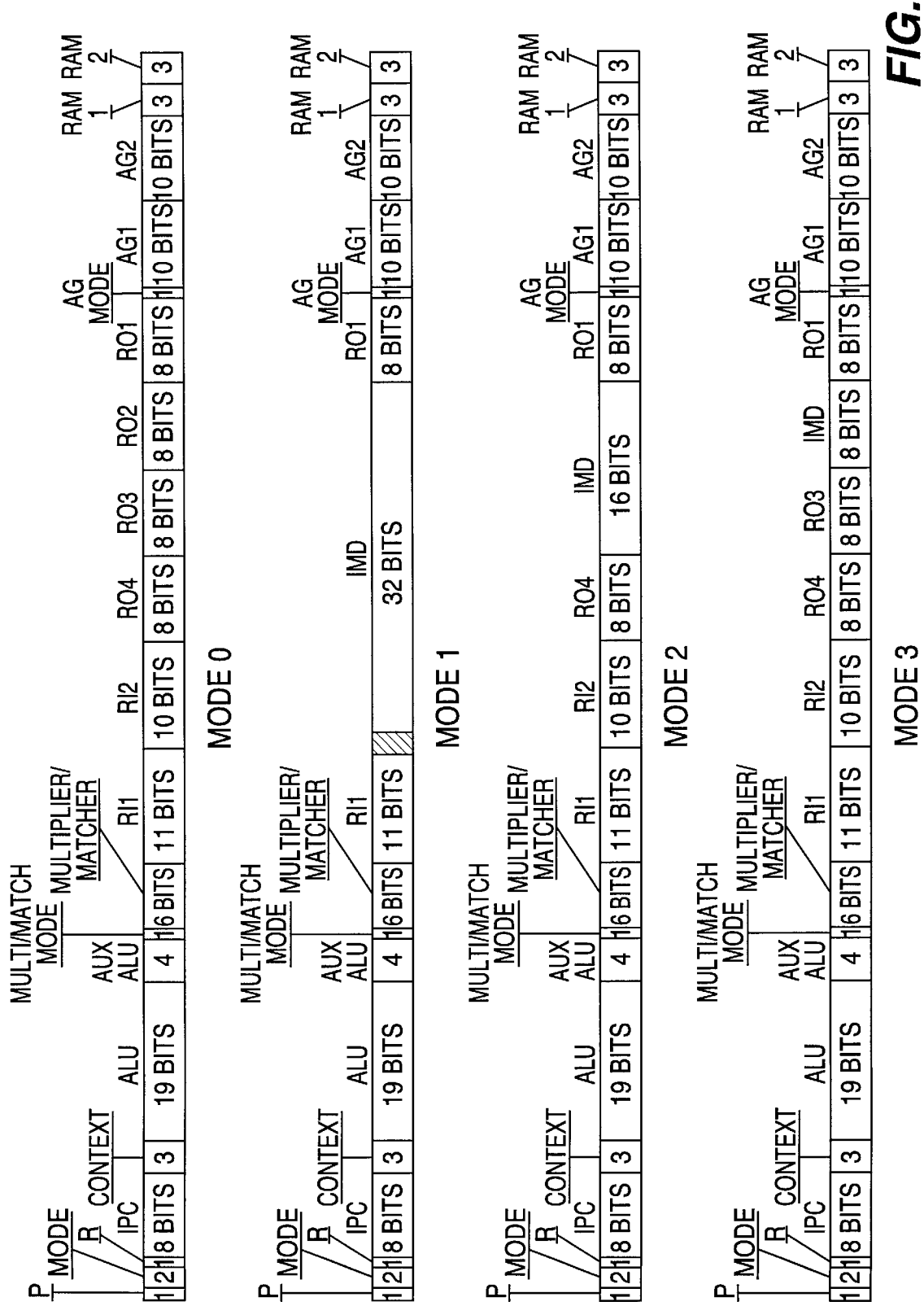
FIG. 15 illustrates 4 different modes of a processor instruction word.

In FIG. 15, the Processor Instruction Word (PIW), which is defined to be 128 bits long, is broadcast from the controller to the processors under its control. The instruction is sent as two 64-bit words which are time-multiplexed. The PIW, that has the instruction word format shown in FIG. 15, comprises a plurality of instruction fields, each of which is described below.

The P Instruction Field (1 bit) is a parity bit used for error checking. Even parity checking is implemented the total number of Is in the instruction (including the parity bit) is always even. An error in the instruction can occur during transmission from the IO controller to the processor. Note that 1-bit errors will be detected, but 2-bit errors will go undetected.

The Mode Instruction field (2 bits) selects one of four the instruction word formats Mode 0, Mode 1, Mode 2, and Mode 3 shown in FIG. 15. The only difference between these instruction modes is the size of the immediate data field in the instruction word. The space for the immediate field overlaps the instruction fields specifying the RI2 and RO2–RO4 instruction fields. Thus, specifying immediate values limits the number of data transfers with the RF 608. Several sizes of immediate fields are defined to minimize the conflict with RF 608 access.

| Mode | Immediate Field | RIx avail. | ROx avail. |
|---|---|---|---|
| 0 | None | 1,2 | 1,2,3,4 |
| 1 | 32 bit | 1 | 1 |
| 2 | 16 bit | 1,2 | 1,4 |
| 3 | 8 bit | 1,2 | 1,3,4 |

The R Field (1 bit) sends the signal to refresh the (DRAM) local memory. A description of the IPC Instruction Field (8 bits) is provided later.

The Context Instruction Field (3 bits) controls the locking and unlocking of processors. Full detail of this control mechanism is described above. There are 8 instructions that are supported for conditionally locking and unlocking processors:

1) Begin CLCS

2) End CLCS

3) Conditional Lock (on condition)

4) Conditional Unlock

5) Conditional Else

6) Interrupt Unlock

7) Interrupt Restore

8) NOP

The ALU Instruction Field format (19 bits) is:

(1) I/F Select (Common with Multiplier Instruction Field)

(8) ALU operations (2) Source A Select (2) Source B Select (1) ACC1 Enable (1) ACC2 Enable (1) ACC1 H/L Select (1) ACC2 H/L Select (2) Output Shift The ALU Instruction Field specifies the operations and data sources for the ALU. A 1 bit I/F Select specifies whether the ALU operates in integer or floating point mode. The 8 bit ALU Operation field specifies what ALU function is executed the operations are listed below. The 2 bit Source A Select specifies one of four data sources, and the 2 bit Source B Select specifies one of four data sources as ALU operands. Two 1 bit fields determine whether the ACC1 and ACC2 registers should be updated. When the ALU is not being used by an instruction, the accumulator values are preserved. Two 1 bit fields determine whether the High or Low 32-bit word of ACC1 and ACC2 are the input to some other data source. A 2 bit Output Shift field specifies a normalizing shift for the output of the ALU.

```
Data Sources for Source A and Source B:
Source A:     P         Source B:    ACC2
ACC1                                 R02
R01                                  IMD
IPC                                  MR1
ALU Arithmetic operations:
A + B
A + B + 1
A + B + Carry
A - B
B - A
COND (A - B) (if A>=B then A-B, else A)
COND (B - A)
ADDSUB (A, B)      (A+B->ACC1, A-B->ACC2)
ADDSUB (B, A)
ALU Logic operations:
A AND B
A OR B
A XOR B
ALU Unary operations:
ABS (A)
ABS (B)
1s COMP (A)
1s COMP (B)
2s COMP (A)
2s COMP (B)
PASS (A)
PASS (B)
WORD SWAP (A)
WORD SWAP (B)
FF0 (A) (Find first zero)
FF0 (B)
FF1 (A) (Find first one)
FF1 (B)
ALU Shift operations:
Shift Right (A >> B)
Shift Left (A << B)
Shift (A << B), (B is signed)
ALU Special operations:
MAXMIN (A, B)
BITR (A, B) (REVERSE(A)>>B)
SEXTEND (A, B) (sign extend A from bit B)
PACK (A, B)
BEGIN_DIVIDE
CONT_DIVIDE
END_DIVIDE
ALU Conversion operations:
INT_TO_FLOAT (A)
INT_TO_FLOAT (B)
FLOAT_TO_INT (A)
FLOAT_TO_INT (B)
ALU Setup Modes:
ALU CLIP/ NO ALU CLIP
Roundoff/Truncate
```

The Auxiliary ALU (AuxALU) Instruction Field (4 bits) specifies the operation that are executed using the AuxALU, located near the RI1 port of the register file. The AuxALU is used for (conditionally) incrementing or decrementing the data in the ADR. There is a 4-bit Operation field the AuxALU Operations are:

1) Increment Value on Condition

2) Increment Value on Inverted Condition

3) Increment Value Unconditionally

4) Decrement Value on Condition

5) Decrement Value on Inverted Condition

6) Decrement Value Unconditionally

7) Decrement Value on Condition and Lock if Value is Zero

8) Decrement Value on Inverted Condition and Lock if Value is Zero

9) Decrement Value Unconditionally and Lock if Value is Zero

10) Load ACMR

11) Load ADR

13) Write ACMR

14) Write ADR

15) NOP

In order to increment or decrement on a condition, a PSW mask must be loaded into the ACMR. If the condition specified by the mask is satisfied, the operation is executed on the value stored in the ADR. The operations to load the ACMR and ADR read the data from the RI1 port. There are operations which use the inverted condition specified by the mask, as not all the conditions are explicit in the PSW. (Many conditions are mutually exclusive, such as zero and non-zero.) The operations listed above that decrement and lock on a zero value are used for executing data dependent operations such as power (x,y) (x to the yth power). The value of y would be decremented through the AuxALU while the partial product of multiplying the x values is being computed. When the y value decrements to zero, the sets the LOR bit in the PSW and locks. When the controller receives the LOR signal, the controller sends the instruction to unlock the processors.

The Multiplier/Match Select Instruction Field (1 bit) determines whether the multiplier or the matcher is active. Both resources cannot be active at the same time, and so the instruction fields for the two resources overlap. When the instruction field specifies one resource, the other resource performs a NOP for that instruction cycle. The matcher has a NOP instruction that is specified when both resources must execute a NOP.

The Multiplier Instruction Field (6 bits) format is:

(1) Operation (2) Source X Select (2) Source Y Select (1) 1S/2S Select

A 1-bit Operation field selects the operation for the multiplier. The 2 bit fields Source X Select and Source Y Select choose one of four data sources for the X and Y source inputs into the multiplier. The 1-bit 1S/2S Select field determines whether the multiplier will operate in one's complement or two's complement format. The 1-bit I/F Select specifies whether the multiplier operates in integer or floating point mode. This bit is located in the ALU Instruction Field; the ALU and multiplier both operate in the same mode.

The multiplier can perform two operations; (as specified by the 1-bit Operation field) multiplication, or load P register direct with a 64-bit value. The Source X Select and Source Y Select fields specify the location of the upper and lower 32-bit words, respectively, that is to be loaded into the P register.

| Data Sources for Source X and Source Y: | | | |
|---|---|---|---|
| Source X: | IMD | Source Y: | IPC |
| | MR1 | | MR2 |
| | RO3 | | RO4 |
| | ACC1 | | ACC2 |

The Matcher Instruction Field (5 bits) format is:
(1) Operation
(2) Source X Select
(2) Source Y Select
(4) B Select (field is mutually exclusive with Source X, Y fields)

A 1-bit Operation field selects the operation for the matcher. The 2-bit fields Source X Select and Source Y Select choose the data sources for the X and Y source inputs. The 4-bit B Select field is mutually exclusive with the Source X and Y Select fields, and is used in the match setup instruction.

There are two operations that the matcher performs: matching, and match setup. When the matcher performs a match operation, the Source X Select and Source Y Select specify the data sources for the matcher's X and Y inputs. It can match two 32-bit values on each instruction cycle. The number of recorded matches is stored in the P register.

The matcher interprets the two 32-bit input values as packed data. Data is packed when two or more smaller sized data words are located in a single 32-bit word. The B register within the matcher selects the packed data format used by the matcher. For more information on how the matcher records matches for packed data, see the above description of an extended example on how two sequences of packed data can be compared, and how match sequences that are not aligned on 32-bit word boundaries are handled.

When a match setup operation is specified, the 4-bit B Select field specifies a value to be loaded into the matcher B register. Legal B values include 1–8, 16, 32, and B (no change). Note that if no change is specified for the B value, this means both the multiplier and the matcher are performing a NOP.

| Data Sources for Source X and Source Y: | | | |
|---|---|---|---|
| Source X: | IMD | Source Y: | IPC |
| | MR1 | | MR2 |
| | RO3 | | RO4 |
| | ACC1 | | ACC2 |

The RI1 Instruction Field (11 bits) format is:
(7) Register File Address
(1) Write Enable
(3) Write Data Source The RI I port is used to write values to the 128 word RF 608. The 7 bit Register File Address field specifies the destination RF word. The 1-bit Write Enable field determines whether or not the specified RF word is to be updated. The 3-bit Write Data Source field specifies the source of the data transfer. The following are registers/fields are sources for the RI1 port:

RI1:
ACC1 IMD
P(H) IPC
MR1 CR
RO1 PSW

The RI2 Instruction Field format (10 bits) is:
(7) Register File Address
(1) Write Enable
(2) Write Data Source The RI2 port operation is identical to that of the RI1 port, but uses an 2-bit Write Data Source field instead. The following are registers are sources for the RI2 port:

RI2:
ACC2
P(L)
MR2
RO2

The ROx Instruction Field (8 bits for each field) format is:
(7) Register File Address
(1) Read Enable The RO1–RO4 registers are used to temporarily hold values read from the 128 word RF 608. The 7-bit Register File Address field determines which word from the RF 608 is to be read into the register. The 1-bit Read Enable field determines whether or not the register is to be updated. Each of the registers RO1–RO4 are data sources for other processor components:

| RO1: | ALU(A) | RO3: | MPY(X) |
|---|---|---|---|
| | MW1 | | MA1 |
| | RI1 | | IPCDR |
| | | | CR |
| RO2: | ALU(B) | RO4: | MPY(Y) |
| | MW2 | | MA2 |
| | RI2 | | IPCOR/CID |
| | | | PSW |

The Immediate (IMD) Field (32 bits, 16 bits, or 8 bits) exists when the Mode field is nonzero, as described above. The size of the field varies with the Mode value, and the field overlaps RIx and ROx fields. The IMD field is used as input to the following sources:

| IMD: | MPY(X) | MA1 |
|---|---|---|
| | ALU(B) | MW2 |
| | RI1 | IPCOR/CID |

The Address Generator Mode Bit (1 bit) determines whether the address generator is operating in address generation mode, or in setup mode. The setup mode is responsible for loading and storing address generator register sets.

Address Generator 1, 2 Instruction Fields (10 bits for each field) have two modes, setup mode and address generation mode; the mode is determined by the Address Generator Mode Bit described above In AG mode, the Instruction Field has the following format:

(2) Addressing Modes
(2) DS Select (mutually exclusive with Stride Select field)
(2) Address Arithmetic Mode Select
(2) Stride Select (mutually exclusive with DS Select field)
(4) Base Register Select (overlaps BLOS Register Select field)
(3) BLOS Register Select A complete description of the Address Generator Instruction Field is described above in connection with the Address Generator. The DS Select for the two address generators are:

| AG1 DS: | IMD | MR1 | ACC2 | RO3 |
|---|---|---|---|---|
| AG2 DS: | IPC | MR2 | ACC1 | RO4 |

In setup mode, the Instruction Field has the following format:
(2) Read/Write Enable, NOP
(2) Direct Source Select
(3) Register Select
(3) Register Number The 2-bit Read/Write Enable field determines whether a register is read into the address generator register file set, or written to the RAM. When a write is made to the RAM, the corresponding RAM instruction field must also specify a write. When the address generator writes a register value to the RAM, the write overrides the Write Data Select field selection in the RAM field. The 2-bit DS Select selects the source for loading data into the address generator register file set.

The 3-bit Register Select chooses the register set to be loaded. The register sets are: 1) UB0–UB7, 2) User Limit Registers (UL0–UL7, 3) BR0–BR7, 4) Base Registers (BR8–BR15, 5) Limit Registers (LR0–LR7, 6) Limit Registers (LR8–LR15, 7) OR0–OR7, 8) SR0–SR7.

The 3-bit Register Number field chooses which register within the set of eight is the active register. More detail on this can be found above.

The RAM Instruction Field (3 bits for each field) format is: (1) Read/Write and (2) Write Data Select There are two independent read/write ports to the local memory, and there are two 3 bit instruction fields to independently control access to the memory. Each Random Access Memory (RAM) Instruction field controls access to the memory local to the processor. The 1 bit Read/Write field determines whether a data value is to be read from the memory, or written to the memory. If the data is being written to memory, the 2-bit Write Data Select field determines the data source whose contents are written to memory. The exception to this is when the Address Generator is in S mode and is writing to RAM.

| RAM 1 Data Sources: | IPC | MR1 | ACC1 | RO1 |
|---|---|---|---|---|
| RAM 2 Data Sources: | IMD | MR2 | ACC2 | RO2 |

The Processor Status Word (PSW) is a 32-bit register in each processor that contains information on that processor state after the execution of the last operation. Information on the result of an ALU operation, address generator, and processor state is found in the PSW.

The following ALU Status Bits (8 bits) are retained for compatibility with the PE. The two groups of eight status bits are complementary.

False (F) The bit is a constant zero.
Carry (C) The bit is set when the ALU generates a carry.
>0(GT) The bit is set when the ALU result is greater than zero.
0 (GE) The bit is set when the ALU result is >=0.
Valid (VAL) The bit is set when the ALU result is valid.
Underflow (UF) The bit is set when the ALU result underflows.
Overflow (OF) The bit is set when the ALE result overflows.
Zero (Z) The bit is set when the ALU result is zero.

The additional two bits are used for floating point arithmetic. Inexact (INE) The bit is set when a floating point result has been rounded or truncated. NotANumber (NaN) The bit is set when an a word is not a number.

The following Address Generator Status Bits (2 bits) are from the address generators. The bits are set if an array offset is outside the bounds of the array. These bits are set when the next offset is computed to be out of bounds for a BLOS addressing operation, or on the present offset for any other addressing operation. (See the above description of the Address Generators for more detail.)

OutOfBound1 (OOB1)
An array offset is outside the bounds of an array.
(from Address Generator 1)

OutOfBound2 (OOB2)
An array offset is outside the bounds of an array.
(from Address Generator 2)

Processor Conditional Locking Status Bits
The following Processor Conditional Locking Status Bits (4 bits) determine the execution state of the processor, and are used in operations that conditionally lock and unlock the processor. See above for more detail.

Context (C)
This status bit locks and unlocks the processor.

PrevContext (PC)
The context bit is stored when an interrupt occurs, so that the context can be restored afterward.

Executed (X)
This status bit is used to determine whether the processor has executed on the current LIN number. This bit is used to enforce the mutual exclusion property of conditional execution.

PrevExecuted (PX)
The executed bit is stored when an interrupt occurs, so that it can be restored afterward.

The following two bits are used to signal the sequencer.
LOR (LOR) This status bit is sent to the processor's controller to signal that an event has occurred on the processor. An example event is when a processor has signalled the controller that a data dependent operation has been completed. Alternatively, the LOR could be used as a 1-bit communication mechanism.

The following IPC Status Bits (2 bits) display status information for the processors IPC Operations (described fully later in detail).

IPC Parity Error (IPCP)
The bit is set when there is a parity error in the IPC data when IPC Mode 1 operations are being executed.

IPC Reduction (IPCR)
The bit is set when a reduction operation is needed to handle the incoming data, and an operation does not occur.

The following Image Vault Status Bit (1 bit) is used by the Image Vault (IV) to signal that it has completed loading data into the local memory.

The IV Finished (IVF) bit is set when the IV data is loaded.

Of the 32 bits, 12 bits of the status word are currently undefined.

The IPC is the primary channel through which data is transferred between processors.

The IPC has a linear array network connectivity. Data can be moved in regular communication patterns, such as data shifts, bypasses, and broadcasts, or in arbitrary one-to-one or one-to-many communication patterns. The IPC Logic on each processor also has the capability of performing reduction operations on the IPC data such as sum, min, max, and, or, or xor operations.

Since the IPC is incorporated into the processor design, there is low latency communication. Processors that are up to four processors away from each other can transfer data once per processor instruction cycle. The linear array connectivity of the IPC reduces communication to one dimension, which simplifies routing and fabrication. The IPC reduction operations provide additional functionality to the processors, increasing the on-chip parallelism. Also, there is a mode of operation (called the IPC Tagged Mode) that supports a random access read and write capability, therefore providing a virtual crossbar communication capability in the SE.

The IPC is 64 bits wide with two parity bits and can operate at 400 MHz for a throughput of 3.2 G Bytes/sec. It is implemented as dual 33-bit channels and can operate at one or four times the instruction clock speed of the processor.

The IPC operates off of two instruction sources. An 8-bit field from the PIW specifies whether or not the IPC is active, and controls the loading and storing of IPC registers. The other instruction source is the 64-bit IPC Operation Register (IPCOR), which determines the specific IPC operations to be executed by the processor. This implementation means each processor can specify a unique IPC operation. IPC operations are MIMD.

The IPC operates in one of two basic modes: IPC Mode, and IPC Tagged Mode. In the Channel mode, the 33-bit IPCs are independently programmable. Each IPC can shift the data left or right on the channel, bypass the data left or right on the channel, or broadcast data to other processors. FIG. 16a shows a right shift of the IPC. The bypass operation allows processors to be excluded from a shift operation. In FIG. 16b, processors 5, 6, and 7 are bypassed, and so processor 8 receives the data from processor 4. In the broadcast operation, the processor that is the source of the communication sends the value to the neighboring processors. These processors in turn shift the data along the channel. (FIG. 16c) Processors defined as the sink of a broadcast, such as processors 6 and 7 in FIG. 16d, do not continue to pass the data when it is received. Processor 7 is both a source and a sink of its local broadcast.

In the IPC Tagged Mode, the IPC operates as a single 66-bit channel. This mode is used to provide arbitrary one-to-one and one-to-many communication. In this mode, a tag called the Communication ID (CID) field is associated with the data. Every processor that is to be the recipient of the data loads the same CID value in its CID register (CIDR). The IPC is then shifted at the maximum speed (4 shifts/cycle), and the matching hardware in the IPC Logic loads the IPC Data Register (IPCDR) with the tagged data when its CID value matches the value in the CIDR field.

Before IPC operation, processors 0, 1, and 4 load tagged data onto the IPC, and all processors specify the tagged data to be received, as indicated in table (a) below. After the IPC operation, all processors have received the data associated with the tag specified in the CIDR, as indicated in table (b) below.

| | (a) Before IPC Operation | | | | | |
|---|---|---|---|---|---|---|
| CID tag | 5 | 20 | | | 10 | |
| Data | A | B | | | C | |
| Processor | 0 | 1 | 2 | 3 | 4 | 5 |
| CIDR | 20 | 10 | 5 | 20 | 20 | 20 |
| IPCDR | ● | ● | ● | ● | ● | ● |
| | (b) After IPC Operation | | | | | |
| Processor | 0 | 1 | 2 | 3 | 4 | 5 |
| CIDR | 20 | 10 | 5 | 20 | 20 | 20 |
| IPCDR | B | C | A | B | B | B |

In addition to the 13-bit CID field, the 66-bit IPC Tagged operation word contains a 50-bit data field, a 2-bit tag field, and an even parity bit. The 2-bit tag field is user defined, but the tag value 00 is reserved to assert that the data is invalid. The data field is user formatted, and the least significant 32-bits can be masked for IPC reduction operations. Possible uses for the additional data field bits include a return CID, so that a value can be returned to the processor originating the tagged data, or a memory address or array offset could be specified in the additional data field bits, so that the receiving processor can associate a memory location with the data being sent.

The processors are connected in a linear array via the IPC, and data is transferred between processors through the IPC. Data in the IPC can be shifted to the left or to the right. The bus can operate at two speeds: one or four shifts per instruction cycle. At the slower speed, the IPC operates at the same speed as the processors, and data is shifted from one processor to a neighboring processor in one cycle. The faster speed can shift data to four processors away in a single cycle.

The IPC has two separately controlled 32 bit channels, named Channel 1 and Channel 2, whose data can either be shifted to the left or to the right. When 64-bit data is transmitted through the IPC, Channels 1 and 2 must be programmed identically. Alternatively, two 32-bit values can be sent on the IPCs. These 32-bit values can move in the same direction or in opposite directions, as specified by the IPCOR. IPC Operations are described below.

Operations on the IPC are determined from two instruction sources. There is an 8-bit IPC Instruction Field which is specified in the PIW, and a 64-bit IPC Operation which is loaded into the IPCOR. The IPC Instruction field is common for all processors (since it appears in the Processor Instruction Word), whereas the specified IPC Operation is local to the processor.

The IPC Instruction Field (8 bits) is located in the PIW. It has the following subfields:

(1) Run/Stop (2) Load IPCDR (Preserve, Load H&L, Load L, Load H)

(2) Source Select for IPCDR (1) Load IPCOR (Preserve, Load)

(1) Load CIDR (Preserve, Load)

(1) Source Select for IPCOR, CIDR

The 1-bit Run/Stop field determines whether the IPC is active or inactive on the current instruction. The 2-bit Load IPCDR determines if and how the 64-bit IPCDR is loaded. The four modes are: Preserve contents of IPCDR, Load IPCDR(L), Load IPCDR(H), and Load IPCDR(L,H). In the last case, the low and high word of the IPCDR are loaded with the same 32-bit value. The 2-bit Source Select determines which source will be loaded into the IPCDR. The 32-bit sources are: RO3, ACC1, ACC2, and MR1. The 1-bit Load IPCOR loads or preserves the value of IPCOR. The 1-bit Load IPC CIDR loads or preserves the value of CIDR. The 1-bit Source Select for IPCOR and CIDR determines which source will be loaded. IPCOR and CIDR have common sources they are IMD and MR2.

IPC Operations (64 bits) are stored on the processor, as the operations are data and processor dependent. An IPC Operation is a 64-bit value that is loaded into the IPCOR. Each operation is actually two 32-bit operations that control the IPCs independently. The high 32 bits control IPC 1, and the low 32 bits control the IPC 2. If a 64-bit value is to be communicated through the IPC, the high and low words of the IPC operation must be identical. There are two types of operations: IPC Operations and IPC Tagged Operations.

IPC Operations are similar to the IPC operations supported on the PE. In this mode, both IPCs are separately programmable. A 64-bit value is transmitted through the IPC by programming the two channels identically. There are three types of operations: shifting, bypassing, and broadcasting.

IPC Tagged Operations are designed for arbitrary communication between a set of processors. In this mode, both IPCs must be used together to transmit a 64-bit word. The word is comprised of a message number, CID and data. The sender of data will assign a CID to the 64-bit word being sent, and all processors that receive the data must have the same CID loaded in the CIDR. In this way, one-to-one and one-to-many communication protocols can be supported. Alternatively, a processor uses its processor ID as the CID, and a range of processors are specified as recipients of the data. The data format is left up to the programmer, and can include such information as a return CID.

For IPC Tagged Operations, after the data is loaded into IPCDR, the IPC contents are shifted on each cycle for a duration of time determined by the sequencer. The sequencer has a user-programmable counter which determines the number of cycles needed to send data to its destination. Each processor compares the data that has shifted into its IPC and compares the CID of the data with the value in its CIDR. If the two CID values match and the tag bits of the word are non-zero, the 64-bit word is loaded into the IPCDR.

An IPC operation (27 bits) includes IPC operations such as shifting, bypassing and broadcasting data on the IPC. These operations independently control the IPCs, so two different operations can be executing at once. (The IPC 1 instruction is stored in the upper 32 bits of IPCOR, and the IPC 2 instruction is stored in the lower 32 bits.)

IPC operations have the following 27-bit instruction field format:

(1) Mode field (set to Channel Mode)
(1) IPCDR High/Low Select
(1) IPC Speed (1 shift/cycle, 4 shift/cycle)
(1) Enable Boundary Value
(3) Reduction Operation
(1) Left/Right Directional Bit
(2) Operation (Shift, Bypass, Broadcast, NOP)
(1) Broadcast Send
   Broadcast Send NOP
(2) Broadcast Receive
   Broadcast Receive Left Boundary
   Broadcast Receive Right Boundary
   Broadcast Receive NOP
(13) Capture Cycles
(1) Repeat Operation The 1-bit Mode field specifies the instruction is an IPC Operation. The 1-bit IPCDR H/L Select, determines whether the high or low word of IPCDR is read by other processor components. A 1-bit IPC Speed field determines whether the IPC is operating at the same speed as the processor (one shift/cycle), or at four times the processor speed (four shifts/cycle). There is a 1-bit Enable Boundary Value field which specifies whether the processor should shift its data value to the next processor. Enabling the boundary value prevents interference between several independent IPC operations that are using the IPC at the same time. The 3-bit reduction operation field is common to both modes.

IPC Operations have a one bit field to determine the direction of the IPC, which is either left or right. A 2-bit operation field determines whether a shift, bypass, broadcast, or NOP is executed. If a broadcast operation is executed, a 1-bit broadcast send field determines whether the processor is the originator of the broadcast. A 2-bit field determines how the processor is participating in the broadcast receive. A processor can either receive a data value and pass it on to its neighboring processors on the IPC, or, if one of the boundary specifications is selected, it serves as the sink of the broadcasted value. A left boundary broadcast receive specifies that the processor is the leftmost processor on the IPC to receive the data; a right boundary broadcast receive specifies it is the rightmost processor. Since there are 32 bits in an IPC Operation, 5 bits are currently unused for each channel.

Figure 16:
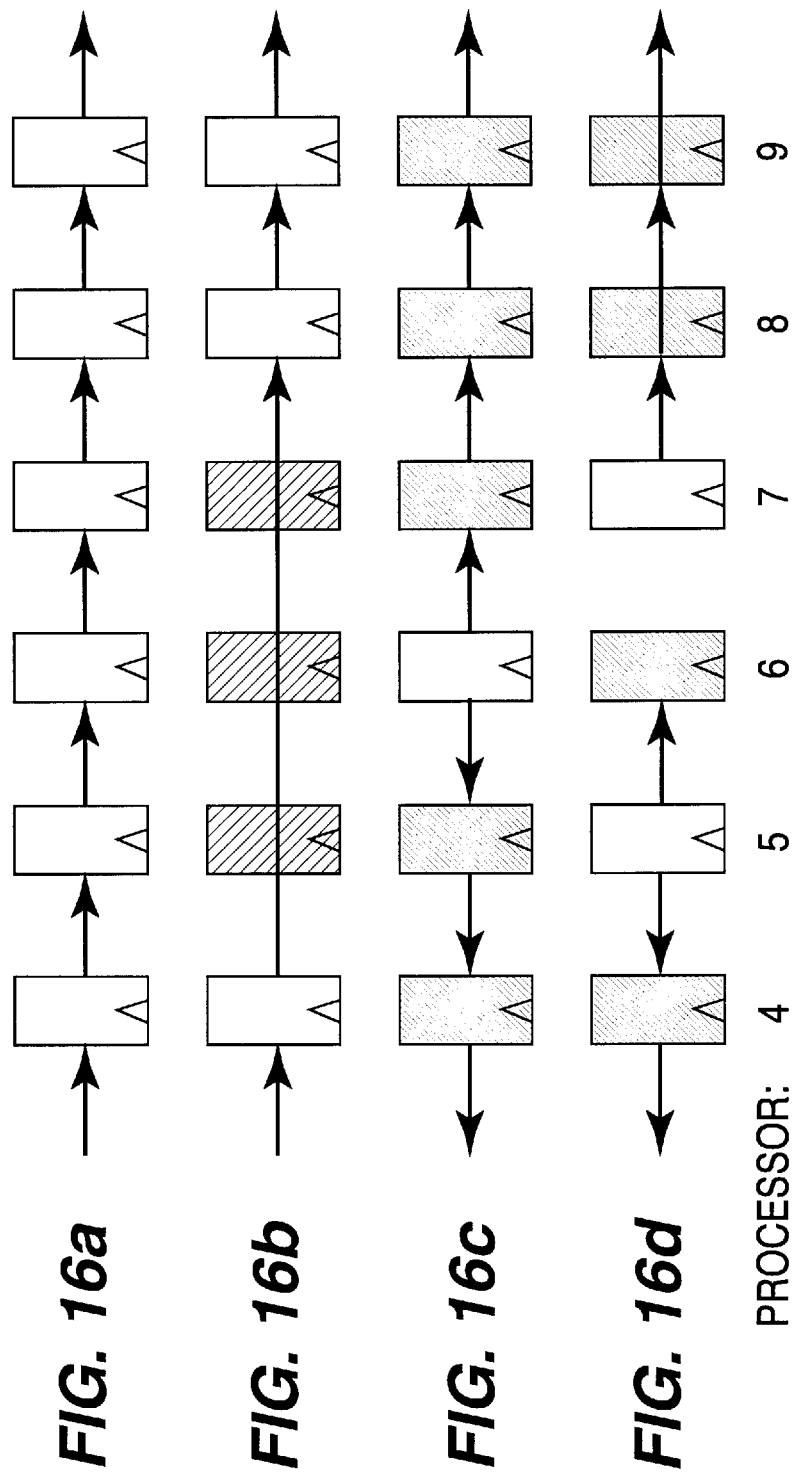
FIG. 16 illustrates 4 different examples of IPC operation.

FIG. 16 provides a few high level views of the IPC performing shift, bypass, and broadcast operations. The registers represent the IPCDR on each processor. The top picture demonstrates a right shift on the bus. The second picture demonstrates a bypass operation, where three processors have been bypassed. In this example, a bypass pattern has been specified that makes the first and fifth (counting from the left) processors logical neighbors. A single right shift from the first processor shifts the data into the fifth processor. (It must be understood that the operation is not necessarily occurring in one instruction cycle; if many processors are bypassed, it may take several instructions to shift data to the next logically connected processor.) In the third picture, the third processor from the left is broadcast its value. In the bottom picture, several processors are broadcasting. The second and fourth processors from the left are executing a Broadcast Send instruction, while the third processor is executing a Broadcast Receive Right Boundary, and the fourth processor is executing a Broadcast Receive Left Boundary; this is the way to specify sinks for the broadcast, and prevent local broadcasts from interfering with each other.

An IPC Tagged Operation (62 bits) allows arbitrary communication between a set of processors. These operations use the IPC as a single 64-bit channel. For Tagged operations, a counter in the sequencer is loaded with the number of cycles needed to complete the communication. When the counter decrements to zero, IPC communication is completed and the sequencer is signaled that the communication has been completed. A Tagged operation has two data formats; these formats determine how the CID is interpreted.

IPC Tagged operations have the 62-bit instruction field format:

(1) Mode field (set to Tagged Mode)
(1) IPCDR High/Low Select
(1) IPC Speed (1 shift/cycle, 4 shift/cycle)
(1) Enable Boundary Value
(3) Reduction Operation
(1) IPC Data Range format

(11) Left Shift Cycles×4

(11) Right Shift Cycles×4

(32) Reduction Mask

The 1-bit Mode field specifies the instruction is an IPC Tagged Operation. The 1-bit IPCDR H/L Select, determines whether the high or low word of IPCDR is read by other processor components. A 1-bit IPC Speed field determines whether the IPC is operating at the same speed as the processor (one shift/cycle), or at four times the processor speed (four shifts/cycle). There is a 1-bit Enable Boundary Value field which specifies whether the processor should shift its data value to the next processor. Enabling the boundary value prevents interference between several independent IPC operations that are using the IPC at the same time. The 3-bit reduction operation field is common to both modes.

A 1-bit IPC Data Range format specifies one of two legal data formats for interpreting CID values. There are two 11-bit fields for specifying how far the data is shifted to the left and right of the processor. The value specified is scaled by four, so specifying a one in the field means the data will be shifted four times in that direction. The 32-bit reduction mask applies to the least significant 32 bits of data in the IPCDR, and specify which bits in the word are subject to the reduction operation. There are 2 undefined bits.

In Tagged Data format 1, the CID value is interpreted as a communication ID number. Any processor that has the matching CID number in its CIDR will receive the data.

The format of the 64-bit data word on the IPC is: (1)Even Parity Bit, (13) CID field, (2) Tag bit field and (50)Data field.

In this format, a 1-bit Even Parity bit is used to detect errors. A 13-bit CID field contains the value to be matched by the destination processors. There is a user-defined 2-bit tag bit field. If the field is non-zero, then meaningful data is in the 64-bit word. (Although the tag bits are user-defined, the tag bit pattern '00' is reserved.) The 50-bit data field is for data. It is the responsibility of the programmer to decide on a data format.

One possible data format that could be used for the 50-bits is: (13) Return CID address, (32) Data. Another possible data format is: (18) Offset into an array, (32) Data (to store/read in/from the array).

An example of how communication occurs using IPC Tagged Data format 1 is shown below in Tables (a) and (b). Table (a) shows that before IPC Operation, all processors have a CID value loaded into their CIDR.

| (a) Before IPC Operation | | | | | | |
|---|---|---|---|---|---|---|
| CID tag | 5 | 20 | | 10 | | |
| Data | A | B | | C | | |
| Processor | 0 | 1 | 2 | 3 | 4 | 5 |
| CIDR | 20 | 10 | 5 | 20 | 20 | 20 |
| IPCDR | ● | ● | ● | ● | ● | ● |

The processors then put their local data into the IPCDR along with a CID tag. The bus is then shifted at a high speed, and the matching hardware tries to match the CID value in the tagged data with the value in its CIDR. If they match, the data is loaded into the IPCDR. Therefore, after IPC Operation, the result is that shown in Table (b),

| (b) After IPC Operation | | | | | | |
|---|---|---|---|---|---|---|
| Processor | 0 | 1 | 2 | 3 | 4 | 5 |
| CIDR | 20 | 10 | 5 | 20 | 20 | 20 |
| IPCDR | B | C | A | B | B | B |

If several words of data on the IPC have the same CID value, then the resulting value placed in the IPCDR is dependent on the IPC reduction operator.

In Tagged Data format 2, the CID value is interpreted as the processor number for the processor. Any processor whose processor number is defined by the CID and Range fields will receive the data.

The format of the 64-bit data word on the IPC is: (1) Even Parity Bit, (13) CID field, (2) Tag bit field, (8) Range field, (42) Data field.

A 1-bit Even Parity bit is used to detect errors. A 13-bit CID field contains the value of the processor ID. In this mode, the CID field is loaded with the processor ID. There is a user-defined 2-bit tag bit field. If the field is non-zero, then meaningful data is in the 64-bit word. (Although the tag bits are user-defined, the tag bit pattern '00' is reserved.) The 8-bit Range field specifies a contiguous range of processors (the Range value indicates that processors between [CID] and [CID+Range] will receive the data). A 42-bit Data field for data; the programmer must decide on a data format for the field.

The example shown in the following two Tables demonstrates how IPC Tagged Data format 2 works. In this example, processor 0 is going to send the data 'A' to processors 2–5. Initially, each processor puts its logical processor number into the CIDR and processor 0 specifies a CID of 2 with a range of 3, as shown in the following first Table.

| Initially: | | | | | | | |
|---|---|---|---|---|---|---|---|
| PROC: | 0 | 1 | 2 | 3 | 4 | 5 | 6 |
| CIDR: | 0 | 1 | 2 | 3 | 4 | 5 | 6 |
| Range: | 3 | ● | ● | ● | ● | ● | ● |
| Data: | A | ● | ● | ● | ● | ● | ● |
| Data ID: | 2 | ● | ● | ● | ● | ● | ● |

After the IPC operation, processors 2–5 have the correct data value, as shown in the following second Table.

| After IPC Op: | | | | | | | |
|---|---|---|---|---|---|---|---|
| PROC: | 0 | 1 | 2 | 3 | 4 | 5 | 6 |
| Received: | ● | ● | A | A | A | A | ● |

The Reduction Operation Field (3 bits) is common to both IPC and Tagged operations. It specifies a reduction operation to be performed on the data on the IPC. If the field specifies that the reduction should not occur, and it is needed, a bit in the PSW is set. There are eight reduction operations:

1) XOR
2) AND
3) OR
4) Replace
5) Max
6) Min
7) Sum
8) Sort

In Channel Mode, the data field is the 32 bit value in the IPCDR for the specified channel (Channel 1 uses the high 32 bits of IPCDR and Channel 2 uses the low 32 bits of IPCDR). In Tagged Mode, the data field is variable, and is defined by the 32-bit Reduction Mask, which is applied to the least significant 32 bits of data. The specified reduction operation is performed on the word received via the IPC bus and the IPCDR. The result of the operation is supplied to the processor as the signal IPC. In FIG. 6, the signal IPC may be written into the local memory via the address generator 610-1, stored into a register in the RF 608, applied as the Y operand of the match unit 604 or multiplier 602 or as the A operand of the ALU 600.

Data reduction operations occur as follows. A data value received by the IPC logic 612 via the IPC bus is one operand and the value held in the IPCDR is the other operand. Once the operation is performed, the result is stored in the IPCDR, replacing the original contents. Two of the operations specified above, Replace and Sort, are better understood with some explanation. By the Replace operation, the value received via the IPC bus replaces the original contents of the IPCDR. By the Sort operation, the larger operand is placed in the 32 MSB positions of the IPCDR while the smaller operand is placed in the 32 LSB positions.

The IOMC is responsible for all data transfer between the SE and all external sources. The SE is organized into cylinders; each cylinder contains a processor, local memory, and IOMC. A cylinder is organized so that the only form of communication between the IOMC and the processor is through the local memory. Thus, processor I/O is memory mapped, and it is the responsibility of the controller and the IOMC to ensure that the data transfer between external sources and local memory is executed properly.

The IOMC has connections to three main I/O Channels: a Data Input Channel (DIC), Data Output Channel (DOC), and a Host I/O Channel (HIOC); they handle data transfer between video sources, video destinations, and the host workstation, respectively. The DIC and the DOC are connected to the IOMC through processor interfaces called the Input Slice and Output Slice.

The Host I/O Bus (HIO) is a 32-bit bidirectional channel connecting the Host Workstation to the IOMCs. The channel connects the IOMCs in a linear array, with the host sitting on the left end of the HIO. The channel has a data rate of 200 MB/sec.

The DIC is a 48-bit unidirectional channel simultaneously connecting the IOMC with up to 4 Video Sources. The DIC is comprised of 4 independently controlled 12-bit serial channels, each of which operate off different clocks (as each channel could be reading a different Video Source). The DIC connects the IOMCs in a linear array, with the Video Sources sitting on the left end of the DIC. The channel transmits data from left to right on the bus. The DIC is connected to the IOMC via the Input Slice. The channel operates at a maximum speed of 86 MHz and has a data rate of 1.2 GB/sec.

The DOC is a 48-bit unidirectional channel simultaneously connecting the IOMC with up to 4 Video Destinations. Like the DIC, the DOC is comprised of 4 independently controlled 12-bit serial channels, which each operate off of different clocks (as each channel could be writing a different Video Destination). There is a mode where a DOC will operate off of the DIC clock if the video input and output channels are transmitting data in the same format and speed. The DOC connects the IOMCs in a linear array, with the Video Destinations sitting on the left end of the DIC. The bus transmits data from right to left on the bus. The DIC is connected to the IOMC via the Output Slice. The channel operates at a maximum speed of 86 MHz and has a data rate of 1.2 GB/sec.

Figure 17:
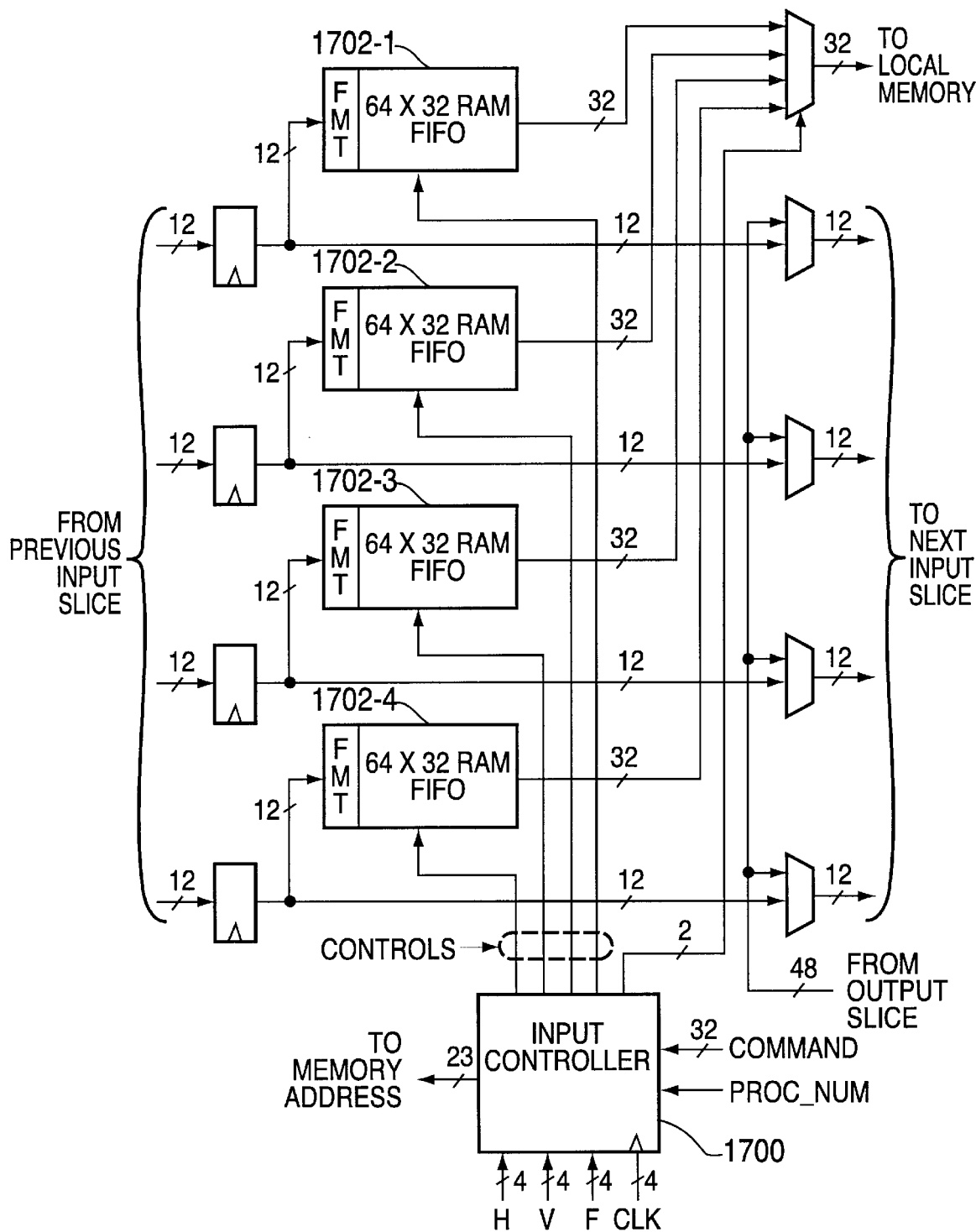
FIG. 17 illustrates input slices (4 slices per chip) of an Input/Output Memory Controller (IOMC) of the SE.

The Input Slice shown in FIG. 17, is the IOMC interface for the DIC and comprises an Input Controller 1700, four 64×32-bit FIFOs 1702-1 to 1702-4 one for each DIC, and the hardware that interfaces with the DIC. Each of FIFOs 1702-1 to 1702-4 includes a formatter (FMT) for changing the 12 bit input thereto into a 32 bit output therefrom. The data from the DIC can either be directed through the FIFO and into local memory, or it can be passed on the DIC to the Input Slice of the next IOMC on the linear array. Alternatively, data from the Output Slice of the previous IOMC can be routed into the Input Slice of the IOMC. Controller 1700 is responsible for two functions: controlling what data is loaded into FIFOs 1702-1 to 1702-4 from the DIC, and transferring the data from FIFOs 1702-1 to 1702-4 to local memory.

Figure 18:
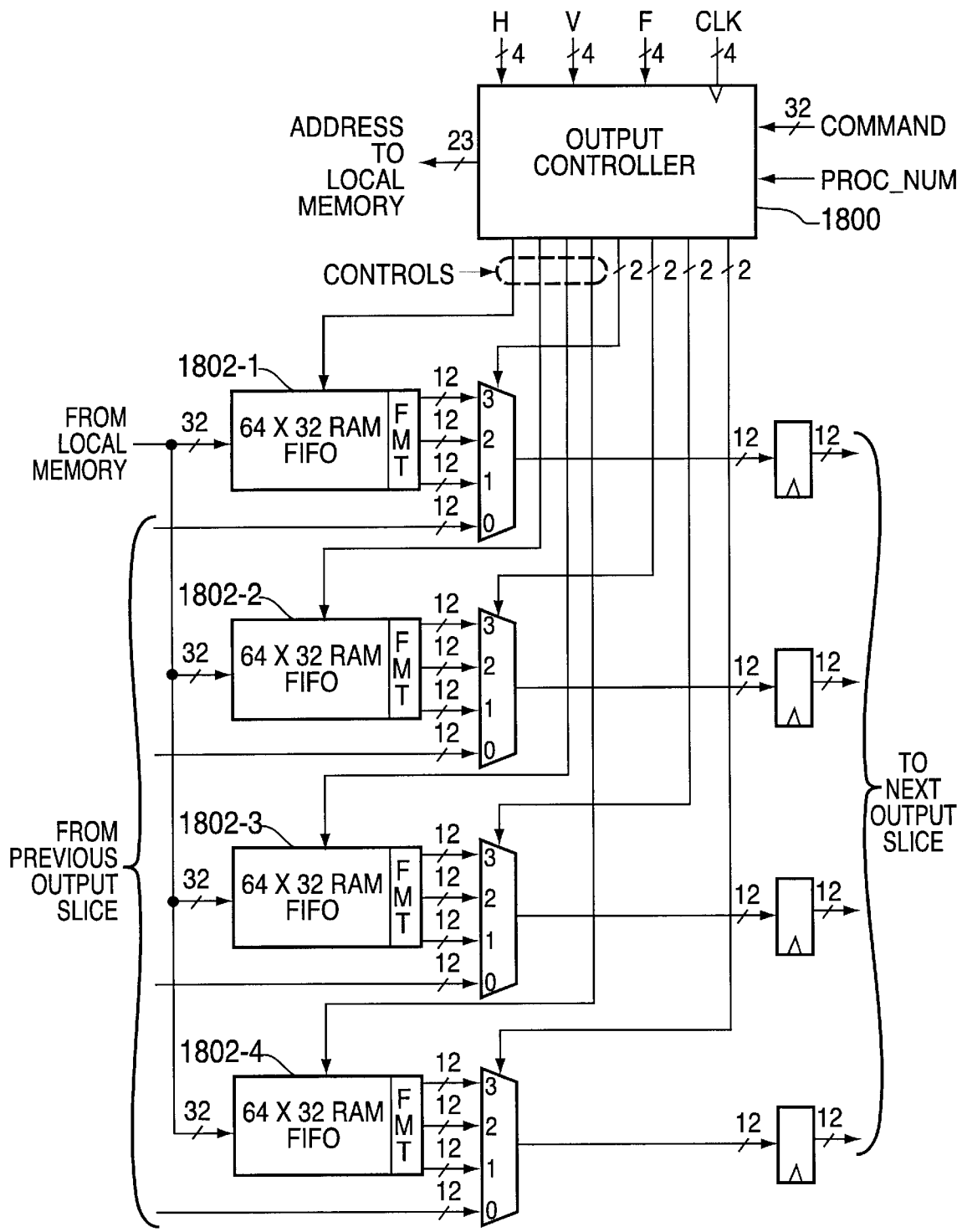
FIG. 18 illustrates output slices (4 slices per chip) of an IOMC.

The Output Slice, shown in FIG. 18, is the IOMC interface for the DOC and comprises an Output Controller 1800, four 64×32-bit FIFOs 1802-1 to 1802-4, one for each DIC, and the hardware that interfaces with the DOC. Each of FIFOs 1802-1 to 1802-4 includes a formatter (FMT) for changing the 32 bit input thereto into a 12 bit output therefrom. The data from the local memory is either be directed through FIFOs 1802-1 to 1802-4 and onto the DOC, or the data on the DOC from the previous IOMC is passed onto the next IOMC. Controller 1800 is responsible for two functions: transferring data from local memory into Output FIFOs 1802-1 to 1802-4, and sending the FWFOs 1802-1 to 1802-4 output onto the DOC.

HIO is used for non-real-time data transfer between local memory and the host workstation. It supports interactive control and modification of algorithms by the user, and activities such as program loading, input, and output. The Host channel supports scalar and vector data transfer.

Data to be transferred between the Host and memory is buffered. The buffering of data is necessary since the Host and SE operate at different clock rates, and are not tightly coupled. The Host reads and writes data to the Operating System (OS) Buffer via a VME bus, and the IOMCs read and write data to the OS Buffer via the HIO bus, a set of registers residing on each IOMC and controller that are connected in a linear array. (See FIG. 3.) Data can be shifted through the HIO bus at a rate of 200 MB/sec. The OS Board regulates the use of the OS Buffer to ensure that data is correctly transferred between the Host and local memory. More detail on the OS Buffer and OS Board are provided later.

The HIO bus is a 32-bit bidirectional bus that connects all of the IOMCs and controllers in serial. Data is written to the OS Buffer by loading data into the HIO Register (HIOR) and shifting left on the HIO bus until the data is stored on the OS Buffer. Correspondingly, a write to the IOMC is executed by reading the OS Buffer and shifting the data to the right until the data reaches the destination HIOR.

There are two types of data sent through the bus: vector and scalar data. Vector data is an array of 32-bit data the same size as the number of processors. The data is sent over the HIO bus is reverse order, so that the first data word is intended for the rightmost processor, and the last data word is intended for the leftmost processor. Thus, all the data arrives at the processors on the same cycle.

Scalar data is sent to an IOMC by specifying the destination processor ID number (PROC_NUM) in the host word sent to all of the IOMC processors and sending a single word of data onto the HIO Bus. There is no shifting in the scalar mode; the Host bus operates as a true bus that all IOMC processors monitor. Each IOMC compares the PROC_NUM of the host word with the value in its PIDR to determine if it is the destination of the scalar data.

The IOMC has a 42-bit Host Command that is received from the controller that specifies the HIO. The HIO Command has the following instruction fields:

(1) Vector/Scalar Select
(1) Host Read/Write Shift
(1) Shift Enable (Load HIOR Enable)
(13) Processor ID
(1) Memory Enable Y Hz
(1) Memory Read/Write
(23) Memory Address Field
(1) Load PIDR Enable The 1 bit Vector/Scalar Select field determines whether the data on the bus is vector or scalar. The 1-bit Host Read/Write Shift shifts the data to the left on the bus for a read by the Host, and shifts the data to the right on the bus for a write by the Host. The leftmost IOMC shifts the data to the Host on a Host Read Shift, and the rightmost processor shifts the data off of the bus, since it is the last processor. The 1-bit Shift Enable shifts data from the bus into the HIOR. A 13-bit Processor ID field is used in scalar mode to compare with the value in the PIDR. If the values match, the value is loaded into the HIOR. The 1-bit Memory Enable field enables a local memory access. The 1-bit Memory Read/Write field specifies whether the memory access is a read or a write. The 23-bit Memory Address field specifies the local memory bank and address that participates in the Host Read/Write.

The 1-bit Load PIDR Enable field only needs to be executed during SE initialization, since the PROC_NUM value is not hardwired into the cylinder. During initialization time, the host transmits the array of PROC_NUM values as vector data. (Vector data transmission does not use PROC_NUM values.) When the values are received by the HIOR, the value must be loaded into the PIDR. The Load PIDR Enable loads the PIDR with the contents of the HIOR. The PROC must also initialize itself with the PROC_NUM, and so the PROC_NUM should also be written into local memory so the PROC can read the value and initialize itself with the PROC_NUM.

Video Input is sent to the SE through the 48-bit unidirectional DIC. The DIC is actually 4 independently controlled 12-bit channels, which can each read from a different Video Input. Conceptually, the Video Inputs are on the left end of the DIC, and are connected to the leftmost IOMC processor. All IOMC processors are connected in serial by the DIC, and the rightmost IOMC is the last processor on the bus. Data moves from left to right on the DIC.

The IOMC/DIC interface is called the Input Slice, and is controlled by the IOMC Input Controller. The Input Controller performs two basic functions: it transfers data from the DIC to the Input FIFO (Video Capture), and it transfers data from the Input FIFO to the local memory (Video to Memory Transfer). Video Capture is executed autonomously, based on synchronization signals sent by the data sources. Video to Memory Transfer is executed when the Controller is interrupted by a Video Interrupt.

There are presently seven video data formats supported on the SE for representing pixels. The formats are: Composite Video, Y.C (Luminance/Chroma) (Multiplexed), Y.C (Luminance/Chroma) (Dedicated Channels), RGB (Multiplexed), RGB (Dedicated Channels), Feedback Data to be loaded into local memory is taken off of the 12-bit serial channel and packed into a 32-bit word by a formatter located before the Input FIFO. Data that has multiple fields is time-multiplexed into the formatter. The format is determined by the Input Controller. The format is changed via the Video Capture Setup Instruction.

In FIG. 19, the formatter has three Pixel formats; all of the video formats described above conform to one of the Pixel formats. Pixel format 1 is a single 12-bit data field located in the lower 12 bits of the 32-bit word. Pixel format 2 has two 12-bit data fields, filling the lower 12 bits of each 16-bit half word. Pixel format 3 has 3 data fields; two 10-bit fields and a 12-bit field, with the 12-bit field in the lower 12 bits of the word.

FIG. 20, shows the different video modes supported by the SE. In the Composite Video mode, Composite Video is sent over the 12-bit channel as a 12-bit value. The value is loaded into the low 12 bits of the 32-bit word. This is Pixel format 1, as specified by the Input Controller.

In the Luminance/Chroma (Y.C) mode, information encoded as two 12-bit values that are transmitted over the 12-bit channel. The two values are time-multiplexed by the formatter into a 32-bit word. The Luminance value is loaded into the lower 12 bits of the upper 16-bit word, and the Chroma is loaded into the lower 12 bits of the lower 16-bit word. This is Pixel format 2 as specified by the Input Controller.

In the Y.C (Luminance/Chroma, Dedicated Channels) mode (not shown in FIG. 20), the two components are given a dedicated channel. The two 12-bit values are loaded into the low 12 bits of the 32-bit word by the formatter. This is Pixel format 1 (the same format as Composite Video).

In the RGB (Multiplexed) mode, Red-Green-Blue (RGB) signals are encoded as 3 10-bit values that are transmitted over the 12-bit channel. The 3 values are time-multiplexed by the formatter into a 32-bit word. The upper 20 bits are loaded with the red and green components, and the lower 10 bits are loaded with the blue component. This is Pixel format 3 as specified by the Input Controller, with a 10-bit value loaded into the low 12-bit field.

In the RGB (Dedicated Channels) mode, each color component is given a dedicated channel. The three 12-bit values are loaded into the low 12 bits of the 32-bit word by the formatter. This is Pixel format 1 (the same format as Composite Video).

The feedback format mode is used to feed back 32-bit values. The word is decomposed into two 10-bit values and a 12-bit value. The three values are time-multiplexed by the formatter into a 32-bit word. The 12-bit value occupies the lower 12-bits of the 32-bit word, and the two 10-bit values occupy the upper 20 bits. This is Pixel format 3 as specified by the Input Controller.

The RGBa format has four 8-bit fields to represent the R, B, G, and a components of a video signal. The word is decomposed into two 10-bit values and a 12-bit value for transmission over the DIC and DOCs. The three values are time-multiplexed by the formatter into a 32-bit word. This is Pixel format 3 as specified by the Input Controller.

Figure 21:
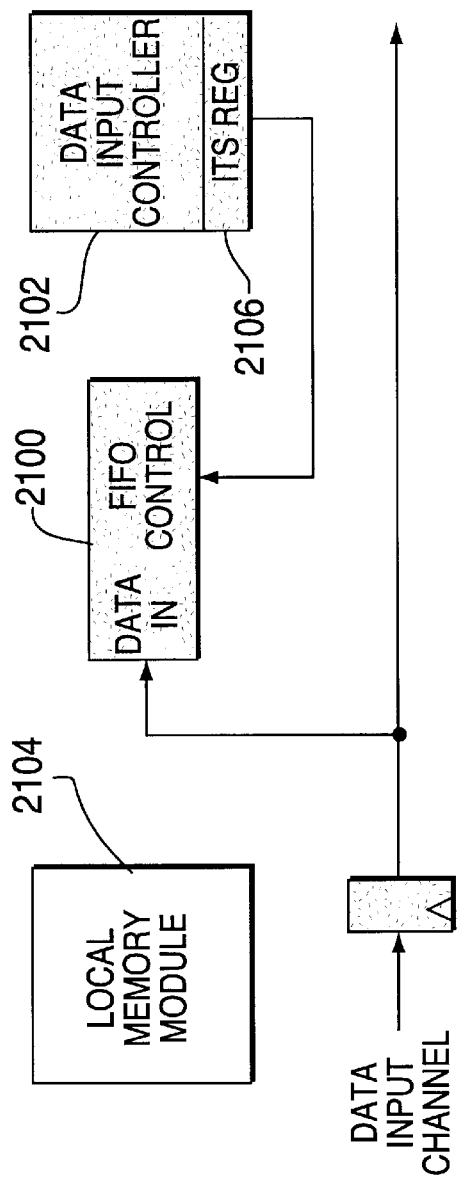
FIG. 21 illustrates data input captured by input FIFO (first-in-first-out)

In FIG. 21, Video Capture Commands are used for the process of "capturing" video data off of a DIC and loading it into input FIFO 2100. The two dimensional video input frame data must be transmitted on the Serial DIC. The frame is read into the DIC line by line and left to right, in the same way a page is read. It is the responsibility of each IOMC Input Controller 2102 to determine which pixel on the DIC is to be loaded in its local memory 2104.

The operation of capturing a pixel off of the DIC and loading it into Input FIFO 2100 is executed automatically by Input Controller 2102 independent of the Sequencer instruction stream, as video input cannot be delayed. The Input Controller uses the H (Horizontal Synchronization Signal), F (Frame Synchronization Signal) and video clock signals to determine when another pixel should be loaded from the DIC into the FIFO, along with parameters provided by the DIC Input Timing Sequence Register 2106 (ITSR). Each channel has a separate set of signals and an ITSR.

The Input Controller has a set of two counters for each channel: the Pixel Counter and Line Counter. These counters operate on the H, F, and video clock signals, and are used to determine the pixel location within a frame of video input. The Pixel Counter represents the horizontal position of the pixel on the DIC for the current line of video input. The Line Counter determines the vertical position of the pixel on the DIC for the current line of video input.

The DIC operates at the video clock signal rate, and so every time the video clock signal is asserted, another 12-bit value is clocked into the DIC Register (DICR). The Pixel Counter increments every 1, 2, or 3 video clock cycles, depending on whether the Pixel format has 1, 2, or 3 data fields. The H signal increments the Line Counter, and resets the Pixel Counter, since a new line of video has started. The F signal occurs every time a frame of video has been transmitted on the DIC. When it occurs, both the Pixel Counter and the Line Counter are reset. The F signal also signals the Frame Address Generator to change frame buffer addresses. The SE employs an arbitrary buffering scheme; the minimum number of buffers is two (double buffering), so while one video frame is being processed by the processor, the other frame is being loaded by the IOMC. A major benefit of arbitrary buffering is that it allows previous frames of data to persist for a number frames after it is loaded, which is necessary for programs that use temporal data.

The ITSR is used to determine when a pixel should be read off of the DIC and into the Input FIFO. It also specifies parameters such as how many consecutive pixels to read, and how often the reading process should be repeated.

The 27 bit DIC Input Timing Sequence Register (ITSR) format (s) is used to specify the parameters of how the data on the DIC should be read into the Input FIFOs. The register has four fields: (2) Pixel Data format, (13) Initial Pixel Position, (6) Number of Pixels, (6) Pixel Repeat Interval.

The 2-bit Pixel Data format field (described above) selects the Pixel format used by the channel formatter. This is needed to determine how often the Pixel Counter is incremented relative to the video clock signal.

The 13-bit Initial Pixel Position field determines when the first pixel is read off the DIC for each line of video input. It specifies the horizontal position of the pixel for the current line.

The value of this field is compared to the value of the Pixel Counter. When the two values match, the pixel is loaded into the FIFO.

The 6-bit Number of Pixels field determines how many consecutive pixels are to be read into the FIFO. This value is loaded into the NumPix Counter when the Initial Pixel Position matches the Pixel Counter, or when the Pixel Repeat Interval Counter (PRI Counter) decrements to zero. The NumPix Counter decrements on every Pixel Counter increment, and the Input Controller loads pixels into the FIFO until the counter decrements to zero. The H signal resets the NumPix Counter.

The 6-bit Pixel Repeat Interval field specifies how often to read in the contiguous group of pixels. When the Initial Pixel Position field is matched by the Pixel Counter value, the Pixel Repeat Interval is loaded into the PRI Counter. On each Pixel Counter increment, the PRI Counter decrements. When the PRI Counter decrements to zero, the PRI Counter and NumPix Counter are reloaded. The H signal resets the PRI Counter and NumPix Counter.

Figure 22:
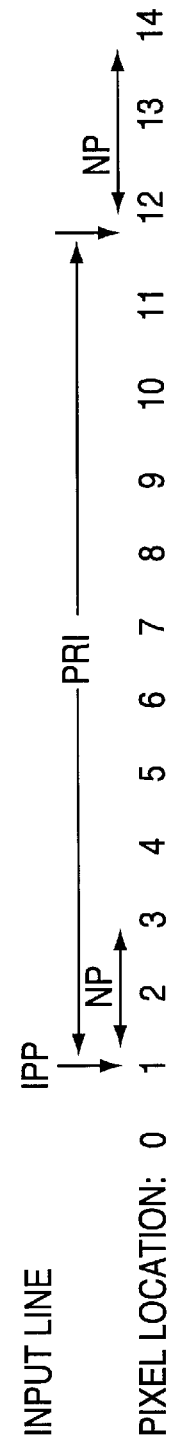
FIG. 22 illustrates an input timing sequence example.

As an example of the format of pixel input the ITSR can express, see FIG. 22. This illustration is an example where the Initial Pixel Position is 1, the Number of Pixels is 3, and the PRI is 11.

FIG. 23 shows the difference in the two problem spaces. The capability of acquiring multiple consecutive pixels is provided on the SE. On the PE, a processor could only receive one pixel, and so the problem space was distributed modulo the number of processors across the local memories. On a 1024 processor system (where a same one of the 1024 processors in FIG. 23 is indicated by a single cross-hatch, and the next one of the 1024 processors in FIG. 23 is indicated by a double cross-hatch) every 1024th column of video for a frame would reside on the same processor. Based on Scheme 1, shown in FIG. 23, the PE would have to use all of the processors of a 1024 processor system to process the first 1024 pixels of a 2048 pixel scan-line, and then use all of these same 1024 processors again to process the second 1024 pixels of this 2048 pixel scan-line. While the SE may also operate in accordance with Scheme 1, it can also operate in accordance with Scheme 2, shown in FIG. 23, where more flexibility has been designed into the system, and slices of up to 64 columns can reside on the same processor.

Figure 24:
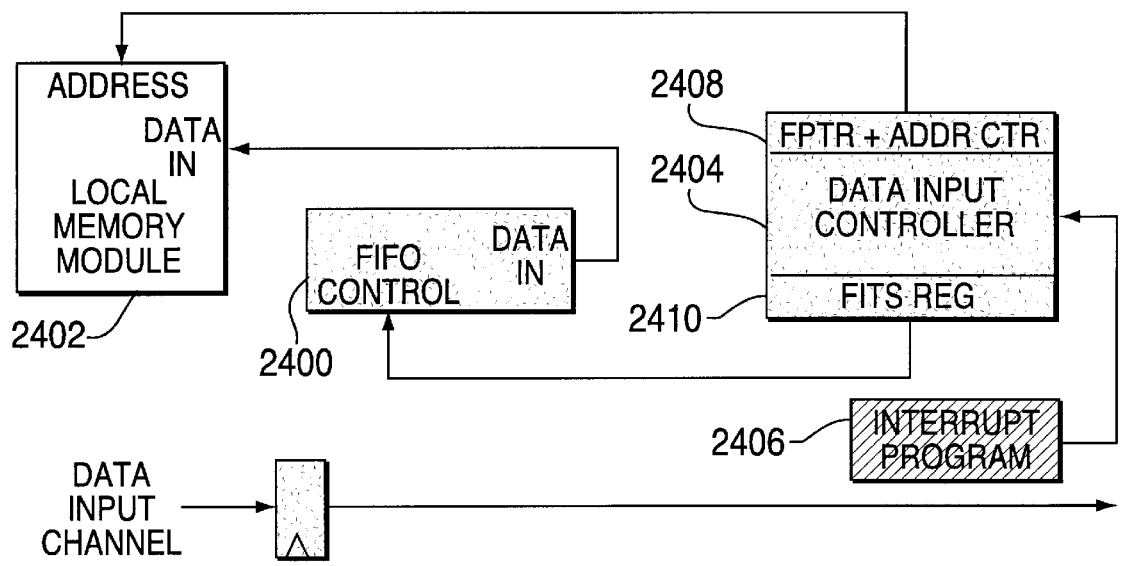
FIG. 24 illustrates the transfer of data from input FIFO to local memory.

In FIG. 24, Video to Memory Transfer (FIFO Read) shows how the contents of Input FIFO 2400 are read into local memory 2402. FIFO 2400 is loaded continually as the Video Capture command is executing. In order to store the contents of the FIFO 2400 into memory 2402, controller 2404 must be interrupted by interrupt program 2406 before initiating the memory transfer. This is executed via an interrupt, which is called every time another line of video has been clocked onto the DIC.

To determine how and where the data in the Input FIFO is to be stored in local memory, there are five registers defined for each channel. Four of these registers are used by the Frame Address Generator to generate an effective base address for the active frame buffer. As indicated, the Frame Address Generator makes use of a Frame Pointer (FPTR)+ Address Counter 2408. The fifth register is FIFO Input Timing Sequence Register 2410 (FITSR) which describes how the data is stored into the frame buffer (located in local memory).

The Video to Memory Transfer Instruction is a multi-cycle instruction; when it is executed it will transfer the specified number of pixels from FIFO 2400 to local memory 2402. The parameters for the instruction are stored in FITSR 2410, explained below. After that the Address Generation will be described.

The FIFO Input Timing Sequence Register 2410 (FITSR) format (32 bits) is used to specify the parameters of how the data in the Input FIFO should be read into local memory. The register has four fields, and a fifth field is from the ITSR: (11) Initial Frame Offset, (6) Delta Offset, (11) Modulo L, (4) Wait Cycles, (6) Number of Pixels (from ITSR).

The 11-bit Initial Frame Offset specifies where the first element will be stored in the frame relative to the frame base value. For example, if an offset of 8 were specified, the image as represented in local memory would be shifted 8 vertical lines lower than the image as it appears at the video source. The 6-bit Delta Offset specifies an additional vertical offset that should be added to the address on each operation. The 11-bit Modulo L field determines when the vertical position calculation should wrap around. The field holds the value L (for limit).

Figure 25:
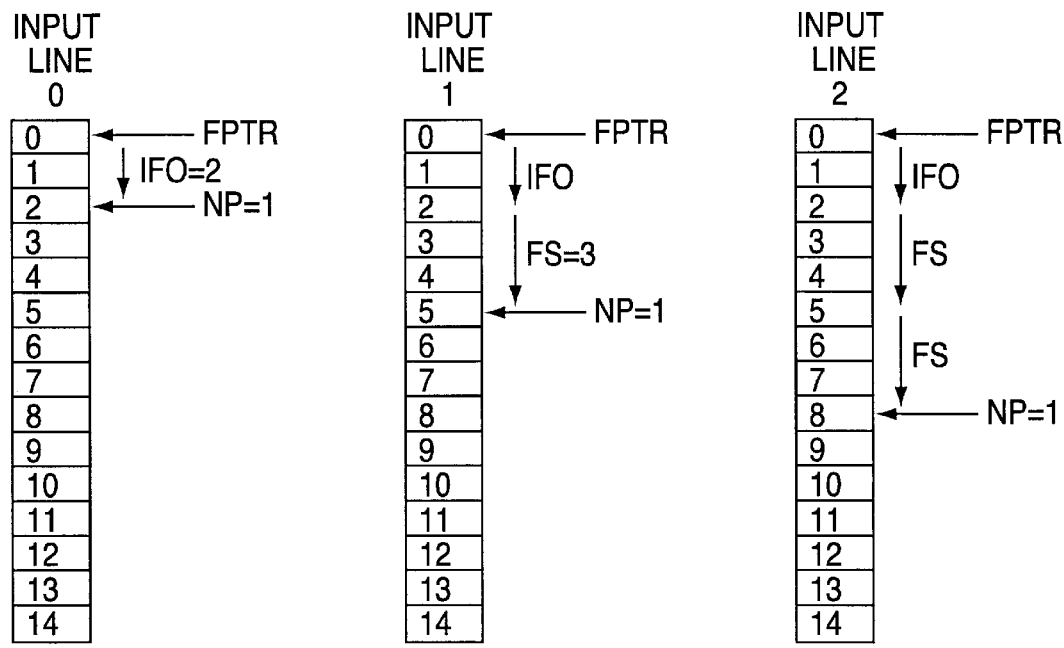
FIG. 25 illustrates a FIFO input timing sequence example.

As an example shown in FIG. 25, if the Initial Frame Offset is 2, the Delta Offset is 3, and the Modulo L value is 16, then consecutive data transfers would appear on lines 2, 5, 8, 11, 14, 1, 4, 7, 10, 13, etc.

The 4-bit Wait Cycles field is used to determine how many additional clock cycles to wait before the transfer is complete. This field is used when slow local memory is being accessed.

The 6-bit Number of Pixels field specifies how many pixels should be transferred to local memory. Since this value is always the same as for Video Capture, the parameter is not explicitly in the FITSR, although it is still a parameter for Video to Memory Transfer.

The IOMC has a single Frame Address Generator that all channels must use. Only one Frame Address Generator is needed for all of the Video Input and Output Sources, as there is only one port to local memory. Each channel has five registers: Frame Base Register (FBR), Frame Offset Register (FOR), Frame Stride Register (FSR), Frame Limit Register (FLR), Pixel Offset Register (POR).

Frame buffers for each channel are allocated contiguous memory in local memory. Each frame buffer must be the same size. The FBR and FLR specify the first and last location of the memory allocated for the frame buffers. The FSR contains the frame size. The FOR contains the offset for the active frame buffer relative to the FBR value. (A frame buffer is active when it is the buffer currently being loaded with data.) Each time another frame of data has been loaded, the address generator computes FOR=(FOR+FSR) modulo FLR to generate the next buffer offset. The base address for the active frame is computed Effective Address=FBR+FOR.

The Pixel Offset Register (POR) is used to reference locations within the active frame buffer. The POR is updated by the parameters described in the FITSR. The POR is initialized to the Initial Frame Offset each time the a new frame begins (when the F signal occurs). When the Video to Memory Data Transfer instruction occurs, the pixel offset is computed:

POR=Initial Frame Offset (first time after F signal)
POR=(POR+Delta Stride) modulo L (all other times)

The Initial Frame Offset, Delta Stride, and L values are all specified in the FITSR. The POR is also incremented once for each pixel that is transferred (specified by the Number of Pixels field).

The Effective Local Memory address for a location in the active frame buffer is computed as EA=FBR+FOR+POR.

The Video Input Operation Setup briefly describes how the ITSR, FITSR, and Frame Address Generator Registers for each channel are initialized with new values. Since all of these values are user specified, and may be processor dependent, the addressing information must come from the processor. To make the initialization and modification of these registers simple, a section of local memory is reserved. The processor writes the data to dedicated memory locations that the IOMC can read.

Since reserved memory locations would be used for the initialization, the instruction to change video parameters would be implemented as a system call. Some parameters can not and should not be specified by the user. For example, the system needs to be protected from situations such as the user trying to update parameters to a channel used by another application. Thus, a system call, which can guard against such situations, is an appropriate way to implement the video input operation setup.

Video Output is sent through the 36-bit unidirectional DOC. The DOC comprises 3 independently controlled 12-bit channels which can each write to a different Video Output. Conceptually, the Video Outputs are on the left end of the DOC, and are connected to the leftmost IOMC. All IOMCs are connected in serial by the DOC, and the rightmost IOMC is the last processor on the bus. Data moves from right to left on the DOC.

The IOMC/DOC interface is called the Output Slice, and is controlled by the IOMC Output Controller. The Output Controller performs two basic functions: it transfers data from the local memory to the Output FIFO (Memory to Video Transfer), and it transfers data from the Output FIFO to the DOC (Video Display). Memory to Video Transfer is executed when the Sequencer is interrupted by a Video Interrupt. Video Display is executed autonomously by the Output Controller, based on synchronization signals sent by the output data channel source.

The Video and Pixel formats are defined in detail above. There are seven video data formats supported: Composite Video, Luminance/Chroma, Luminance/Chroma (Dedicated Channels), RGB, RGB (Dedicated Channels), RGBa and Feedback.

Video Data located in the Output FIFO is packed into 32-bit words. When the FIFO receives the signal from the Output Controller to, send the data onto the 12-bit serial DOC, a formatter located in the Output FIFO unpacks the data (according to the Pixel format specified by the Output Controller) and time demultiplexes the data onto the DOC. This Pixel formatter of the Output FIFO performs the inverse operation of the Pixel formatter located in the Input FIFO, described above.

Video Display Commands describes the process of displaying video data by outputting pixels to the DOC. The complexity arises in that the two dimensional video output frame must be transmitted over the serial DOC. The pixels are being clocked onto the DOC line by line and left to right, in the same way a page is written. It is the responsibility of each IOMC Output Controller to determine when the pixel in the Output FIFO is to be clocked onto the DOC.

Figure 26:
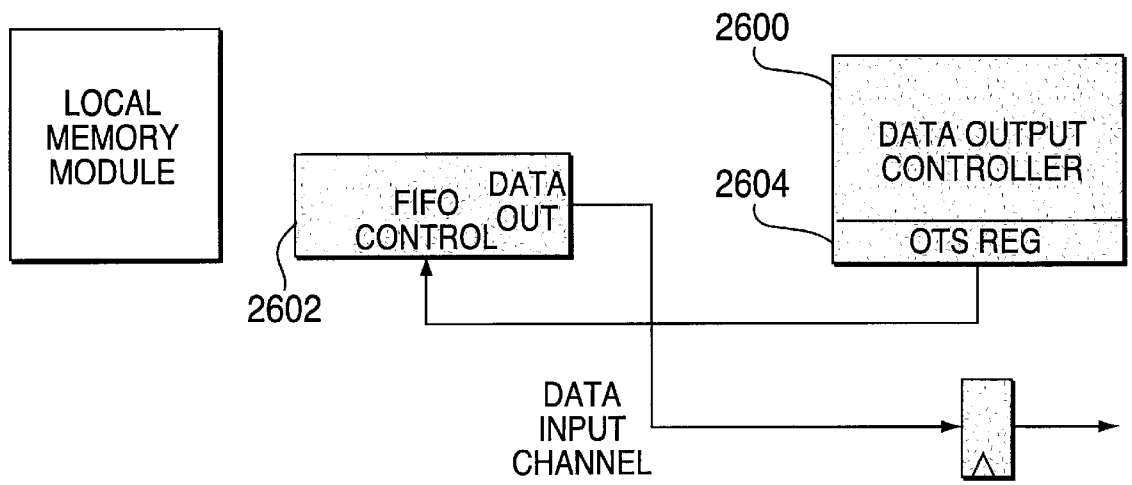
FIG. 26 illustrates the loading of a data output channel with output FIFO data.

In FIG. 26, the operation of writing the contents of FIFO 2600 onto the DOC is executed automatically by Output Controller 2602 independent of the Controller instruction stream, as video output cannot be delayed. Output Controller 2602 uses the H, F and video clock signals to determine when another pixel in Output FIFO 2600 is written to the DOC, along with parameters specified in DOC Output Timing Sequence Register 2604 (OTSR).

Output Controller 2602 has a set of three counters for each channel that increment on the H, F, and video clock signals; these counters determine the pixel location within an output frame of video. The Pixel Counter represents the horizontal position of the pixel on the DOC for the current line of video output. The Line Counter determines the vertical position of the pixel on the DOC for the current line of video output.

The DOC operates at the video clock signal rate, and so every time the video clock signal is asserted, another 12-bit value is clocked onto the DOC. The Pixel Counter increments every 1, 2, or 3 video clock cycles, depending on whether the Pixel format has 1, 2, or 3 data fields. The H signal increments the Line Counter, and resets the Pixel Counter, since a new line of video has started. The F signal occurs every time a frame of video has been completed. When it occurs, both the Pixel Counter and the Line Counter are reset. The F signal also signals the Frame Address Generator to change frame buffer addresses. The SE employs an arbitrary buffering scheme; the minimum number of buffers is two (double buffering), so while one video frame is being processed by the processor, the other frame is being displayed.

OTSR 2604 is used to determine when a pixel should be loaded onto the DOC from Output FIFO 2600. It also specifies parameters such as how many consecutive pixels to write.

The DOC Output Timing Sequence Register (OTSR) 2604 (27 bits) is used to specify the parameters of how the data in the Output FIFO 2600 should be written to the DOC. It has the same format as the ITSR. The register has-four fields: (13) Initial Pixel Position, (6) Number of Pixels, (6) Pixel Repeat Interval.

The 2-bit Pixel Data format field selects the Pixel format used by the channel formatter. This is needed to determine how often the Pixel Counter is incremented relative to the video clock signal.

The 13-bit Initial Pixel Position field determines when the next pixel in the Output FIFO will be loaded onto the DOC after an H signal has occurred. It specifies the horizontal position that the pixel will have in the video output frame. The value of this field is compared to the value of the Pixel Counter. When the two values match, the pixel is loaded onto the DOC.

The 6-bit Number of Pixels field determines how many consecutive pixels are to be loaded onto the DOC. This value is loaded into the NumPix Counter when the Initial Pixel Position matches the Pixel Counter, or when the Pixel Repeat Interval Counter (PRI Counter) decrements to zero. The NumPix Counter decrements on every Pixel Counter increment, and the Output Controller loads pixels onto the DOC until the counter decrements to zero. The H signal resets the NumPix Counter.

The 6-bit Pixel Repeat Interval field specifies how often write a consecutive number of pixels to the DOC. When the Initial Pixel Position field is matched by the Pixel Counter value, the Pixel Repeat Interval is loaded into the PRI Counter. On each Pixel Counter increment, the PRI Counter decrements. When the PRI Counter decrements to zero, the PRI Counter and NumPix Counter are reloaded. The H signal resets the PRI Counter and NumPix Counter.

The OTSR specifies the same type of pixel output formatting as the ITSR. The only difference is that the inverse operation is being executed.

Figure 27:
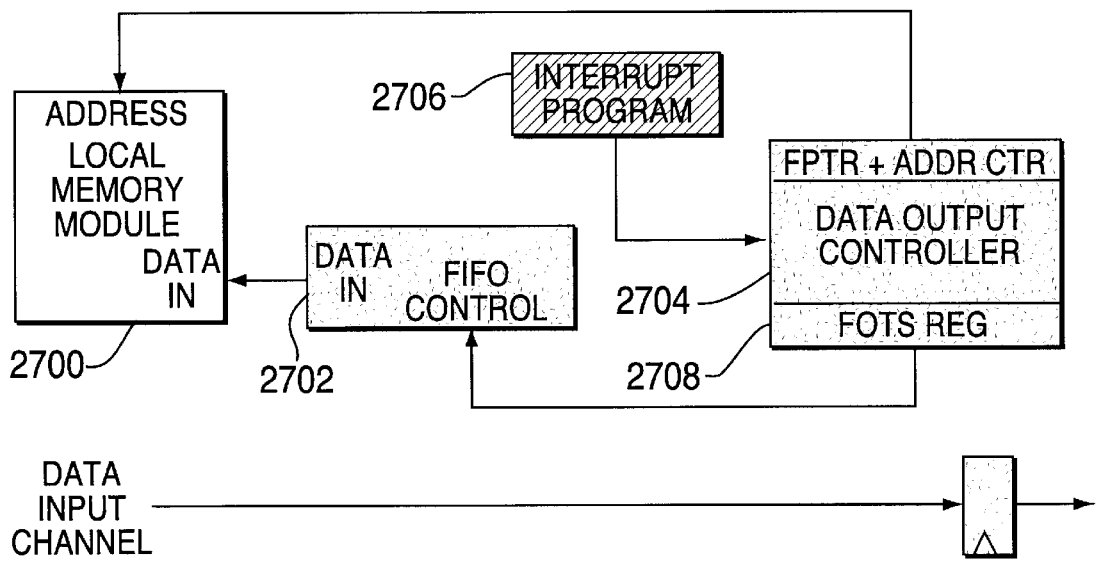
FIG. 27 illustrates the transfer of data from local memory to output FIFO.

In FIG. 27, there is shown how local memory 2700 is written to Output FIFO 2702 in Memory to Video Transfer (FIFO Write). FIFO 2702 is continually being emptied as the Video Display command is executing. In order to load the contents of memory into Output FIFO 2702, Controller 2704 must be interrupted by interrupt program 2706, and then the memory transfer can proceed. This is executed via an interrupt, which is called every time another line of video is ready to be clocked onto the DOC.

To determine which data in local memory 2700 is to be loaded into Output FIFO 2702, and in what order it is to be loaded, there are five registers defined for each channel. Four of these registers are used by the Frame Address Generator to generate an effective base address for the active frame buffer. The fifth register is the FIFO Output Timing Sequence Register 2708 (FOTSR), which describes how the data is read from the frame buffer (located in local memory).

The Memory to Video Transfer Instruction is a multi-cycle instruction; when it is executed it will transfer the specified number of pixels from local memory 2700 to the Output FIFO. The parameters for the instruction are stored in the FIFO Output Timing Sequence Register 2708 (FOTSR), explained below.

The FIFO Output Timing Sequence Register (FOTSR) format (32 bits) is used to specify the parameters of how the data in the Output FIFO should be read into local memory. It has the same format as FITSR 2410. The register has four fields, and a fifth field is from OTSR 2604: (6) Delta Offset, (11) Modulo L, (4) Wait Cycles, (6) Number of Pixels (from OTSR).

The 11-bit Initial Frame Offset specifies an additional vertical offset to be added to the frame when displaying the image. For example, if an offset of 8 were specified, the output image would be displayed eight lines lower on the video output destination than it appeared in local memory.

The 6-bit Delta Offset specifies a vertical offset that should be added to the address on each operation. If the Delta Offset of 2 is given, then the first transfer would have a vertical offset of zero, the second offset would have a vertical offset of two, the third would have a vertical offset of four, etc.

The 11-bit Modulo L field determines when the vertical position calculation should wrap around. The field holds the value L (for limit). For example, if the Initial Frame offset is zero, the Delta Offset is 4, and the Modulo L value is 15, then consecutive data transfers would appear on lines 0, 4, 8, 12, 1, 5, 9, 13, 2, 6, etc . . . .

The 4-bit Wait Cycles field is used to determine how many additional clock cycles to wait before the transfer is complete. This field is used when slow local memory is being accessed.

The 6-bit Number of Pixels field specify how many pixels should be transferred to the Output FIFO. Since this value is always the same as for Video Display, the parameter is not explicitly in the FOTSR, although it is still a parameter for Memory to Video Transfer.

The Video Output Operation Setup briefly describes how the OTSR, FOTSR, and Frame Address Generator Registers for each channel are initialized with new values. Since all of these values are user specified, and may be processor dependent, the addressing information must come from the processor. To make the initialization and modification of these registers simple, a section of local memory is reserved. The processor writes the data to dedicated memory locations that the IOMC can read.

Since reserved memory locations would be used for the initialization, the instruction to change video parameters would be implemented as a system call. Some parameters can not and should not be specified by the user. For example, the system needs to be protected from situations such as the user trying to update parameters to a channel used by another application. Thus, a system call, which can guard against such situations, is an appropriate way to implement the video output operation setup.

The feedback capability of the SE, in which data in the output FIFO 2600 may be written to the data output channel (DOC) and then read into the input FIFO 2400 allows the SE to manipulate the data in memory without involving the other parts of the processors. FIGS. 27a through 27i illustrate this process for two memory operations, one of which rotates an array of values and another which transposes an array of values.

The basic memory organization is illustrated in FIG. 27a. For the sake of simplicity, only four processors (0 through 3) are shown, each addressing four memory locations. In this Figure, the four memory locations are addressed by each processor using offsets of 0 through 3. The examples which follow allow for P processors to operate on an N by N matrix of values. Thus, in FIGS. 27a through 27i, both N and P are equal to four.

To implement an array transpose operation, the FOTSR, OTSR, FITSR and ITSR registers are set up as follows. In the FOTSR re the Initial Frame Pointer Offset field is set to (P+1) modulo N; the Delta Offset field is set to +1; the Modulo L field is set to N; the Wait Cycles field is set to 1; and the Number of Pixels field is set to 1. In the OTSR register:

the Initial Pixel Position field is set to P; the Pixel Repeat Interval field is set to N; and the Number of Pixels field is set to 1. These registers control the output FIFO to provide values to the data output channel (DOC) from the array in the order shown in FIG. 27b.

In the FITSR register: the Initial Frame Pointer Offset field is set to (P−1+N) modulo N; the Delta Offset field is set to −1; the Modulo L field is set to N; the Wait Cycles field is set to 1; and the Number of Pixels field is set to 1. In the ITSR register: the Initial Pixel Position field is set to (P−1+N) Modulo N; the Pixel Repeat Interval field is set to N and the Number of Pixels is set to 1. These registers control the input FIFO to store data values from the DOC into the array in the order shown in FIG. 27b. FIGS. 27d and 27e show the pixels a through p in the memory array before and after the array transpose operation, respectively.

Another useful memory operation is the array rotate operation. In this operation, the contents of the array are reconfigured as if the array were rotated by 90°. To implement the array-rotate operation, the FOTSR register is set such that the Initial Frame Pointer field is P, the Delta Offset field is +1, the Modulo L field is N, the Wait Cycles field is 1, and the Number of Pixels field is 1. The OTSR register is set such that the Initial Pixel Position field is P, the Pixel Repeat Interval is N, and the Number of Pixels is 1. These registers cause the output FIFO 2600 to provide values from the array to the DOC in the order shown in FIG. 27f.

To complete the operation, the FITSR register is set such that the Initial Frame Pointer Offset field is (N−P−1), the Delta Offset field is +1, the Modulo L field is N, the Wait Cycles field is 1 and the Number of Pixels field is 1. The ITSR register is set such that the Initial Pixel Position field is (N−P−1), the Pixel Repeat Interval field is N, and the Number of Pixels field is 1. Using these values, the input FIFO 2400 stores data values into the array from the DOC in the order shown in FIG. 27g. The result of this operation is to translate the data values a through p, shown in FIG. 27h into the rotated positions shown in FIG. 27i.

It is contemplated that other configurations of the registers which control the input and output FIFOs 2400 and 2600 may be used to produce other remapping operations.

Figure 18A:
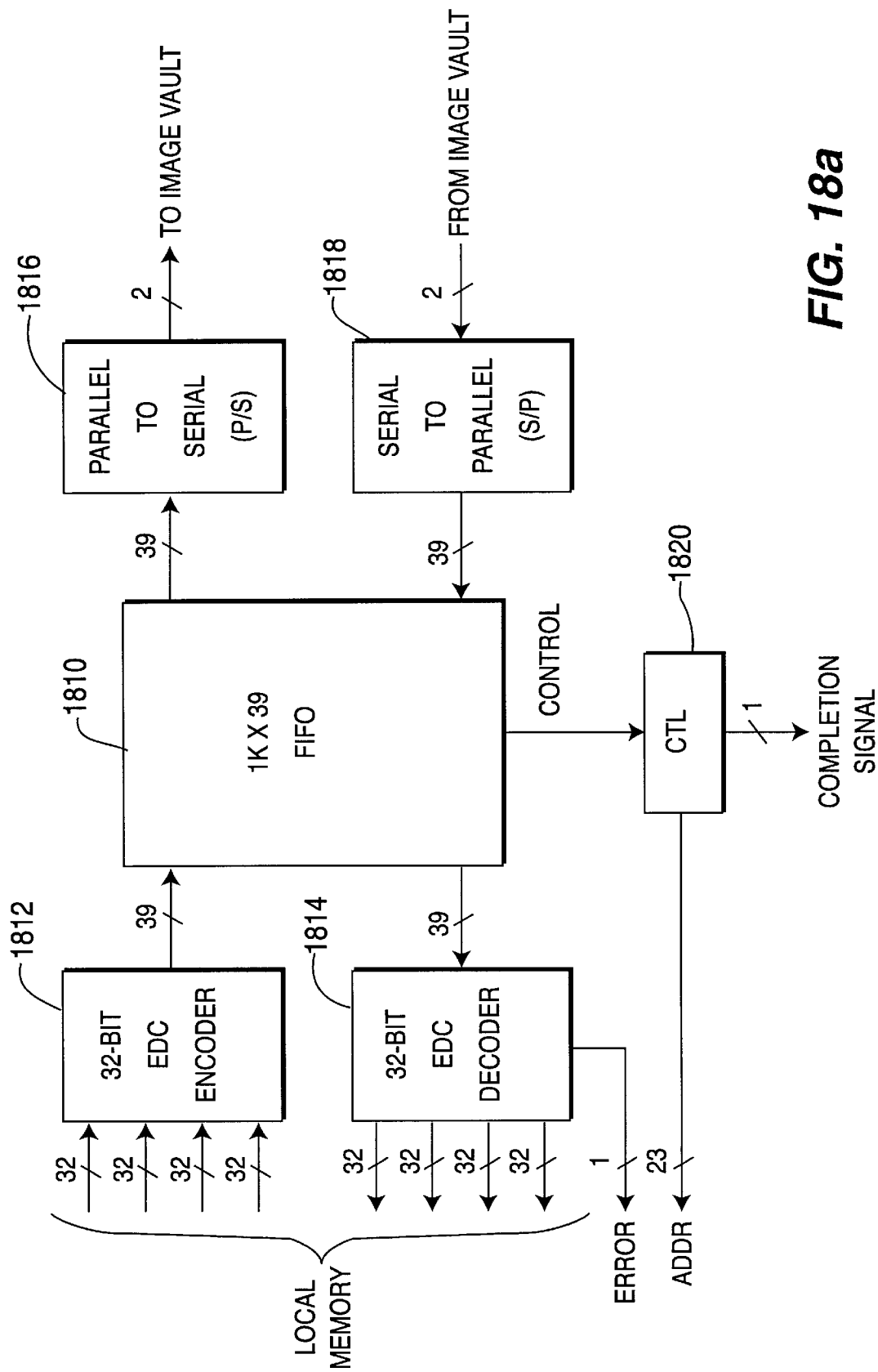
FIG. 18a is a block diagram of exemplary image vault interface circuitry.

FIG. 18a is a block diagram of exemplary circuitry which may be used to interface each of the processors to the image vault through the associated IOMCs. In the exemplary embodiment of the invention, the image vault 320 (shown in FIG. 3) is an array of disk drives, one for each processor in the SE. It is contemplated, however, that other types of secondary memory such as flash memory, magnetic bubble storage devices or even random access memory devices may be used as the image vault 320.

In FIG. 18a, each disk drive has a serial input and serial output connection to the portion of the IOMC which interfaces with the image vault. These may be, for example, standard RS-232 connections. Data is provided to the serial input connection via a parallel to serial (P/S) interface 1816 while data transmitted via the serial output connection is applied to a serial to parallel (S/P) interface 1818. On the IOMC side, data is applied to the P/S 1816 and received from the S/P 1818 by a 1 kilobit by 39 bit FIFO buffer. The 39 bits include 32 data bits and 7 bits of error detection code (EDC).

The FIFO 1810 also receives control information (e.g. data addresses) from and provides control information to the disk drives of the image vault. This control information is entered into the data stream via the control circuitry 1820. The address values which are transferred through the control circuitry 1820 are 23-bit values, each of which corresponds to a separate 32-bit data word. Accordingly, the exemplary disk drive holds up to 32 megabytes of data.

Data transferred through the FIFO 1810 is provided by a 32-bit EDC encoder 1812 or is provided to a 32-bit EDC decoder 1814, depending on whether the data is being written to the image vault or read from it. The EDC decoder 1814 also provides a one-bit error signal which indicates that an error was detected in the decoded data. In response to this signal, the processor may try to access the data again or it may simply flag the error to the controller or to the host.

In FIG. 18a, there are four 32-bit output channels and four 32-bit input channels for receiving data from and providing data to the image vault 320. These channels are multiplexed into the local memory in the same manner as shown above in FIGS. 17 and 18 for the input and output slices.

As described above, the image vault may be used to hold relatively long image sequences or to hold large databases. The high data bandwidth resulting from the high degree of parallelism allows rapid image acquisition for image processing applications and fast database searching for database applications.

The SE has MIMD capabilities; there is a controller for every 64 processors, with each controller able to broadcast a different instruction stream to its processors. This organization provides up to 128 MIMD instruction streams, with hardware support for synchronization between controllers.

There are two forms of synchronization necessary for the system. Synchronization is needed between a controller and the processors under its control, and between controllers. A LOR (LOR) bus is used to synchronize processors to the controller, and the LOR, Global OR (GOR) and Neighboring LOR (NOR) buses are used for synchronization between controllers.

Processor synchronization is necessary for operations whose completion time is dependent on the local processor data. For example, all processors may have to iterate over a section of code until a local data condition becomes false. This requires the controller to broadcast the loop code until all processors have finished executing its loop code. The LOR signal is used to signal when the controller can stop broadcasting the loop code and continue with program execution.

Figure 28:
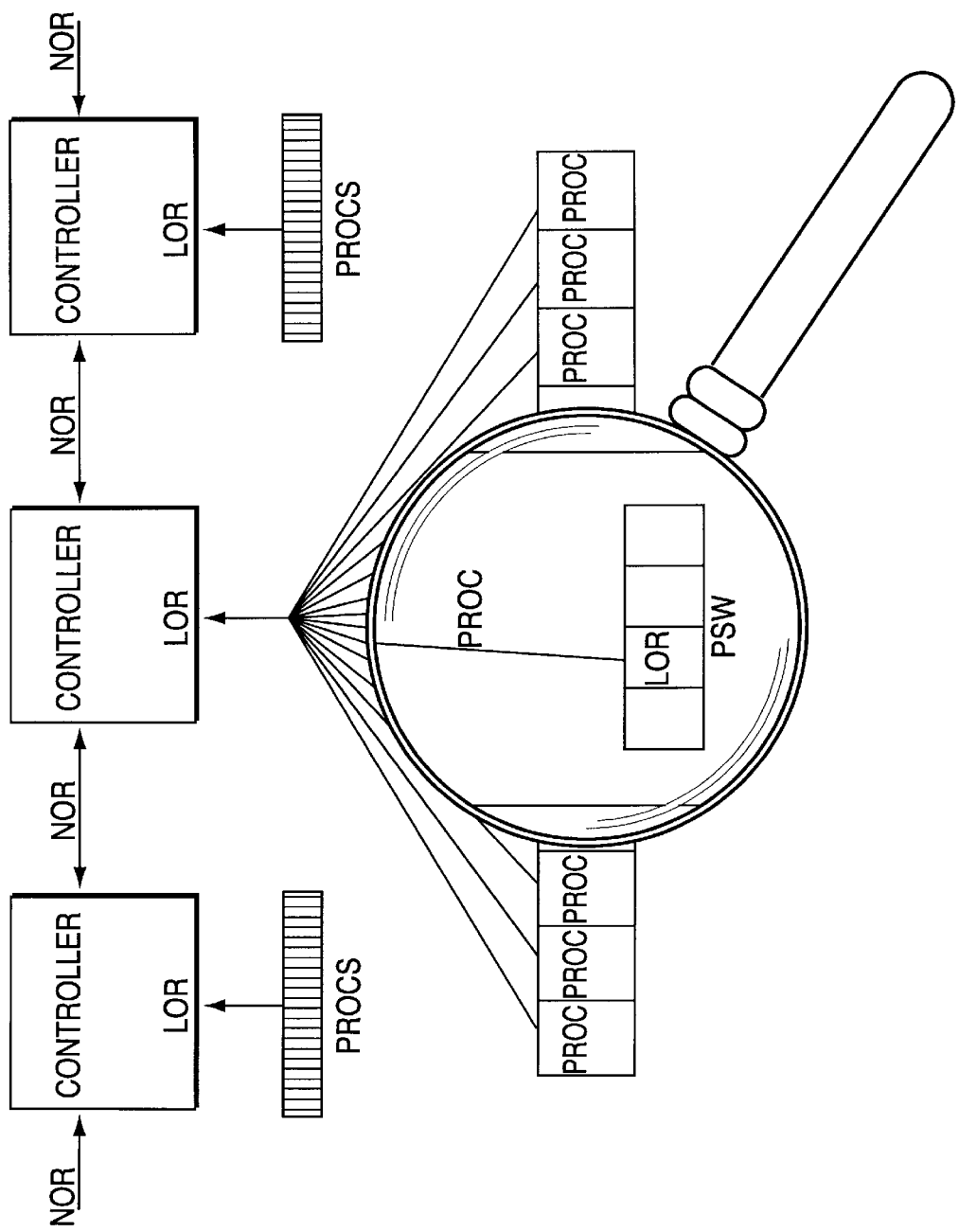
FIG. 28 illustrates a local OR (LOR) bus.

The LOR signal is used by the processors to signal the controller that an event has occurred. The LOR bus is a single line from each processor to its controller. The value on the LOR bus is initially low, and each processor asserts a high signal on its LOR bus by setting the LOR bit in its PSW. (See FIG. 28) When all processors have asserted its LOR signal, the LOR bus value goes high, and the controller is signaled that all processors have synchronized.

Conditional locking is used in conjunction with LOR synchronization. Once a condition is no longer true on a processor, it should no longer execute the code being broadcast by the controller. Thus, after setting its LOR bit in the PSW, it should lock itself and wait for the controller to unlock it. There is an operation of the AuxALU that performs both actions called Decrement-and-Lock-On-Zero, which sets the LOR bit and locks the processor if the AuxALU operand decrements to zero. An example of LOR synchronization using this operation is described above.

By definition, an MIMD program has multiple instruction streams which operate asynchronously and independently of each other. Occasionally, these instruction streams must synchronize so that results of computation can be shared. On the SE, each controller can execute a different instruction stream, by means of the following mechanism used to synchronize controllers.

Figure 29:
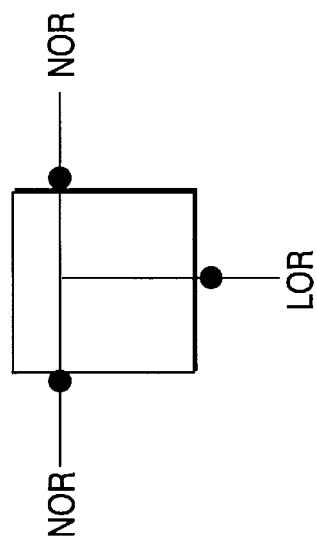
FIG. 29 illustrates a controller synchronization switch.
Figure 30:
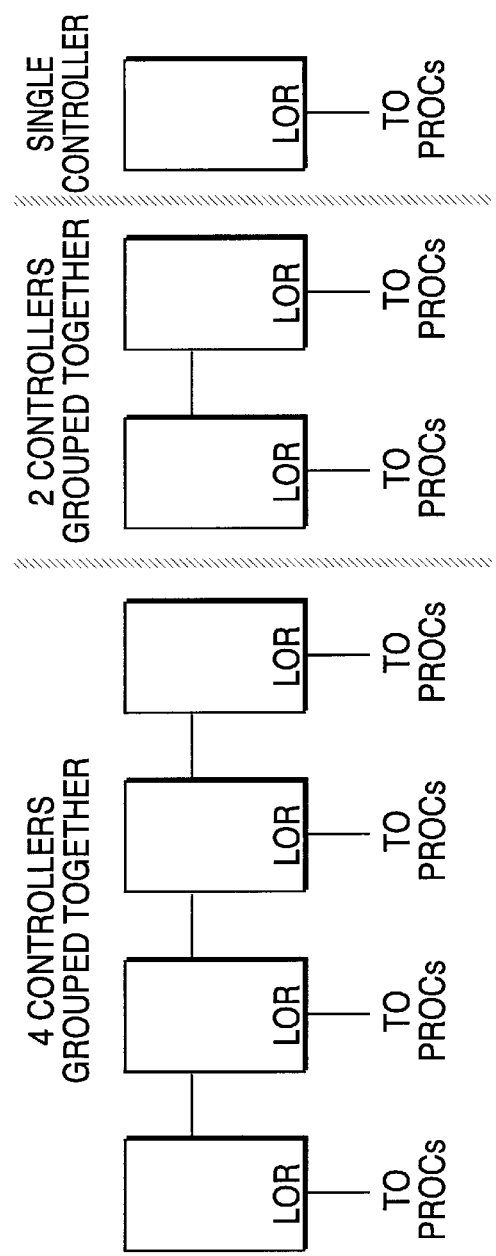
FIG. 30 illustrates a conceptual grouping of controllers.
Figure 31:
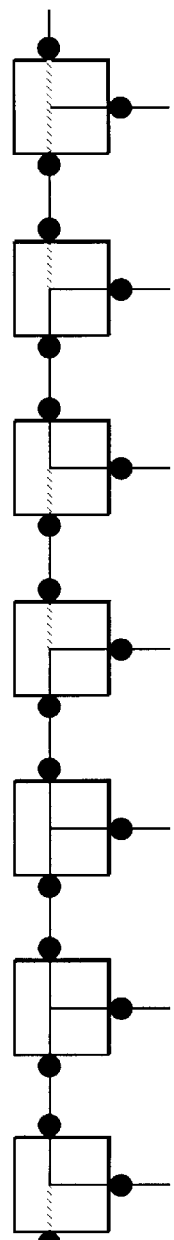
FIG. 31 illustrates a synchronization switch configuration for controllers.

The three buses used for controller synchronization are the LOR, GOR and NOR buses. In FIG. 29 a switch that combines LOR and NOR signals is on each controller. The switch network is connected so that only groups of consecutive controllers can synchronize with each other. Each controller can set the configuration of the switch in software. As an example of a switch network configuration, FIG. 30 shows a conceptual grouping of 7 controllers, and FIG. 31 shows the switch configuration.

Synchronization between controllers occurs as follows. The LOR/NOR bus formed by the switching network is implemented such that the bus signal is high only when all sequencers on the bus assert a high signal. When a controller reaches a point in its code where it needs to synchronize with another controller, it issues the command to its processors to set the LOR bit of the PSW. This action makes the LOR bus go high, since all processors have set the bit. The controller then goes into a wait state, waiting for the bus defined by the switch network to go high. The NOR signal is a signal that summarizes when neighboring controllers have set their LOR signal. When all controllers have asserted the LOR signal, the bus defined by the switch network goes high, and the controllers have synchronized.

The GOR bus is a bus that connects all controllers. This bus is used for situations where global synchronization of controllers is necessary. One example is when the SE is in time-sharing mode, and the context for a new program is being loaded. GOR synchronization is needed to ensure that SIMD programs begin executing synchronously. Another example is when a MIMD program terminates. One stream may terminate early, but should wait for all streams to finish before signaling the controller that it has finished terminating.

As an example of the use of the LOR/NOR switch network, consider the low level MIMD programming construct called barrier synchronization. When an instruction stream reaches a barrier, it must wait until all other instruction streams participating in the barrier synchronization reach their barriers.

Figure 32:
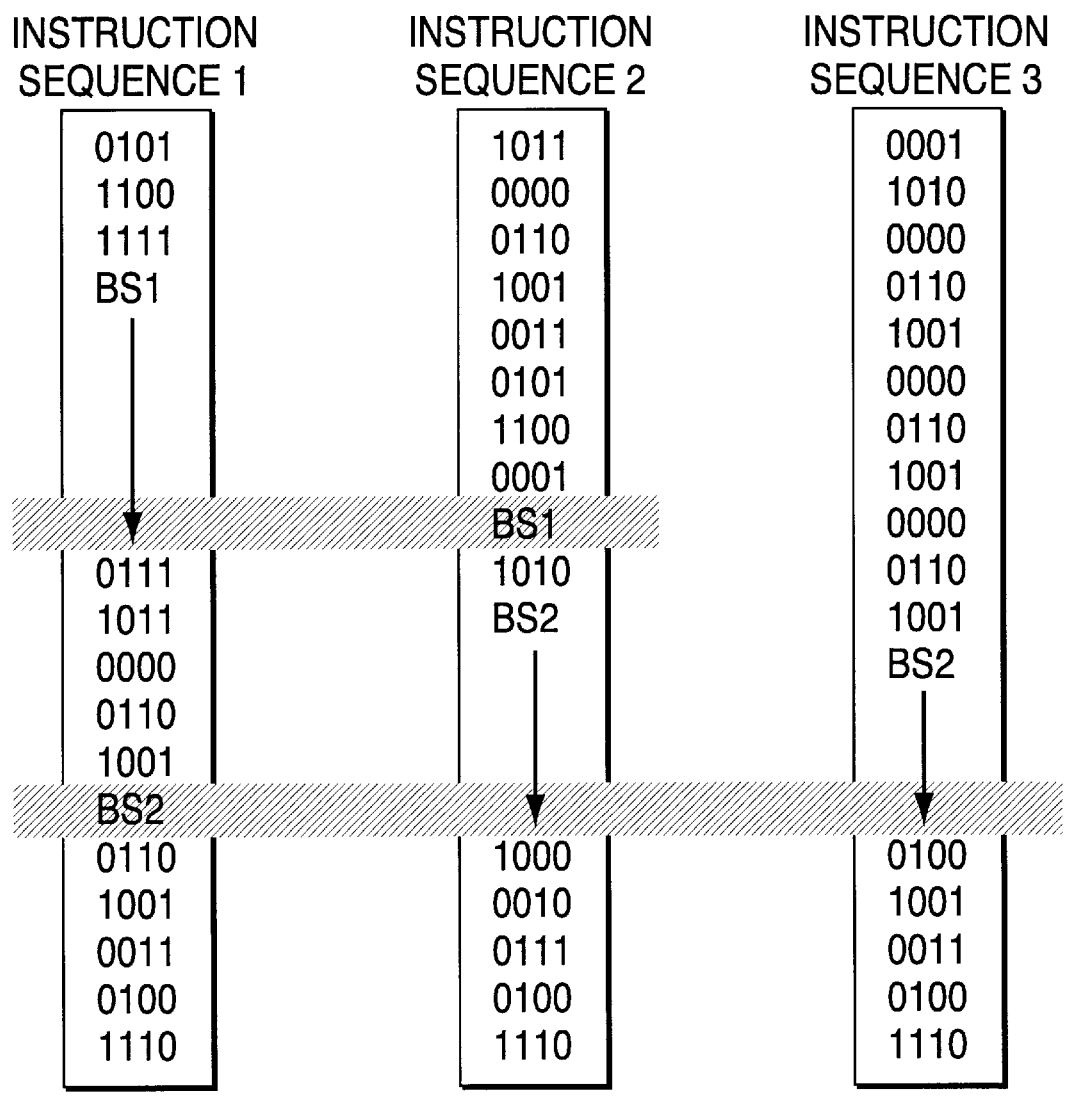
FIG. 32 illustrates a barrier synchronization example.

When a Controller encounters a barrier in its instruction sequence, it sends a high signal to the LOR/NOR bus, and waits for the bus to go high. When all of the Controllers reach the barrier synchronization point, the bus goes high, and the participating Controllers are synchronized. As an example, consider FIG. 32. In this example, first sequence 1 and 2 must synchronize, and then sequences 1, 2, and 3 must synchronize.

Software and hardware support is necessary to implement a multiple user environment on the SE. Requests for HIO by programs must be handled, as well as supporting activities such as loading, executing, or terminating a program in the presence of other running real-time and non-real-time programs. Job scheduling must also be supported, as the SE implements the multiuser environment by time-sharing the resources among the active processes. Also, allocation of resources, such as memory and I/O resources must be maintained.

Time-sharing is the normal mode of operation for the SE. The time for a context switch time between programs is small (about 250 instruction cycles), since there are two memory ports available for storing and loading the context.

Programs can also run on a subset of the architecture. Since the SE is designed as a scalable architecture, the system can be reconfigured at the EB level to operate as several smaller systems. Programs can then be loaded and executed on the newly configured system subset to deal with the allocation of resources for smaller problems.

The hardware support for a real-time operating system is an OS Board which responds to requests from the Host workstation and the controllers of the SE. The OS Board contains hardware queues that buffer requests from the Host workstation and controllers. The OS Board also controls a buffer memory that the Host, controllers, and IOMCs can read and write. Since the Host and SE operate at much different clock rates and are loosely coupled, the OS Board must regulate how data is transferred between the two systems.

There is also additional hardware support for a multiuser environment on the controllers. Each controller has a job queue that contains the pending jobs scheduled to execute. (The OS Board broadcasts the scheduled jobs to all of the controllers, which are then scheduled in the job queue.) The controllers have a process table memory, which contains information on the processes existing on the SE, and polling hardware to determine when a real-time job must be scheduled to execute.

Software support is divided across the Host and the OS Board. The Host executes two programs a Resource Allocation Program (RAP), and an I/O Server (IOS) Program. The RAP maintains maps that represent the present allocation of resources. The RAP is located on the Host because resource allocation is not a time critical activity, and can be determined without interfering with SE execution. The IOS is the host workstation program that interacts with the OS Board; it is a server program that maintains file pointers to files in the Host file system that are used by programs running on the SE. The IOS responds to requests from the Host for I/O, and requests from the user or RAP for activities such as program loading and program termination.

The OS Board has a Motorola 68040 processor or its equivalent that executes an operating system program that continually monitors the OS Board queues. It queues requests that come from active programs and from the Host, and responds to the requests one at a time. There is a priority order to requests; some activities must be attended to immediately, such as scheduling a real-time program to run, while other activities that are not constrained to run in real-time receive low priority, such as loading a program. Queued requests have low priority, and are executed when the OS Board reads the entry from the queue. High priority requests that must be processed immediately are implemented as interrupts to the OS Board processor program.

To assure that a set of real-time programs can execute together, the following rule is used by the RAP when deciding if a newly submitted real-time program can run compatibly with the existing real-time programs: the sum of the real-time program execution times (including overhead such as context switching) must be less than the reference (shortest) frame time (the time to load a frame buffer) of the real-time programs. This guarantees that each program can execute once for each reference frame. This is a conservative estimate; most of the real-time programs might be using a longer frame time, and so the condition overestimates how often a program must execute. Execution times of real-time programs are determined through profiling and user estimates.

Scheduling real-time programs is the highest priority request. A real-time job is ready to execute every time another frame buffer has been loaded. Each controller has a polling register that polls for the frame synchronization (F sync) signal of the Data Input Channels. Every time a job has completed (either because the real-time program finished execution, or the non-real-time job time slice expired), this register is read and reset, and the jobs associated with the F sync signals are scheduled. If more than one F sync signal is read, the jobs are scheduled shortest-frame-time-first. If there are no new F sync signals, and there are less than two jobs scheduled to execute, the OS Board schedules an available non-real-time job for execution.

The operating system implementation is now described. It is important to keep in mind that the activities described occur in the presence of other active jobs. Thus, activities such as loading a program, or program input from the Host could take several frame times to complete. It is important to note that any one of the algorithmic steps shown for an operating system activity can be interrupted (either by the job scheduling job, which has highest priority, or by expiration of the system job's time slice, if it was scheduled.) All communication between the Host, OS Board and Controllers occurs through asynchronous signals. Thus no critical timing constraints are imposed by the communication between these entities.

To accommodate a real time system, a dedicated OS Board is used to schedule jobs and handle requests from the Host Workstation and Controllers. A real time operating system could not run directly from the Host Workstation, as the Host could not respond to requests in a timely fashion, since the workstation operates at a much slower clock rate, and all processes running on the workstation are subject to context switches. In fact, an operating system program implemented on the Host may not even be the active process on the Host when a timely request is made by the system. Thus, a dedicated OS board is necessary.

Not all operating system activities need to be executed in real time. Thus, some of the responsibilities are handled by the workstation. Activities such as determining if there are currently adequate resources available to run a program are decided by the Host. Other operations, such as loading a program, or sending output to the Host, are not constrained to execute immediately, but rather are scheduled as lower priority processes which could take many time slices to complete.

Figure 33:
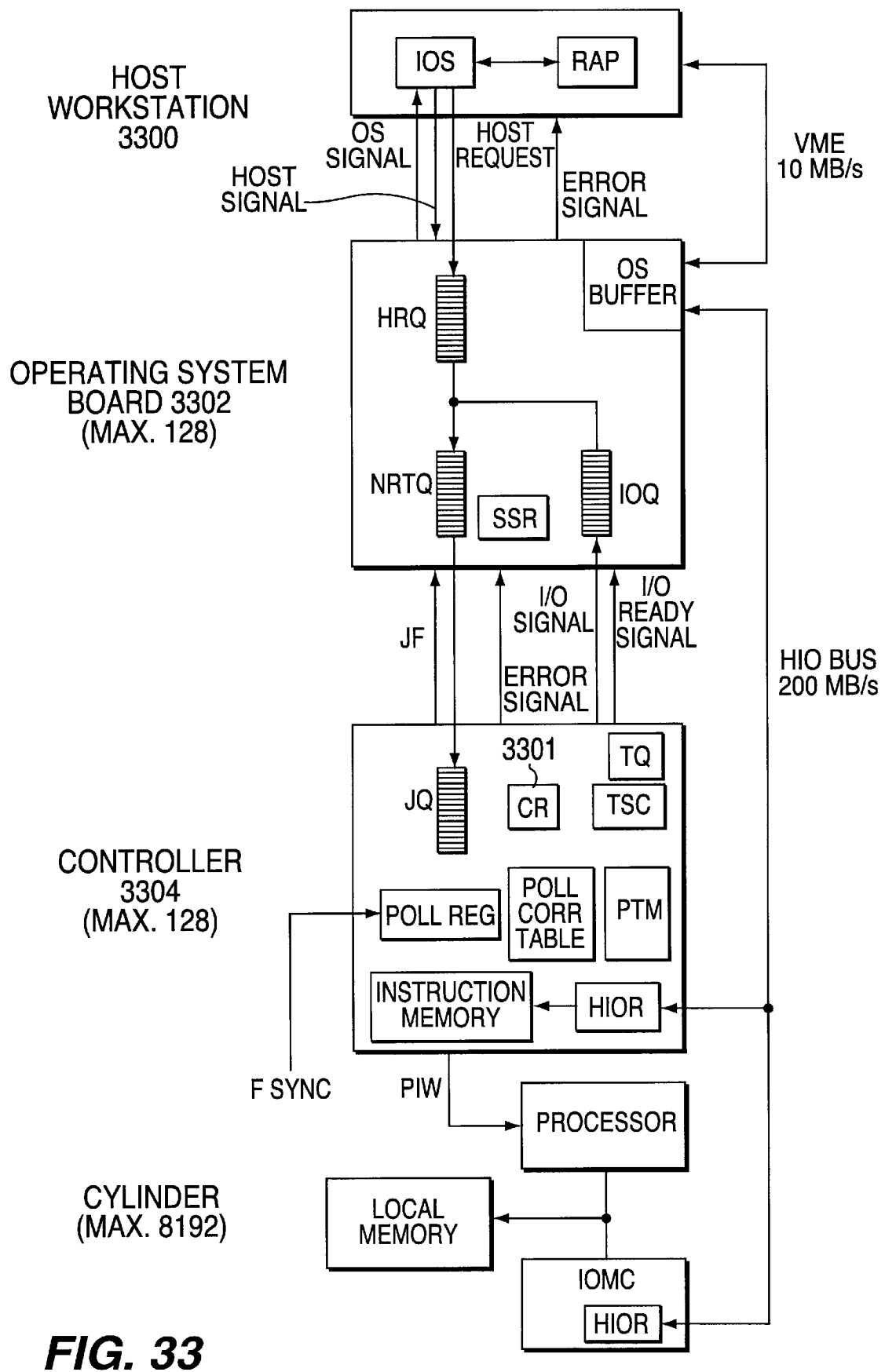
FIG. 33 illustrates operating system components.

Operating system activities involve the following components shown in FIG. 33: the Host Workstation 3300, the OS Board 3302, the Controllers 3304, and the IOMCs. Hardware and software support will be described for OS activities for each component.

The OS Board has eight components: a Host Request Queue (HRQ), an I/O Queue (IOQ), a Scheduling Status Register (SSR), a Non-Real Time Job Queue (NRTQ), the Job Counter (JCtr), the OS Signal, an OS Buffer, and an OS bus.

The HRQ is a queue implemented in hardware that holds requests from the Host. Requests from the Host include: Killing a Program and Reloading a Program.

Requests are handled one at a time. A request is added to the HRQ via the Host Request Signal from the Host. When a request is taken off of the HRQ, it is placed onto the NRTQ to await execution.

The I/O Queue (IOQ) is a queue implemented in hardware that holds requests from the Controllers relating to Program I/O. Requests from the Controllers include writing to the Host (Vector or Scalar) and reading from the Host (vector or scalar)

Requests are handled one at a time. A request is added to the IOQ via the I/O Request Signal from the Controllers. The signal contains the number of the job requesting I/O. Requests are taken off of the IOQ, and are placed onto the NRTQ to await execution.

The Scheduling Status Register (SSR) provides the scheduling status of non-real time programs. It is a status register that is maintained by the OS board to determine if a non-real time program can be scheduled. Reasons for not scheduling a non-real time program include that the program is not completely loaded, that the program has completed and that the program is awaiting I/O.

The SSR has 16 bits corresponding to the maximum 16 non-real time jobs that can execute on the system. If a job's bit is set, this indicates that the job can be scheduled. If a job is real time, its corresponding bit is always set to zero.

The Non-Real Time Job Queue (NRTQ) is a queue implemented in software and holds the job numbers of the non-real time jobs ready to execute. There are two types of non-real time jobs: user and system jobs. User jobs are scheduled based on the SSR and a priority system (not described in this document). System jobs include requests to load, relocate or kill a job, and are taken from the HRQ. Jobs with pending I/O are added to the NRTQ from the IOQ.

Non-real time jobs are added to the Job Queue (JQ) (located in the Controllers) based on the scheduling of real-time jobs.

The Job Counter (JCtr) is used to track the number of jobs currently in the JQ (located in the controllers). When the JCtr indicates that the JQ has less than 2 jobs, a non-real time job is added to the JQ.

The OS Signal is a signal the OS Board sends to the Host to indicate that the OS Buffer has data that should be read by the Host.

The OS Buffer is a temporary memory store for buffering I/O between the Host Workstation and the Controllers and IOMCs. It is the responsibility of the OS board to make sure that jobs requiring HIO do not overwrite the data of other jobs using the OS Buffer.

The Host transfers data to and from the OS Buffer via a Versa-Module Eurocard (VME) bus.

The Controller has fourteen components that interact with operating system activities: the Polling Register, the Poll Correspondence Table, the JQ, Job Finished Signal, Time Quantum Register (TQ), Time Slice Counter (TSC), Process Table Memory (PTM), Process Base Registers, I/O Request Signal, I/O Ready Signal, HIOR, Instruction Memory, PC stack memory, and Loop stack memory.

The Polling Register is a four bit register, where each bit corresponds to a Data Input Channel. The register is used to poll whether a Frame Synchronization (F Sync) signal has been received since the last poll check. An atomic instruction to read and reset the register is used. When an F sync signal has been received, the corresponding bit is set in the Polling Register, which indicates another frame of data has been loaded into the system, and the real-time job that uses the data can be scheduled.

The Poll Correspondence Table is used to relate the polling signals summarized in the Polling Register to the real-time programs that uses the Data Input Channel.

The Job Queue (JQ) is a queue implemented in hardware that contains the numbers of the next job to execute. The JQ receives jobs from the OS Board, which decides which jobs will be scheduled. The Controller deletes the head of the Job Queue when it readies the job for execution.

The Job Finished (JF) Signal is the signal that Controller 0 sends the OS Board when the current job has completed execution of its time slice. The signal is sent to the OS Board so that it can schedule additional jobs.

The Time Quantum Register (TQ) is used to determine how much time a non-real time job should be allocated in the presence of running real time jobs. The TQ value is loaded into the TSC when a non-real time job is scheduled to execute next.

The Time Slice Counter (TSC) is used to count the number of cycles a program is allocated to execute. The time slice value is loaded into the counter, which then decrements on every instruction cycle. When the counter decrements to zero, the program execution is interrupted, and the controller prepares to run the next scheduled program. The Time Slice for a real time program is obtained from the Process Control Table (PCT), described below. The Time Slice for a non-real time program is obtained from the TQ.

The Process Table Memory (PTM) contains the program information for each program. It contains information such as the program context information, and the Base Address for the program in Instruction and Local (Data) Memory.

The Process Base Registers are a set of 16 registers, each of which hold the base address of the PTM Entry for the job it represents. There is a hardware imposed limit of 16 programs (real time and non-real time) that can run on the SE at a given time. For example, Process Base Register 5 holds the base address of the process table entry for job 5.

The I/O Request Signal is sent from a controller requesting I/O to the IOQ located on the OS Board. The Request is the job number of the program needing I/O. When the OS Board examines the request, the job is then scheduled for I/O. More information on Host output and input, is provided below.

The I/O Ready Signal is used to signal the OS Board that the program running on the controller has finished loading or reading the information in the OS buffer. More information on Host output and input is provided below.

The HIOR is the register that the Controller accesses when it needs to transfer data to or from the Host Workstation. It is part of the HIO Bus.

The Instruction Memory is where the instructions for a program reside on the SE. The memory has multiple ports, so it is possible to load memory with a program while another program is being read (for execution).

The Program Counter (PC) Stack is where the information for function calls is maintained during program execution. Each PC Stack has 16 sets of 3 dedicated registers, one for each user program; they are the PC Base, PC Limit, and Stack Pointer Registers. These registers are used to delimit and access the program's data within the memory. The memory has multiple ports, so it is possible to load memory with a program while another program is being read (for execution).

The Loop Stack Memory is where the information used in conjunction with the special loop hardware is stored during program execution. Each Loop Stack has 16 sets of 3 dedicated registers, one for each user program; they are the Loop Base, Loop Limit, and Loop Stack Pointer Registers. These registers are used to delimit and access the program's data within the memory. The memory is multiple ports, so it is possible to load memory with a program while another program is being read (for execution).

The only interaction that the IOMC has with operating system activities is reading and writing to its HIOR, which is part of the HIO Bus. The decision to read and write this register is sent to the IOMC from the Controller.

The Host has three components that interact with operating system activities: the Host Request Signal, the Host Signal, and the Host Bus. In addition software running on the host is responsible for allocating the resources of the machine, and for servicing HIO Requests to read and write data to files, or the terminal.

The Host Request Signal is a signal the Host sends to the OS Board to add a job to the Host Request Queue. Requests include loading a Program, killing a Program and reloading a Program.

The Host Signal is a signal the Host sends to the OS Board to indicate that the Host has completed an action, such as finished reading or writing the OS Buffer.

The HIO is a 32-bit bidirectional bus that connects all of the IOMCs and controllers in serial. Data is written to the OS Buffer by loading data into the HIOR and shifting left on the HIO bus until the data is stored on the OS Buffer. Correspondingly, a write to the IOMC is executed by reading the OS Buffer and shifting the data to the right until the data reaches the destination HIOR.

The RAP is resident on the Host and maintains the resource allocation information and determines whether newly submitted programs can run.

The I/O Server (IOS) is a server program that resides on the Host that maintains file pointers to files in the Host File System that are used by programs. When output is sent from the OS Buffer to the Host, it contains file descriptor information to indicate where the data is to be written or read. The IOS's responsibility is to translate the file descriptor information into the information necessary to interact with the file system of the Host. When the OS finishes a request, it sends a signal via the Host Signal to indicate it has completed. The I/O Server's information is updated by the RAP when a program is loaded and terminated.

Before a program can run, it must be determined whether or not the required resources are available to run the program. If there is not enough available data memory, or if all of the data I/O channels are presently in use, then the program requiring these resources cannot be loaded. The RAP maintains maps that represent the present allocation of resources. The program resides on the host workstation, since there are no real time constraints imposed on determining whether a program can be loaded.

Most of the information on program resource requirements can be obtained from the compiler or linker, with the rest of the information provided by the programmer. Resources include: Instruction Memory Count, Data Memory Count, PC Stack Size, Stack/Heap Size (Dynamic Allocation requirements), Loop Stack Size, Real Time / Non-Real Time, Data I/O Resources, Frame Time, Number of Processors Used by Program, and Maximum Time Slice Duration.

The Instruction and Data Memory Count for a program can be computed by the linker and the compiler. The PC Stack Size Requirements is determined by the function call graph depth of the program, which can be determined statically if there is no recursion in the program, or estimated by the user if functions are recursive. A default value would be provided if no explicit value were given by the user. If the PC stack overflowed, the program would terminate with notification to the user, and the user would have to resubmit the job with a larger PC stack size. The Dynamic Allocation Requirements and the Loop Stack Size would also be user/default specified. The controller uses a special loop counter that has an associated Loop Stack for nested loops.

The program code specifies whether it is real time or non-real time in the program. Data I/O Resource requirements and the Frame time are determined by a compiler/linker, since the user performs system calls to open and initialize Data I/O channels. The number of processors used in a program can be specified at job-submission time.

The Maximum Time Slice Duration is an approximation that a user must place on a real time job in deciding how long it will take to execute. The user could make use of an interactive profiler, where the profiler would provide static information on how many instructions it would take to execute program segments. Those code segments that cannot be computed statically (at compile-time), such as loops based on a data condition, would be computed with user estimates of the maximum number of iterations a loop would execute. Typically, this is not a great burden placed on the real time programmer, since attention must always be paid to the overall instruction budget. Alternatively, the programmer could execute the code on the machine with an overestimated instruction budget, and get statistics on the execution length through repeated execution of the program using a profiler.

The RAP keeps information on the Physical Specification of the system and information on the Current State of the system. Physical Specification information includes Total Number of Functioning Processors, Physical Data Memory Size and Physical Instruction Memory Size.

The Current System State information includes Instruction Memory Map, Local Memory Map, PC Stack Map, Loop Stack Map, I/O Resource Map and Reference Frame Time Map.

The first four maps listed above provide information on the allocation of different memories. The Maps are used to determine the amount of fragmentation occurring in the various memories. If the resources exist for a program but the memory fragmentation prohibits the program from being loaded contiguously, the Resource Allocator could send a request to relocate non-real time programs. Real time programs cannot be relocated, since it cannot be guaranteed that they would be completely relocated by the next time it had to execute.

The I/O Resource Map shows which I/O Resources are used. Finally, the Reference Frame Time Map determines the instruction budget for a real time process, or determines whether there is enough time for a non-real time job to run.

A Reference Frame is defined as the shortest frame time of all active real time programs. The Resource Allocator operates under the following rule, called the Reference Frame Rule: A real time program can be scheduled to run if the sum of all the real time program instruction counts (including the real time program being considered), is less than or equal to the size of the Reference Frame. This rule states that if all of the programs can execute under the strictest assumption (that each program must execute once per Reference Frame), then all of the programs can execute under relaxed conditions (where there are several (longer) frame rates, which means that some programs actually execute less than once per Reference Frame Time).

If a real time program is submitted to the RAP that would change the Reference Frame Rate, (this is the case where the submitted program executes with greater frequency than currently executing programs), then the instruction budget must be recomputed under this new frame rate. If the executing programs and the program under consideration do not exceed this instruction budget, then the program can be loaded, and the Reference Frame must be updated. Likewise, when the program operating at the Reference Frame Rate is terminated, a new Reference Frame is determined, which has the effect of increasing the instruction budget.

Whenever a real-time job is loaded or terminated, the TQ, located on the Controllers, is updated. The TQ value determines how long a non-real time job can execute in the presence of executing real jobs. The description of the computation of the Time Quantum value is given below.

Additional parameters are controlled by the RAP. For example, a job limit could be enforced to make sure the system load does not become too great. Or, a non-real time fairness parameter would specify how much of each Reference Frame Time should be devoted to non-real time jobs.

When a program is terminated, the RAP releases the resources used by the program. Typically, it is just a matter of updating the maps to show the newly available resources, possibly recomputing the Reference Frame, and updating the IOS Program running on the Host.

The concept of time-sharing and context switching on the SE is now discussed. When a system is time shared, each program running on the system is allocated a duration of time to execute, called a time quantum. When a program's time quantum expires, the program is interrupted, and its execution state, called the program's context is saved. A new program is chosen to execute, and its context is loaded. The new program then continues executing until its time quantum expires. The process of storing one program context and loading another program's context is called a context switch.

A context switch usually contains significant overhead, since all of the registers on the processor need to be saved, and new data is loaded into the registers. There are several reasons why context switching is supported for the SE. One reason is that the overhead for the context switch is considered low. Since each processor has two memory ports, the context save occurs twice as fast. In fact, the total context switching time for four real-time programs operating at NTSC Frame Rates is about 1% of the instruction budget.

A determination of Time Quantum size must be made for non-real time programs, but the size can not be static, since when a Reference Frame changes, the Time Quantum may have to change. A real time program Time Quantum is the amount of time the user estimated the program will take to execute. A non-real time program Time Quantum is computed as Reference Frame Time—S (Real Time Program Time Quanta). Note that this formula is consistent with the Reference Frame Rule discussed above. The sum of all programs scheduled will never exceed the Reference Frame Time.

The non-real time program Time Quantum is thus a function of the Real Time Programs executing, and thus the Time Quantum changes as real-time programs load, execute, and terminate. However, the non-real Time Quantum can simply be updated by the RAP when a real time program is loaded or terminated, and so does not present a problem. The Time Quantum value for a non-real time program is obtained from the Time Quantum Register, located on the Controller.

When no real time programs are executing, the Time Quantum value can be changed by the RAP.

When a program context switch occurs, the processor state must be saved without changing the processor state. No operations that change the Processor Status Word must occur, and the order of storing and loading registers must occur in an order which does not destroy register contents until they have been saved.

A problem with conditional locking is how does a process save its context if it is locked, and if it unlocks, doesn't that change the state? The solution to this are extra status words which save the Locking Context; when an Interrupt Unlock instruction is issued, all processors unlock and save the Context Status Bit (which determines when a processor is locked) into the Previous Context Status Bit. Also, the condition under which the processor locked is also saved. Thus, all information on the status of a locked processor is saved, and can be recovered. Once all processors are unlocked, the context switch can begin.

In the Processors, the IPC Registers (CID, IPCOR, IPCDR), ACC1, ACC2, P, B registers, RO1, RO2, RO3, RO4, PSW, ACMR, 128 Register File Registers and the Base, Limit, Offset, Stride, User Base, User Limit Address Registers must be saved. In the Controllers, the status of NOR/GOR switches and GOR Values must be saved.

An operating system must keep track of the active processes on the computing system. This is typically implemented using a Process Control Table (PCT) which is responsible for summarizing all of the information necessary to schedule and run jobs on the computer. Each program has an entry in the Process Control Table. Information located in a Process Control Table Entry includes: Real Time or Non-Real Time Job, Base Address of Program in Instruction Memory, Base Address of Program Data in Local Memory, Base Address of Context in Local (Data) Memory, Last instruction executed before interruption (non-real time programs), Time Slice Duration (real time programs) and Priority (non-real time programs).

The Base Addresses are needed to locate the program in memory. It is necessary for a real time program to know the base address of the Program, since the program continually repeats execution. It is necessary for a non-real time program to know the base address of the program and program data should it become necessary to relocate the program in memory. The base address of the context is necessary for performing the context switch. The Process Table Entry also contains information such as the last instruction executed before interruption, so that once the context is loaded for a non-real time program, execution of the program can continue. For real time programs, the Time Slice duration must be known, since this value is placed into the Time Slice Counter prior to execution. (Non-real time jobs use the value of the Time Quantum Register to determine their Time Slice duration.) The priority of non-real time jobs are used by the OS Board when scheduling non-real time jobs.

The PCT is located in a dedicated memory on the Controllers, called the Process Table Memory. The Process Table Memory resides on the Controller instead of the OS Board, because in the case of executing MIMD code, information specific to the MIMD stream is located in the Process Control Table, (such as the last instruction executed prior to the last interrupt) and so one Process Table could not summarize all of the information.

The base address of a program's PCT Entry is located in the Process Base Registers. There are 16 Process Base Registers, which means that there is a hardware imposed limit of 16 programs (real time and non-real time) that can run on the SE at a given time. This is not considered a severe limitation, as the load of more than 16 jobs on the system would probably degrade the completion time of non-real time programs to unacceptable levels. Also, other computing resources such as memory or I/O resources will probably be exhausted by less than 16 programs.

The decision to hardwire the maximum number of active jobs was for speed considerations. Once limits are decided, dedicated registers can be used and table accesses can occur quickly and efficiently. For example, when scheduling a job, all the OS Board needs to send is the number of the job to execute next. When the controller readies the next job for execution, the job number is taken off of the Job Queue. The number specifies the Process Base Register which in turn specifies the base address of the Process Control Entry. Once the entry is located, all relevant information about the program is located for the program, and the controller can complete the task of readying the job for execution. Thus, the hardware solution allows the OS Board and Controller to reduce the manipulation of program data down to the manipulation of a single number.

The schedule and execution cycle used by the OS Board and controllers for determining the order in which programs are executed in a time-sharing system is now described. Special attention must be made to assure that real-time jobs execute once per frame time.

The SE uses a reactive method for scheduling real time jobs. The OS Board is signaled by the Controllers each time a job has finished executing its time slice via the JF Signal.

The OS Board then determines if there are any real time jobs that need to be scheduled. If there are no real time jobs to be scheduled, then the OS Board determines which non-real time jobs can be scheduled.

In Real-Time Job Scheduling, after receiving a JF Signal from the Controller, indicating that the last job has completed executing its time slice, the OS Board decrements the Job Counter, located on the OS Board, which tracks the number of jobs in the Job Queue. The OS Board then determines which real time jobs are ready to execute. This is accomplished by examining the Polling Register on Controller 0 to determine if any Frame Synchronization (F Sync) signals have occurred since the last time the OS Board examined the register. When an F sync signal is received, the corresponding bit is set in the Polling Register, which indicates another frame of data has been loaded into the system, and the real-time job that uses the data can be scheduled. The OS Board uses an atomic instruction to read and reset the Polling Register, so as to not miss any F Sync signals.

The OS Board then refers to a Poll Correspondence Table to determine the relationship between the bits in the Poll Register word and the real time jobs that use the Data Input Channels. There are four entries in the Poll Correspondence Table. Each entry contains the job number and the Frame Rate of the Input Channel.

All real time jobs whose F Sync signal has been polled are scheduled in the JQ of each controller. If there is more than one job to be scheduled, then a priority order is determined from the Frame Rate information for the job as provided by the Poll Correspondence Table. The priority order is Fastest Frame Rate First. The JCTL is incremented by the number of jobs that have been added to the JQ.

If there are no real time jobs to be scheduled, the OS Board then determines if there are any non-real time jobs to be scheduled. The OS Board examines the Job Counter; if there are less than two jobs in the JQ, then an entry is taken from the NRTQ and it is added to the JQ. This condition is maintained so that there is always a job in the JQ ready to execute. If there is only one job running on the system in multiuser mode, then a dummy job is scheduled to execute. This condition is maintained even when there is only one active job, since system jobs may need to be scheduled to execute, such as a host request to load a program.

The NRTQ is loaded by the OS Board using a priority system not discussed in this document. The priority parameters are stored in the Job's Process Control Table Entry. When the OS Board determines what jobs should be added to the NRTQ, it must examine three resources: the HRQ, the IOQ, and the SSR. The HRQ summarizes requests by the host to load, terminate or relocate a program. The IOQ summarizes requests by other programs to perform I/O with the Host. The SSR summarizes the scheduling state of non-real time jobs. If a non-real time job can be scheduled, its corresponding bit is set in the SSR.

A process is readied for execution by the controller based on information on Context Switches and the PCT. Once a job has been scheduled in the JQ, the job will execute when it becomes the head of the queue. The JQ contains the numbers of the jobs that are scheduled to execute.

After the controller reads the job number at the head of the JQ, it uses the job number to find the process entry in the PCT to get the location of the program context. After loading the program context, the controller loads the TSC with the time slice duration. The controllers synchronize using the GOR signals, and then the program begins execution.

The program continues executing until it terminates or is interrupted by the expiration of the TSC, whichever comes first. If the program terminates, it waits for the counter to expire. If it is a real time job, the program sends a signal to the IOMCs to update the execution frame before terminating. A real time job should never be interrupted, but should terminate normally.

Upon expiration of the TSC, the controllers again synchronize using the GOR signal. When all the controllers have synchronized, controller 0 sends the JF Signal to the OS Board to indicate it has completed the job.

The following table summarizes the events and interactions between the OS Board and the Controllers that occur each time a job is scheduled and executed. More detailed information is presented above.

| OS Board | Controllers |
| --- | --- |
| 1. | Send JF Signal to OS Board |
| 2. Receives JF Signal from Controller 0. | |
| 3. Decrements JCtr | |
| 4. Reads and resets Poll Register | |
| 5. Gets job numbers from Poll Corr. Table | |
| 6. Assigns jobs Fastest Frame Rate First | |
| 7. Adds jobs to JQ | |
| 8. JCtr incremented by number of jobs added | |
| 9. If JCtr < 2, send NRTQ job to JQ | |
| 10. If JCtr < 2, increment JCtr | |
| 11. | Save Program Context if non-real time |
| 12. | Read (and delete) job number from JQ |
| 13. | Examine job's Process Control Table Entry |
| 14. | Load Program Context |
| 15. | Load Time Slice Counter |
| 16. | Synchronize using GOR signals |
| 17. | Execute Program |
| 18. | Time Slice Counter Expires |
| 19. | If real time job, send IOMC frame signal |
| 20. | Synchronize using GOR signals |
| 21. | Send JF Signal to OS Board |

The process of loading a program without disturbing existing processes begins with a request by the user to the RAP. If the resources are available to run the program, then the job is submitted to the IOS Program.

The IOS initializes file descriptor tables for the program that relate I/O sources and destinations used by the program to actual sources on the Host System. These tables identify Host resources such as files and terminal I/O. The IOS then sends a request to the Host Request Queue on the OS Board via the Host Request Signal to start the program loading.

When the OS Board reads HRQ entry, the OS Buffer is free, and the program loading can commence. The OS Board then sends an OS Signal to the Host, indicating that the IOS can begin loading the program into the OS Buffer. The OS Buffer in turn, loads the Instruction Memory on the Controller. The Instruction Memory is a multiport memory, which means that the program can be loaded on one memory port while another program is being read from the memory for execution.

When the Instruction Memory is loaded with the program, the IOS sends the Host Signal to the OS Board. The process is then repeated for the other Controller Memories, which are also multiport: the PC stack memory, the Loop stack memory, and the Process Table Memory. When these memories are loaded with the program information, the OS Board again signals the Host.

The program data must now be loaded. However, this is a more complex process, since loading the processors' local memory means idling the processors. Thus, this part of the process must be scheduled as a non-real time system job. IOS loads the OS Buffer with program data and then signals the OS Board. The OS board then schedules a system job to load the program data in the NRTQ.

The system routine to load program data is stored in low Controller Instruction Memory. The parameters for the job, such as the base local memory address and the Controller numbers who will receive the data are specified in the first few words of the OS Buffer data. When the load program executes, the OS Buffer data is transferred to the appropriate local memories. This process of scheduling the load program continues until the End of Data Marker is encountered in the OS Buffer.

After all of the data has been loaded for the program, the OS Board will ready the program for execution. If the job is non-real time, the job's entry in the Scheduling Status Register is set. If the job is real time, the job's entry is initialized in the Poll Correspondence Table on the Controllers. The program is now ready to be scheduled for execution.

The following is a Summary of Program Loading:

| Host | OS Board | Controllers |
| --- | --- | --- |
| 1. RAP approves program | | |
| 2. Submitted to IOS | | |
| 3. IOS initializes I/O tables | | |
| 4. IOS loads HRQ | | |
| 5. | HRQ entry read | |
| 6. | Send OS Signal to Host | |
| 7. IOS loads OS Buffer | | |
| 8. | | OS Buffer loads IM |
| 9. Steps 5, 6 and 7 repeated until Instruction Memory loaded with program | | |
| 10. IOS sends Host Signal | | |
| 11. Steps 5–9 repeated to load controller memories: PC, Loop stack, Process Table Mem | | |
| 12. | Send OS Signal to Host | |
| 13. IOS loads OS Buffer | | |
| 14. Send Host Signal | | |
| 15. | Schedules load program in NRTQ | |
| 16. | Load program loaded into JQ | |
| 17. | | Load program executes (transfers OS Buffer to LM |
| 18. | | JF Signal |
| 19. | Receives JF Signal | |
| 20. | Send OS Signal to Host | |
| 21. Steps 12–19 repeated until End Of Data marker found in OS Buffer | | |
| 22. | If NRT, update SSR | If RT, update Poll Corr. Table |

There are two different types of program termination, specified as normal and abnormal termination. Normal termination occurs when a program completes execution and halts. Abnormal execution occurs when an external entity, such as the user or an error routine, causes the program to stop execution.

Normal termination of a program occurs when the program encounters the halt instruction. When this occurs, the OS Board must be signalled, so that it does not reschedule the job.

When a non-real time program finishes its last instruction, the controller sets the GOR bus high. This signals that it has completed execution. When all of the controllers have set their GOR signal, then the program has finished on all controllers, and controller 0 sends the termination request to the IOQ via the I/O Signal.

The OS Board routinely examines the IOQ to determine if new jobs have been placed on the queue. Any new jobs that have been added to the IOQ have their entry in the Scheduling Status Register (SSR) reset to indicate that the job should not be scheduled until the request is handled. When the OS Board reads the termination request off of the IOQ, it signals the Host via the OS Signal that the job has completed. The SSR entry is not reset since the job has completed, and will not execute again.

The IOS receives the termination request from the OS Board and notifies the RAP. It releases the program's resources by modifying the resource maps.

By definition, a real time program completes execution each time it executes, so the response to normal termination is different. The real time program simply busy-waits for the duration of its time slice at which point it is swapped out of memory. The program will be rescheduled to execute the next time an F Sync signal occurs for the program's Data Input Channel.

A second case may exist, however, where the programmer may want the real time program to terminate and not restart. This may be useful for debugging purposes, where termination occurs if an errant data condition occurs. In this case, a different termination routine is required.

This second case is similar to the non-real time program termination, with only one difference: Instead of resetting the SSR entry on the OS Board, the Poll Correspondence Table Entry on the Controller is reset. This indicates that although the F Sync signal may continue to be sent by the Data Input Channel, it does not correspond to an actively executing real time program. Thus, the terminated real time program is no longer scheduled. The RAP is then notified of the termination, and deallocates the program's resources, which possibly entails adjusting the length of the Reference Frame.

The following is a Summary of Job Termination (Normal):

| Host | OS Board | Controllers |
|---|---|---|
| 1. | | Program finishes |
| 2. | | Synchronize with GOR signal |
| 3. | | If RT, Case 2: Poll Correspondence Table entry reset |
| 4. | | Add termination request to HIOQ |
| 5. | Term. request taken off HIOQ | |
| 6. | If NRT, SSR Entry reset | |
| 7. | OS Signal to Host | |
| 8. | RAP releases program resources | |

A program is abnormally terminated when an outside entity halts execution of the program. The case of the user halting execution is now considered.

The termination process begins with the user sending the termination signal to the RAP, which passes the request to the IOS program. The IOS then sends a terminate request to the HRQ on the OS Board via the Host Signal. The request consists of the job number of the job to be terminated and a request code signifying termination. The OS Board eventually reads the request from the HRQ.

If the program is non-real time, then the OS Board resets the job's entry in the Scheduling Status Register, which prevents the program from being scheduled. If the program is running in real time, then the Poll Correspondence Table entry on the Controllers are reset. The OS Board then signals the Host via the OS Signal to confirm that the termination request has been executed.

The IOS Program receives the signal from the Host and signals the RAP. The resources from the program are then deallocated by updating the various memory maps.

The following is a Summary of Job Termination by the User:

| Host | OS Board |
|---|---|
| 1. User terminates program | |
| 2. RAP signals IOS of termination | |
| 3. IOS loads HRQ | |
| 4. | HRQ entry read |
| 5. | If NRT, SSR entry reset |
| 6. | If RT, Poll Correspondence Table entry reset |
| 7. | OS Signal Sent to Host |
| 8. RAP releases program resources | |

A program may be abnormally terminated by the system when an unrecoverable error occurs in the code. Examples include an memory access violation, or an illegal IPC operation. When such an error occurs, the Controller receives a signal from the processor on which the error occurred. The Controller then halts execution, and sends an Error Signal to the OS Board.

The Error Signal causes an interrupt on the OS Board (which has lower priority than scheduling, but is higher priority than Host or I/O requests). The signal resets the SSR entry if the program in non-real time, and resets the Poll Correspondence Table entry on the Controllers if the program is real time.

An Error Signal is then sent to the Hoste, which interrupts the IOS. The job number and error code is contained in the Error Signal. The IOS looks up the user terminal associated with the job, and sends the error notification to the terminal to-alert the user. The IOS then signals the RAP to deallocate the resources for the program.

The following is a Summary of Job Termination by the System:

| Host | OS Board | Controller |
|---|---|---|
| 1. | | Error occurs on processor |
| 2. | | Controller notified |
| 3. | | Error signal sent to OS Board |
| 4. | OS Board receives Error Signal | |
| 5. | If NRT, SSR entry reset | |
| 6. | If RT, Poll Correspondence Table entry reset | |
| 7. | Error Signal Sent to Host | |
| 8. IOS receives signal | | |
| 9. RAP releases program resources | | |

The process of relocating a non-real time program in memory in order to reduce the effects of memory fragmentation, is now considered. Memory fragmentation occurs when programs are loaded, executed, and terminated, leaving "holes", or unused space, in the memory. Eventually, there may be many holes in memory. The result is that even though there enough memory to load a program, there is not a large enough block of contiguous memory. A solution to this problem is to eliminate the "holes" by relocating program data in memory.

The decision to relocate program data is made by the RAP when it determines that the resources for running a program exist, but the available memory is not contiguous. There are several program memories prone to fragmentation; they are the Instruction Memory, PC Stack Memory, Loop Stack Memory, and the Process Table Memory on the Controller, and the Local Memories associated with a Controller's processors. The program decides on which program should be relocated, and sends the request to the IOS.

An important restriction exists: real time programs cannot be relocated. Relocation of program data cannot be guaranteed to complete in a frame time, and so a real time program may be required to execute while still in the process of relocation. Thus, only non-real time programs can be relocated.

The Instruction Memory uses a segment addressing system, where a program is stored contiguously in Instruction Memory, and has a Segment Register associated with the program. At linker time, all instruction addresses are assigned beginning with address location zero. The program is then loaded into Instruction Memory, and its base address is loaded into the program's Segment Register. During execution, the system automatically adds the contents of the Segment Register to all Instruction Memory address references, which generates the absolute address in Instruction Memory.

The segment addressing system makes all programs relocatable in Instruction Memory, since the linker generates addresses relative to a base address loaded in the Segment Register. To relocate a program in Instruction Memory, all that is required is the displacement of the instructions by a constant value, accompanied with an update of the Segment Register.

The procedure for relocating a program occurs as follows: The RAP decides that relocation of a program in Instruction Memory is necessary, and submits the request to the IOS. The IOS in turn, sends a Host Request to the OS Board. When the OS Board reads the HRQ, it sends the Host the signal to load the parameters of the relocation into the OS Buffer. After this is accomplished, the IOS again signals the OS Board.

The OS Board then loads the parameters into reserved memory on the Controller for the relocation job. Parameters include the number of the job to be relocated, the memory in which the relocation is to occur, the amount of the displacement in the memory, and the amount of memory to be relocated. The OS Board then resets the SSR entry for the job to be relocated, and sets the SSR entry for the Relocate system job. This allows the Relocation program to be scheduled for execution.

When the relocation program executes, it uses the relocation parameters to relocate the program data. The system job reads the old location, and writes it to the corresponding new location. This occurs until the program finishes or the time quantum expires. If the time quantum expires, the job is rescheduled in the NRTQ. After the instruction memory is relocated, the Segment Register value is updated, and then the program ends. The OS Board resets the SSR entry for the relocation job (so that it will not be scheduled to execute again).

The OS Board then adjusts the PCT Entry for the relocated job. The address of the last instruction executed must be updated. Once this is completed, the OS Board resets the SSR entry for the relocated job, and sends the signal to the Host, verifying that the relocation request has been satisfied. IOS receives the signal from the OS Board and signals the RAP. The program then updates the memory maps.

The following is a Summary of Relocating a Program in Instruction Memory:

| Host | OS Board | Controllers |
|---|---|---|
| 1. RAP decides on relocation | | |
| 2. Submitted to IOS | | |
| 3. IOS loads HRQ | | |
| 4. | HRQ entry read | |
| 5. | Send OS Signal to Host] | |
| 6. IOS load OS Buffer with relocate parameters | | |
| 7. Send Host Signal to OS | | |
| 8. | OS loads params into reserved memory for system job | |
| 9. | Reset NRT SSR entry for targeted job | |
| 10. | Set SSR entry for Relocate job | |
| 11. | OS schedules Relocate job in NRTQ | |
| 12. | | Relocate job loaded into JQ |
| 13. | | Relocate job executes |
| Steps 11–13 repeat until job terminates | | |
| 14. | Reset SSR entry for Relocate job | |
| 15. | Adjust Process Control Table | |
| 16. | Set SSR entry for targeted job | |
| 17. | Send OS Signal to Host | |
| 18. IOS receives signal | | |
| 19. IOS signals RAP | | |
| 20. RAP updates memory maps | | |

The process of relocating program in other Controller memories is very similar to the process of relocating instruction memory. The PC stack memory, Loop stack memory and PCT all have Base Address Registers associated with the memory entry for a program. When a program is relocated, the Base Register is updated (in the same way the Segment Register in the Instruction Memory is updated). The target memory of the relocation program is specified as a parameter sent by the Host.

The process of relocating a program in Local Memory is slightly different, since the memory is not on the Controller. A different relocation program is needed, since the relocation program must send instructions to the processor to relocate the local memory data.

Each program has a set of User Base and User Limit addresses on the processor's Address Generator for the eight banks of local memory, as described above. The User Base address serves the same purpose as the Segment Register in the Instruction Memory: to make it easy to relocate the data in memory.

The system job executes by having the processor read the contents of the old address and write the contents to the new local memory address. This is efficiently done using the Address Generator. This reading and writing is done using an absolute address system, as relative addressing would cause errors when the program attempted to write beyond the User Limit value. The job can write to arbitrary addresses since it is a system program. Other than this one difference, the relocation request steps given in connection with relocating a program in Instruction Memory, are the same for relocating a program in Local Memory.

The process of a non-real time program sending output to the Host Workstation is considered now. The output can be to one of many destinations, such as the terminal, a file in the Host file system, or an external I/O device controlled by the Host.

HIO is restricted to non-real time programs for several reasons. HIO is a low priority process that may take many frame times to complete, and so the response time for real time programs is inadequate, especially if a real time program is to send output to the host on every frame. A second reason that real time programs cannot use HIO is that the method for servicing I/O requests require that the program suspend execution until the I/O resources are available.

Output to the Host is specified by a command in the high-level language program, such as a printf( ) function in the language C, or the WRITE command in Fortran. The first instruction of the microcode implementing these functions sends an I/O Signal to the OS Board, which is added to the IOQ. This request gives the job number of the program requesting output, and a request identifier, which specifies the type of request. The program then suspends itself on the next instruction. This is necessary because the I/O resources might not be immediately available. The program suspends itself by resetting the TSC to zero, which makes the program's time slice expire.

The OS Board routinely examines the IOQ to determine if new jobs have been placed on the queue. Any new jobs that have been added to the IOQ have their entry in the SSR reset to indicate that the job should not be scheduled to execute until its I/O Request has been completed.

The IOQ is used to serialize the requests for HIO. Only one job at a time can use the I/O resources. When a job's request is read from the IOQ, it means the I/O resources are now available for that job. The job is then placed on the NRTQ to await execution. The job is eventually transferred from the NRTQ to the controllers' JQ, and is finally loaded for execution.

The program now continues where it left off, and now begins loading the data from the Local Memory into the OS Buffer via the IOMC and OS Bus. The data loaded into the OS Buffer contains additional information, such as the job number, file descriptor information, the amount of data, and the data formatting information. This information is used by the IOS on the Host.

When the program is finished loading the data, the controller sends an I/O Ready Signal to the OS Board, signalling that it has finished writing to the OS Buffer. The OS Board then signals the host (via the OS Signal) that there is data in the OS Buffer that is to be read. The OS Board then sets the SSR entry for the job, indicating that the job can be scheduled.

The program continues executing after sending the I/O Ready Signal to the OS Board. In the case that the size of the output exceeds the size of the OS Buffer, it is assumed to be the responsibility of the compiler to decompose the write request into several individual print requests, each of which can fit into the OS Buffer.

When the IOS (located on the Host) receives the OS Signal from the OS Board, it reads the OS Buffer. The program uses the job number and file descriptor information to locate the output source, such as a file or a terminal, and begins writing the output to that destination, using the formatting information provided.

When the IOS finishes reading the OS Buffer, it sends the OS Board a signal (via the Host Signal) indicating that the OS Buffer is free. At this point, the I/O Request is finished, and the OS Board can examine the next I/O Request on the IOQ.

The following event table provides a summary of the steps required to send output from a non-real time program to the Host. A more detailed description of the events is given above.

| | Host | OS Board | Controllers |
|---|---|---|---|
| 1. | | | Print stmt reached in code |
| 2. | | | Send I/O Request to HIOQ |
| 3. | | | Reset Time Slice Counter (Suspends program) |
| 4. | | SSR Entry for job reset | |
| 5. | | Read request from HIOQ | |
| 6. | | Schedule job on NRTQ | |
| 7. | | NRTQ job loaded into JQ | |
| 8. | | | Program continues execution |
| 9. | | | Data loaded into OS Buffer |
| 10. | | | I/O Ready Signal to OS Board |
| 11. | | OS Signal to Host | Program continues execution |
| 12. | | SSR Entry for job set | |
| 13. | IOS reads OS Buffer | | |
| 14. | IOS writes to destination | | |
| 15. | Host Signal to OS | | |
| 16. | | (Next request from HIOQ can be examined) | |

The process of a non-real time program requesting and receiving input from the Host Workstation is now described. The output can be from one of many sources, such as the terminal, a file in the Host file system, or an external I/O device controlled by the Host. Reasons for restricting HIO to non-real time programs are presented above.

Input to the Host is specified by a command in the high-level language program, such as a scanf( ) function in the language C, or the READ command in Fortran. The first instruction of the microcode implementing these functions sends an I/O Signal to the OS Board, which is added to the IOQ. This request gives the job number of the program requesting input, and a request identifier, which specifies the type of request. The program then suspends itself on the next instruction. This is necessary because the I/O resources might not be immediately available. The program suspends itself by resetting the Time Slice Counter to zero, which makes the program's time slice expire.

The OS Board routinely examines the IOQ to determine if new jobs have been placed on the queue. Any new jobs that have been added to the IOQ have their entry in the SSR reset to indicate that the job should not be scheduled to execute until its I/O Request has been completed.

The IOQ is used to serialize the requests for HIO. Only one job at a time can use the I/O resources. When a job's request is read from the IOQ, it means the I/O resources are now available for that job. The job is then placed on the NRTQ to await execution. The job is eventually transferred from the NRTQ to the controllers' JQ, and is finally loaded for execution.

The program now continues where it left off, and now begins loading the read request from the Local Memory into the OS Buffer via the IOMC and OS Bus. The read request contains information such as the job number, file descriptor information, the amount of data requested, and the data formatting information. This information is used by the IOS on the Host.

When the program is finished writing the request, the controller sends an I/O Ready Signal to the OS Board, signalling that it has finished writing to the OS Buffer. The OS Board then signals the host (via the OS Signal) that there is data in the OS Buffer that is to be read.

The program suspends execution again, since it must now wait for the data it has requested before proceeding with execution. This is accomplished by again resetting the TSC.

When the IOS program receives the OS Signal from the OS Board, it reads the OS Buffer. The program uses the job number and file descriptor information to locate the data source, such as a file or a terminal, and begins reading the data from that source, using the formatting information provided, and writing the data to the OS Buffer.

When the IOS program finishes writing the OS Buffer, it sends the OS Board a signal indicating that the OS Buffer is free. The OS Board responds to the signal by scheduling the job on the NRTQ.

When the program begins execution again, it reads the data from the OS Buffer, and loads the data into the Local Memory. When the program has finished reading the buffer, it sends the I/O Ready Signal to the OS Board, indicating it has finished reading the buffer. The program then continues execution. In the case that the size of the input exceeds the size of the OS Buffer, it is assumed to be the responsibility of the compiler to decompose the read request into several individual read requests, each of which can fit into the OS Buffer.

Upon receiving the I/O Ready Signal, the OS Board sets the SSR entry for the program, as it can now be scheduled along with other non-real time jobs. The OS Board is now ready to examine the next I/O Request.

The following event table provides a summary of the steps required to read input from the Host for a non-real time program. A more detailed description of the events is specified in the previous paragraphs.

| Host | OS Board | Controllers |
| --- | --- | --- |
| 1. | | Read stmt reached in code |
| 2. | | Send I/O Request to HIOQ |
| 3. | | Reset Time Slice Counter (Suspends program) |
| 4. | SSR Entry for job reset | |
| 5. | Read request from HIOQ | |
| 6. | Schedule job on NRTQ | |
| 7. | NRTQ job loaded into JQ | |
| 8. | | Program continues execution |
| 9. | | Write Read request to OS Buffer |
| 10. | | Program suspended |
| 11. | | I/O Ready Signal to OS Board |
| 12. | | Reset Time Slice Counter |
| 13. | OS Signal to Host | |
| 14. | IOS reads OS Buffer | |
| 15. | IOS locates data | |
| 16. | IOS writes data to OS Buffer | |
| 17. | Host Signal to OS | |
| 18. | Schedule job on NRTQ | |
| 19. | NRTQ job loaded into JQ | |
| 20. | | Program continues execution |
| 21. | | Data read from OS Buffer |
| 22. | to OS Board | I/O Ready Signal |
| 23. | | Program continues execution |
| 24. | SSR Entry for job set | |
| 25. | (Next request from HIOQ can be examined) | |

The OS Board Resident Program describes the operating system program resident on the OS Board. The program must respond to the requests of the Host (via the HRQ), the Controllers (via the I/O Queue), and the signal to schedule another job (the Job Finished signal). An operating system program is often modelled as an endless loop that polls for requests and then carries out the request when it occurs. That model is used in the OS Board program, which must constantly check for new requests.

The highest priority of the operating system program is the Job Scheduling activity. It is necessary to immediately schedule another job when the Job Finished signal occurs, since their are strict time constraints associated with executing real time jobs. Also, the lower priority requests (I/O and Host requests) can take many frame-times to execute, and so Job Scheduling should not be queued behind on of these requests. Thus, the Job Scheduling activity is implemented as an interrupt to the operating system program.

At the next priority level is the response to Host requests and Controller requests for I/O. At this point in time, no priority has been imposed on which is more important. However, the priority system would be implemented entirely in software, and so the question as to relative priorities can be put off to a future time.

The following is a simplified pseudocode of the operating system program:

```
main program:
loop forever
{
    examine HRQ
    update SSR if new job request pending
    if not empty, process host request
    examine IOQ
    update SSR if new job request pending
    if not empty, process I/O request
}
scheduling interrupt:
on JF signal,
{
    schedule a real time job
    if no real time job available and less than 2 jobs
        schedule a non-real time job
    if a new job request is on HRQ or IOQ, reset SSR entry
}
```

A problem with profiling and debugging parallel programs is that in many cases the code used to profile or debug interferes with the computation or behavior of the program under examination making analysis difficult. To deal with this problem, hardware support for profiling and debugging have been incorporated into the design of the SE.

A 32-bit dedicated profiling counter is on each processor and controller for real-time profiling. Profiling is usually implemented by adding additional instructions to the original program to count occurrences of events. This type of profiling is not possible in the real-time mode since some program segments are critically timed, such as communication through the IPC. A dedicated profiling counter 616 is used to perform profiling without interfering with processor execution.

In the exemplary embodiment of the invention, the processor instruction word includes a two-bit profiling counter control field (PCC) through which the counter 616, shown in FIG. 6, may be loaded, started, stopped and reset. Each of the controllers 300 also includes a dedicated profiling counter 3301 (shown in FIG. 33) which operates in the same manner. These counters increment their internal values by one, four, 16 or 64, depending on the contents of the PSW, for each clock pulse that occurs when the counters are enabled. Since these bits may be set in any controller or processor instruction to control the counters, no additional instructions are needed to perform profiling. Accordingly, a truer measure of the time spent by the processor in executing any block of code may be obtained using the profiling hardware of the present invention than by using conventional, compiler directed profiling which adds additional instructions to the program.

In order to profile more than one block of code, it is desirable to define different count values for the different blocks. In the present invention, this function is enabled by providing controller and processor instructions which load the respective profiling counters 616 and 3301 with values from local registers (e.g. RO4 for the processor counter 616). Other instructions copy the value in the counters 616 and 3301 to respective local memory locations (e.g. RI1 for the processor counter 616). Since these are additional instructions which may interfere with the execution of the program, they are desirably executed in non-critical parts of the program.

Likewise, a Debug Interrupt (DI) bit in the controller instruction word is used to mark instructions on which the program should break to the Debug Interrupt Handler located in a reserved area of the controller's instruction memory. In conventional systems, a debugger such as a checkpoint facility, inserts additional code into the program to aid in debugging. This code, however, may interfere with time-critical code segments, such as IPC operations or delayed branching. The hardware support for debugging in the present invention provides a breakpoint facility which allows the program to execute without the insertion of additional code. Control is automatically transferred to a debug routine when a particular bit (DI) is found to be set in a program instruction word. While executing the debug routine, an operator, via the host workstation 400, may examine the state of the controller and of local memory variables and registers in any of the processors. Upon exiting the debug routine, control is returned to the program. Since the interrupt occurs based on a single bit in the controller instruction word, the debug routine may be invoked during the execution of any instruction in the controller program.

The use of the SE to provide timely analysis of complex continuous real-time problems that occur in HDTV technology has been stressed in the above detailed description of the SE because of the preeminent demand for I/O bandwidth and processor cycles in the analysis of HDTV. However, there are many other problem areas involving very large data sets that require both massive amounts of computation and data communication to solve. Examples include neural networks, volume visualization, and polygon rendering, as well as weather modeling, medical imaging, computer vision, molecular modeling and VLSI simulation.

It is to be understood that the apparatus and method of operation taught herein are illustrative of the invention. Modifications may readily be devised by those skilled in the art without departing from the spirit or scope of the invention.

| ACRONYMS | |
|---|---|
| 1S | One's Complement |
| 2S | Two's Complement |
| AAM | Address Arithmetic Mode |
| ACC | Accumulator |
| ACMR | Auxiliary ALU Condition Mask Register |
| ADC | Analog to Digital Converter |
| ADR | Auxiliary ALU Data Register |
| ALIN | Active Locking Identifier Number |
| ALU | Arithmetic Logic Unit |
| ASCII | American Standard Code for Information Interchange |
| ASIC | Application-Specific Integrated Circuit |
| AuxALU | Auxiliary ALU |
| BLOS | Base-Limit-Offset-Stride |
| BR | Base Register |
| B-scan | Boundary Scan |
| CID | Communication Identifier |
| CIDR | Communication Identifier Register |
| CLCS | Conditional Locking Code Segment |
| DAC | Digital to Analog Converter |
| DI | Debug Interrupt |
| DIC | Data Input Channel |
| DOC | Data Output Channel |
| DRAM | Dynamic Random Access Memory |
| DS | Direct Source |
| DSP | Digital Signal Processing |
| EB | Engine Block |
| FBR | Frame base Register |
| FFT | Fast Fourier Transform |
| FIFO | First-In First-Out |
| FIR | Finite Impulse Response |
| FITSR | FIFO Input Timing Sequence Register |
| FLR | Frame Limit Register |
| FOR | Frame Offset Register |
| FOTSR | FIFO Output Timing Sequence Register |
| FSR | Frame Stride Register |
| GE | Greater-than or equal to zero |
| GOR | Global OR |
| GT | Greater-than |
| HD | High Definition |
| HDTV | High Definition Television |
| HIO | Host Input/Output |
| HIOR | Host Input/Output Register |
| HRQ | Host Request Queue |
| I/F | Integer/Floating Point |
| I/O | Input/Output |
| IC | Integrated Circuit |
| IEEE | Institute of Electrical and Electronic Engineers |
| IMD | Immediate |
| INE | Inexact |
| IOMC | Input/Output Memory Controller |
| IOQ | Input/Output Queue |
| IOS | Input/Output Server |
| IPC | Inter-Processor Communications |
| IPCDR | IPC Data Register |
| IPCOR | IPC Operation Register |
| IPCP | IPC Parity Error |
| IPCR | IPC Reduction Error |
| ITSR | Input Timing Sequence Register |
| IV | Image Vault |
| IVF | Image Vault Finished |
| JCtr | Job Counter |
| JF | Job Finished |

-continued

| ACRONYMS | |
|---|---|
| JQ | Job Queue |
| LIN | Locking Identifier Number |
| LOR | Local OR |
| LR | Limit Register |
| MCM | Multi-Chip Modules |
| MIMD | Multiple-Instruction Multiple-Data |
| MIPS | Millions of Instructions Per Second |
| MISR | Multiple Input Signature Registers |
| NaN | Not a Number |
| NOP | No-Operation |
| NOR | Neighboring Local OR |
| NPST | Neighborhood Pattern Sensitive Test |
| NRT | Non-Real-Time |
| NRTQ | Non-Real-Time Job Queue |
| NTSC | National Television Standards Committee |
| OF | OverFlow |
| OOB | Out of Bounds |
| OR | Offset Register |
| OS | Operating System |
| OTSR | Output Tinting Sequence Register |
| PC | Previous Context |
| PC | Program Counter |
| PCC | Profile Counter Control field |
| PCond | Previous Condition |
| PIDR | Processor Identifier Register |
| PIW | Processor Instruction Word |
| PLIN | Previous Locking Identifier Number |
| POR | Pixel Offset Register |
| PROC | Processor |
| PRI | Pixel Repeat Interval |
| PRPG | Pseudorandom Pattern Generators |
| PSW | Processor Status Word |
| PTM | Process Table Memory |
| PX | Previous Executed |
| RAM | Random Access Memory |
| RAP | Resource Allocation Program |
| RGB | Red-Green-Blue |
| RGBa | Red-Green-Blue-Alpha |
| RF | Register File |
| RT | Real-time |
| SIMD | Single-Instruction Single-Data |
| SP | Single Precision |
| SR | Stride Register |
| SRAM | Static Random Access Memory |
| SSR | Scheduling Status Register |
| TQ | Time Quantum Register |
| TSC | Time Slice Counter |
| UB | User Base |
| UF | UnderFlow |
| UL | User Limit |
| VAL | Valid |
| VLSI | Very Large Scale Integration |
| Y/C | Luminance/Chroma |

The invention claimed is:

1. A parallel processing computer system comprising:

a plurality of identical processor subsystems for performing data manipulation, including arithmetic and logical computations;

an input data bus, coupled to each of the processor subsystems, for supplying data to the plurality of processor subsystems;

an instruction bus, coupled to each of the processor subsystems, for supplying instructions to the plurality of processor subsystems to control said data manipulation; and an interprocessor communications (IPC) means, coupled to each of the processor subsystems, for communicating data and instructions between processor subsystems within said plurality of processor subsystems;

where each identical processor subsystem comprises:
a source of clock signal having a predetermined frequency;
a processor for performing said data manipulations;
memory, coupled to said processor, for storing a plurality of data values;
a secondary storage device; and
a secondary storage interface, coupled to the secondary storage device and the processor, responsive to commands from the processor, for writing data to the secondary storage device and reading data from the secondary storage device;

where each processor performs said data manipulation using data stored in said memory, data stored in said secondary storage device or data provided by said input data bus; and where the IPC means comprises:
a bus, coupled to each of the processor subsystems, including means for conveying a data clock signal which causes the IPC means to transfer one of said data values on the bus for each pulse of the data clock signal; and
means, responsive to control information conveyed via the instruction bus, for providing the data clock signal at a first frequency substantially equal to the predetermined frequency and for providing the data clock signal at a second frequency approximately equal to N-times the predetermined frequency, where N is an integer greater than 1.

2. The system of claim 1, wherein:

the secondary storage device is a disk drive having a bit-serial interface; and the secondary storage interface comprises:
a parallel to serial converter, for translating data and commands provided by the memory in parallel as multi-bit values for transmission to the disk drive;
a serial to parallel converter, for translating data and commands provided by the disk drive via the bit-serial interface into multi-bit values to be provided to the memory in parallel;
a data encoder, coupled between the memory and the parallel to serial converter for encoding the multi-bit values according to an error detection encoding scheme; and
a data decoder, coupled between the serial to parallel converter, for decoding the multi-bit values provided by the serial to parallel converter according an error detection decoding scheme, which is compatible with the error detection encoding scheme, to provide decoded multi-bit values in parallel to the memory, said data decoder including means, coupled to the processor, for indicating when a decoded data value contains an error as determined by the error detection decoding scheme.

3. The system of claim 1 further comprising:

a controller, connected to each identical processor subsystem in said plurality of identical processor subsystems, for controlling each identical processor subsystem; and a host computer, connected to said controller, for controlling said controller.

4. The system of claim 1 wherein said secondary storage device is a disk drive.

5. The system of claim 1 wherein said secondary storage device interface is a disk drive controller.

6. The system of claim 1 further comprising an Input/Output (I/O) interface, coupled to said processor, for transferring data values between the memory and the secondary storage interface.

7. The system of claim 6, further comprising:

memory means having N memory locations for holding N data values where N is an integer greater than 1;

output data buffer means, coupled to the memory, for reading ones of said N data values from the memory locations of the memory means in an order determined by the first output control signal and for providing the read data values at instants determined by a second output control signal;

input data buffer means, coupled to the memory, for receiving data values at instant determined by a first input control signal and for providing the received data values to the memory means at ones of said memory locations determined by a second input control signal;

means for coupling the output buffer means to the input buffer means such that the data values provided by the output buffer means are the data values received by the input buffer means; and a programmable controller for providing the first and second output control signals and the first and second input control signals to reorder the data values stored in the respective memory means of the P processors.

8. The system of claim 7, wherein:

each of the processor subsystems is identified by a unique processor identifier value;

the memory of each of the processor subsystems is responsive to an offset value for providing access to one of the N data values stored in the memory location indicated by the offset value; and the programmable controller includes means for providing the first output control signal and the second input control signal to each of the P processors to specify the offset which is used to access the N data values stored in the memory means, wherein the first output control signal and the second input control signal are respectively different functions of P and N.

9. The system of claim 1, wherein said IPC means further comprises:

a local memory;

an IPC data reduction register for holding a data value;

means, responsive to control information conveyed via the instruction bus, for loading the data value into the IPC data reduction register;

IPC logic means, responsive to control information conveyed via the instruction bus, for performing one of a predetermined set of arithmetic and logic operations using the value provided by the IPC bus as a first operand and the value held on the IPC data reductin register as a second operand to produce a result and for storing the result in the IPC data reduction operation; and means for providing the result produced by the IPC logic means as an operand to an appropriate processor.

10. The system of claim 9, wherein said IPC logic means further comprises:

means for appending a tag to an N-bit data value and for transferring the tagged N-bit data value via the IPC bus when the IPC bus is operating as a 2N-bit bus; and means, coupled to the IPC bus for comparing the tag to a value held in an internal register to selectively receive the transferred N-bit value responsive to the comparison.

11. The system of claim 10, wherein:

each of the processor subsystems includes means for receiving a clock signal having a predetermined frequency, wherein the processor within each processor subsystem is capable of performing one arithmetic operation for each period of the clock signal; and the IPC bus included means for conveying the data values at a rate which is N-times the predetermined frequency, where N is an integer greater than 1.

* * * * *